United States Patent
Leontaris et al.

(10) Patent No.: US 9,961,357 B2
(45) Date of Patent: May 1, 2018

(54) MULTI-LAYER INTERLACE FRAME-COMPATIBLE ENHANCED RESOLUTION VIDEO DELIVERY

(71) Applicant: DOLBY LABORATORIES LICENSING CORPORATION, San Francisco, CA (US)

(72) Inventors: Athanasios Leontaris, Mountain View, CA (US); Alexandros Tourapis, Milpitas, CA (US); Peshala Pahalawatta, Glendale, CA (US); Kevin J. Stec, Los Angeles, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 422 days.

(21) Appl. No.: 14/668,851

(22) Filed: Mar. 25, 2015

(65) Prior Publication Data
US 2015/0201206 A1 Jul. 16, 2015

Related U.S. Application Data

(63) Continuation of application No. 14/365,932, filed as application No. PCT/US2012/070172 on Dec. 17, 2012, now Pat. No. 9,014,263.
(Continued)

(51) Int. Cl.
*H04B 1/66* (2006.01)
*H04N 7/12* (2006.01)
(Continued)

(52) U.S. Cl.
CPC ........ *H04N 19/45* (2014.11); *H04N 13/0022* (2013.01); *H04N 13/0048* (2013.01);
(Continued)

(58) Field of Classification Search
CPC ...... H04N 19/45; H04N 19/33; H04N 19/597; H04N 13/0022; H04N 13/0048
See application file for complete search history.

(56) References Cited

U.S. PATENT DOCUMENTS

| | | | |
|---|---|---|---|
| 4,985,767 A | 1/1991 | Haghiri | |
| 5,652,616 A | 7/1997 | Chen | |

(Continued)

FOREIGN PATENT DOCUMENTS

| | | |
|---|---|---|
| CN | 101228797 | 7/2008 |
| CN | 101461244 | 6/2009 |

(Continued)

OTHER PUBLICATIONS

Tourapis, Alexis Michael et al "A Frame Compatible System for 3D Delivery" MPEG Meeting, Motion Picture Expert Group or ISO/IEC JTC1/SC29/WG11, Jul. 26, 2010.
(Continued)

*Primary Examiner* — Mehrdad Dastouri
*Assistant Examiner* — Kristin Dobbs

(57) ABSTRACT

A video base layer can contain information pertaining to frame-compatible interlace representations of multiple data categories while video enhancement layers can contain interlace or progressive representations and/or frame-compatible representations of these data categories. Video data are encoded and decoded using layered approaches.

21 Claims, 24 Drawing Sheets

Related U.S. Application Data

(60) Provisional application No. 61/576,989, filed on Dec. 17, 2011.

(51) Int. Cl.

| | | |
|---|---|---|
| *H04N 11/02* | (2006.01) | |
| *H04N 11/04* | (2006.01) | |
| *H04N 19/44* | (2014.01) | |
| *H04N 19/597* | (2014.01) | |
| *H04N 19/33* | (2014.01) | |
| *H04N 13/00* | (2018.01) | |
| H04N 19/172 | (2014.01) | |
| H04N 19/13 | (2014.01) | |
| H04N 19/61 | (2014.01) | |
| H04N 19/136 | (2014.01) | |
| H04N 19/82 | (2014.01) | |
| H04N 19/105 | (2014.01) | |
| H04N 19/86 | (2014.01) | |
| H04N 19/91 | (2014.01) | |

(52) U.S. Cl.
CPC .......... *H04N 19/33* (2014.11); *H04N 19/597* (2014.11); *H04N 13/0029* (2013.01); *H04N 19/105* (2014.11); *H04N 19/13* (2014.11); *H04N 19/136* (2014.11); *H04N 19/172* (2014.11); *H04N 19/61* (2014.11); *H04N 19/82* (2014.11); *H04N 19/86* (2014.11); *H04N 19/91* (2014.11)

(56) References Cited

U.S. PATENT DOCUMENTS

| | | |
|---|---|---|
| 5,886,736 A | 3/1999 | Chen |
| 6,057,884 A | 5/2000 | Chen |
| 6,151,362 A | 11/2000 | Wang |
| 7,782,937 B2 | 8/2010 | Yun |
| 8,345,776 B2 * | 1/2013 | Xiong .................. H04N 19/105 375/240.01 |
| 8,619,852 B2 | 12/2013 | Leontaris |
| 2005/0062846 A1 | 3/2005 | Choi |
| 2007/0086666 A1 | 4/2007 | Bruls |
| 2008/0043832 A1* | 2/2008 | Barkley ......... H04N 21/234327 375/240 |
| 2009/0097549 A1* | 4/2009 | Kim ...................... H04N 19/70 375/240.03 |
| 2010/0165077 A1 | 7/2010 | Yin |
| 2010/0195900 A1 | 8/2010 | Kim |
| 2010/0202540 A1 | 8/2010 | Fang |
| 2010/0260268 A1 | 10/2010 | Cowan |
| 2011/0074922 A1 | 3/2011 | Chen |
| 2011/0255003 A1 | 10/2011 | Pontual |
| 2012/0026288 A1 | 2/2012 | Tourapis |
| 2012/0092452 A1 | 4/2012 | Tourapis |
| 2013/0106998 A1 | 5/2013 | Pahalawatta |
| 2013/0113884 A1 | 5/2013 | Leontaris |

FOREIGN PATENT DOCUMENTS

| | | |
|---|---|---|
| WO | 2010/010077 | 1/2010 |
| WO | 2010/123862 | 10/2010 |
| WO | 2011/094034 | 8/2011 |

OTHER PUBLICATIONS

Dolby Laboratories et al "Dolby Open Specification for Frame-Compatible 3D Systems" Apr. 4, 2011, pp. 1-11.

"Advanced Video Coding for Generic Audiovisual Services" ITU H.264, Mar. 2010, pp. 1-653.

"VC-1 Compressed Video Bistream Format and Decoding Process" SMPTE Standard 421M-2006; pp. 1-493, Feb. 2006.

* cited by examiner

MULTI-LAYER INTERLACE FRAME-COMPATIBLE ENHANCED RESOLUTION VIDEO DELIVERY

CROSS REFERENCE TO RELATED APPLICATIONS

This application is a continuation of U.S. patent application Ser. No. 14/365,932, filed Jun. 16, 2014, which is the U.S. national stage of International Patent Application No. PCT/US2012/070172, filed Dec. 17, 2012, which in turn claims priority to U.S. Provisional Application No. 61/576,989, filed Dec. 17, 2011, each of which is hereby incorporated by reference in its entirety. The present application also may be related to U.S. Provisional Application No. 61/366,512, filed on Jul. 21, 2010, which is incorporated herein by reference in its entirety.

TECHNICAL FIELD

The present invention relates generally to image and video processing. More specifically, an embodiment of the present invention relates to multi-layer interlace frame-compatible enhanced resolution video delivery.

BACKGROUND

There have been considerable interest and traction in the industry towards stereoscopic (3D) video delivery. While use of stereoscopic 3D has become somewhat commonplace in cinema, the same is not yet generally true for consumer 3D applications. Efforts in the consumer 3D video space are beginning to develop.

Consideration has been placed in realizing efficient delivery of 3D content. Efficient content delivery comprises several considerations including compression, which is generally considered a significant consideration in many video applications.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DESCRIPTION OF EXAMPLE EMBODIMENTS

Figure 1:
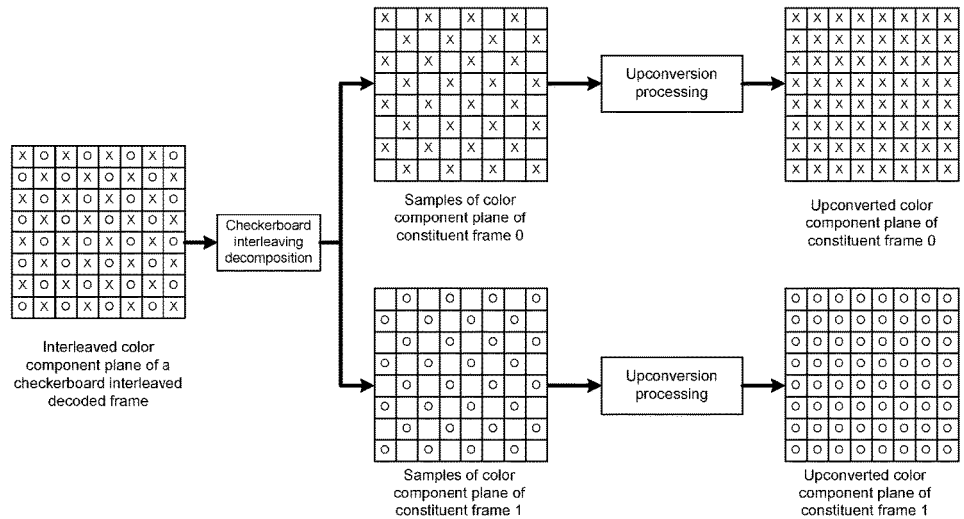
FIGS. 1-6 depict example frame-compatible formats and associated samplings.
Figure 2:
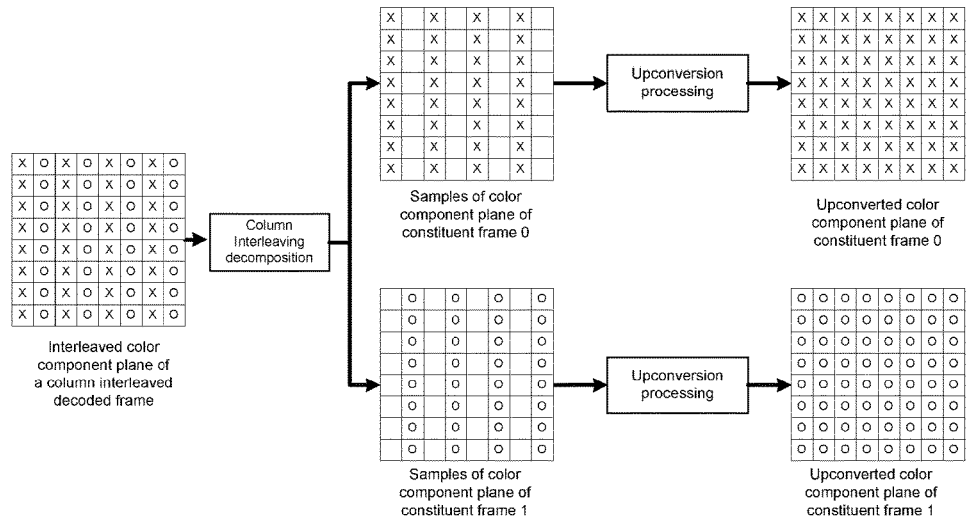
Figure 3:
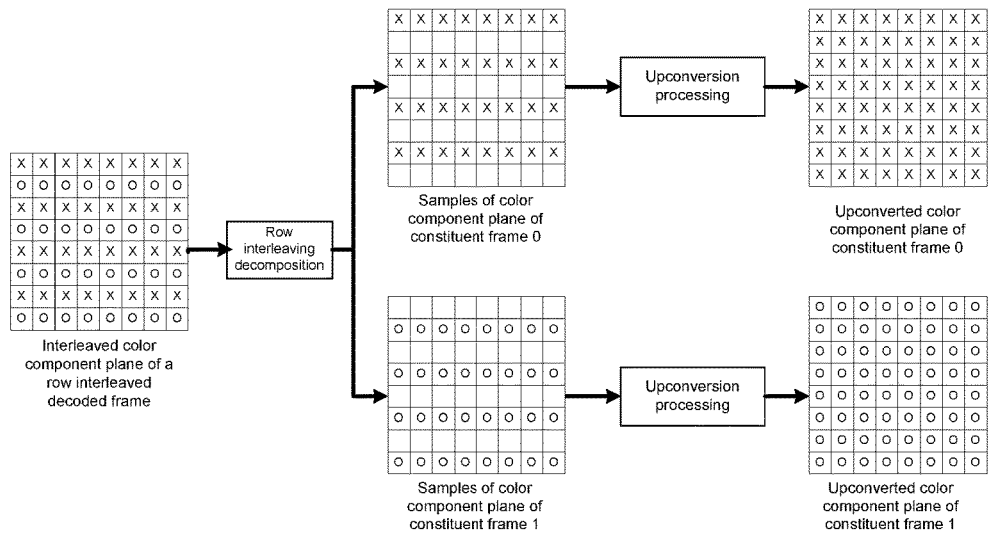
Figure 4:
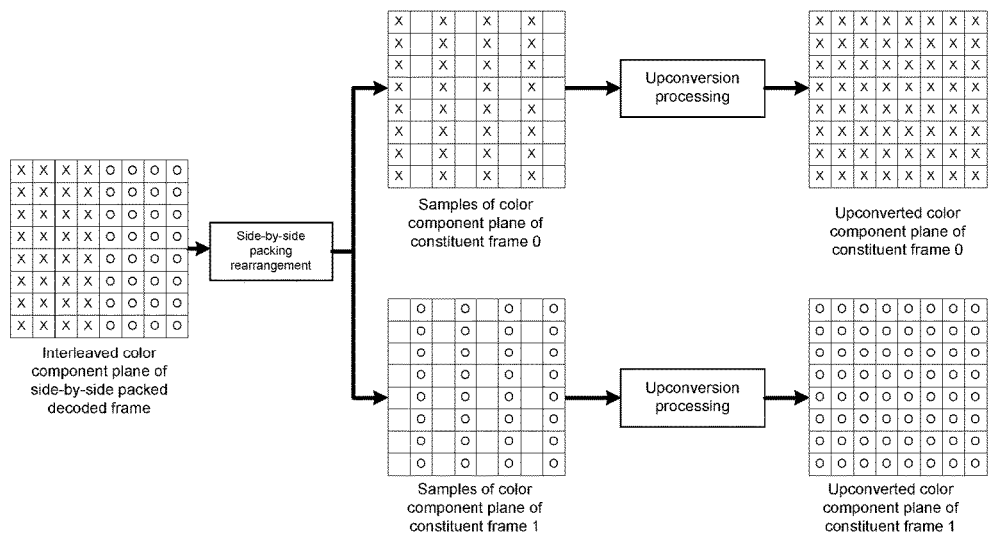
Figure 5:
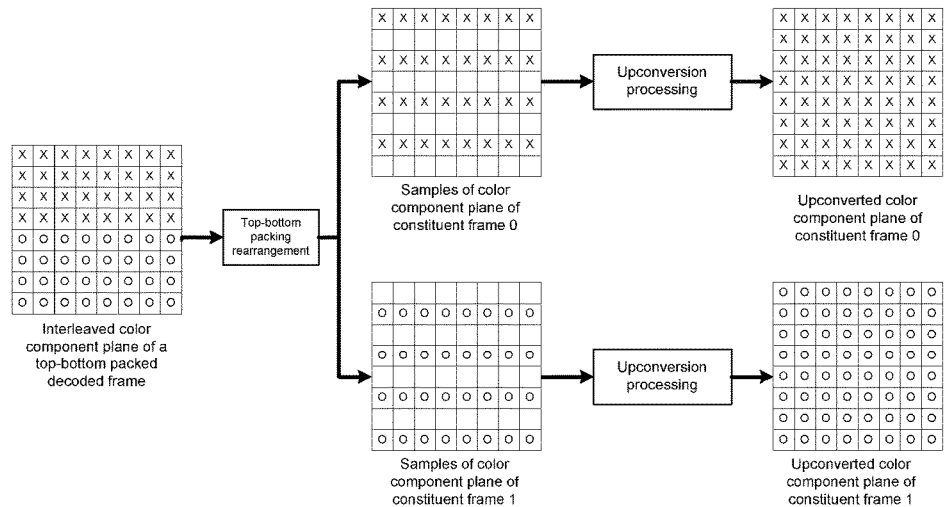
Figure 6:
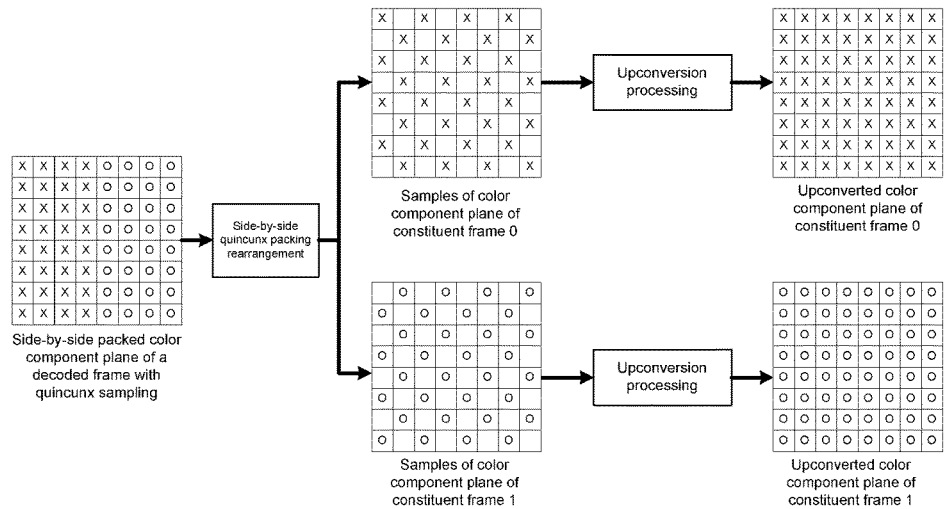

According to an example embodiment of the present invention, a method for encoding video data into a plurality of bitstreams using an encoding system is provided, the video data comprising data from a plurality of data categories, the method comprising: providing at least one first layer, wherein the at least one first layer comprises a frame-compatible interlace representation of the plurality of data categories from the video data; providing at least one second layer, wherein each second layer comprises one or more progressive representations, each progressive representation being associated with one or more of the data categories; encoding the at least one first layer to generate one or more encoded first layer bitstreams; and encoding the at least one second layer to generate one or more encoded second layer bitstreams.

According to an example embodiment of the present invention, a method for encoding video data into a plurality of bitstreams using an encoding system is provided, the video data comprising data from a plurality of data categories, the method comprising: providing at least one first layer, wherein the at least one first layer comprises a frame-compatible interlace representation of the plurality of data categories from the video data; providing at least one second layer and at least one third layer, wherein: each second layer comprises one or more second layer interlace representations, each second layer interlace representation being associated with one or more of the data categories, and each third layer comprises one or more progressive representations, each progressive representation being associated with one or more of the data categories; encoding the at least one first layer to generate one or more encoded first layer bitstreams; encoding the at least one second layer to generate one or more encoded second layer bitstreams; and encoding the at least one third layer to generate one or more encoded third layer bitstreams.

According to an example embodiment of the present invention, a method for encoding video data into a plurality of bitstreams using an encoding system is provided, the video data comprising data from a plurality of data categories, the method comprising: providing at least one first layer, wherein the at least one first layer comprises a frame-compatible interlace representation of the plurality of data categories from the video data; providing at least one second layer and at least one third layer, wherein: each second layer in the at least one second layer comprises a frame-compatible progressive representation of one or more data categories), and each third layer in the at least one third layer comprises an enhanced resolution progressive representation of one or more data categories; encoding the at least one first layer to generate one or more encoded first layer bitstreams; encoding the at least one second layer to generate one or more encoded second layer bitstreams; and encoding the at least one third layer to generate one or more encoded third layer bitstreams.

According to an example embodiment of the present invention, a method for encoding video data into a plurality of bitstreams is provided, the video data comprising data from a plurality of data categories, the method comprising:

providing at least one first layer, wherein the at least one first layer comprises a first set of frame-compatible interlace representations of the plurality of data categories from the video data; providing at least one second layer, at least one third layer, and at least one fourth layer, wherein: each second layer in the at least one second layer comprises a first set of frame-compatible progressive representations of the plurality of data categories from the video data, each third layer in the at least one third layer comprises a second set of frame-compatible interlace representations of the plurality of data categories from the video data, and each fourth layer in the at least one fourth layer comprises a second set of frame-compatible progressive representations of the plurality of data categories from the video data; encoding the at least one first layer to generate one or more encoded first layer bitstreams; encoding the at least one second layer to generate one or more encoded second layer bitstreams; encoding the at least one third layer to generate one or more encoded third layer bitstreams; and encoding the at least one third layer to generate one or more encoded fourth layer bitstreams.

According to an example embodiment of the present invention, a method for encoding video data into a plurality of bitstreams is provided, the video data comprising data from a plurality of data categories, the method comprising: providing at least one first layer, wherein the at least one first layer comprises a first set of frame-compatible interlace representations of the plurality of data categories from the video data; providing at least one second layer and at least one third layer, wherein: each second layer comprises a second set of frame-compatible interlace representations of the plurality of data categories from the video data, and each third layer comprises a set of interlace representations of the plurality of data categories from the video data; encoding the at least one first layer to generate one or more encoded first layer bitstreams; encoding the at least one second layer to generate one or more encoded second layer bitstreams; and encoding the at least one third layer to generate one or more encoded third layer bitstreams.

According to an example embodiment of the present invention, a method for decoding a plurality of bitstreams representative of video data using a decoding system is provided, the plurality of bitstreams adapted to be received by the decoding system from an encoding system, each bitstream comprising data associated with one or more data categories, the method comprising: providing the plurality of bitstreams to the decoding system, wherein the plurality of bitstreams comprises one or more first layer bitstreams representative of at least one first layer and one or more second layer bitstreams representative of at least one second layer, wherein the at least one first layer comprises a frame-compatible interlace representation of the one or more data categories and the at least one second layer comprises one or more progressive representations, each progressive representation being associated with one or more of the data categories; decoding the one or more first layer bitstreams to obtain a reconstructed frame-compatible interlace representation; and decoding the one or more second layer bitstreams to obtain one or more reconstructed progressive representations.

According to an example embodiment of the present invention, a method for decoding a plurality of bitstreams representative of video data using a decoding system is provided, the plurality of bitstreams adapted to be received by the decoding system from an encoding system, each bitstream comprising data associated with one or more data categories, the method comprising: providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein: the at least one first layer comprises a frame-compatible interlace representation of the plurality of data categories from the video data; each second layer comprises one or more second layer interlace representations, each second layer interlace representation being associated with one or more of the data categories, and each third layer comprises one or more progressive representations, each progressive representation being associated with one or more of the data categories; decoding the one or more first layer bitstreams to obtain a reconstructed frame-compatible interlace representation; decoding the one or more second layer bitstreams to obtain one or more reconstructed interlace representations; and decoding the one or more third layer bitstreams to obtain one or more reconstructed progressive representations.

According to an example embodiment of the present invention, a method for decoding a plurality of bitstreams representative of video data using a decoding system is provided, the plurality of bitstreams adapted to be received by the decoding system from an encoding system, each bitstream comprising data associated with one or more data categories, the method comprising: providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein: the at least one first layer comprises a frame-compatible interlace representation of the plurality of data categories from the video data; each second layer in the at least one second layer comprises a frame-compatible progressive representation of one or more data categories, and each third layer in the at least one third layer comprises an enhanced resolution progressive representation of one or more data categories; decoding the one or more first layer bitstreams to obtain a reconstructed frame-compatible interlace representation; decoding the one or more second layer bitstreams to obtain one or more reconstructed frame-compatible progressive representations; and decoding the one or more third layer bitstreams to obtain one or more reconstructed enhanced resolution progressive representations.

According to an example embodiment of the present invention, a method for decoding a plurality of bitstreams representative of video data using a decoding system is provided, the plurality of bitstreams adapted to be received by the decoding system from an encoding system, each bitstream comprising data associated with one or more data categories, the method comprising: providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein: the at least one first layer comprises a frame-compatible interlace representation of the plurality of data categories from the video data; each second layer in the at least one second layer comprises a first set of frame-compatible progressive representations of the plurality of data categories from the video data, each third layer in the at least one third layer comprises a second set of frame-compatible interlace representations of the plurality of data categories from the video data, and each fourth layer in the at least one fourth layer comprises a second set of frame-compatible progressive representations of the plurality of data categories from the video data; decoding the one or more first layer bitstreams to obtain a first layer reconstructed frame-compatible interlace representation; decoding the one or more second layer bitstreams to obtain one or more second layer reconstructed frame-compatible progressive representations; decoding the one or more third layer bitstreams to obtain one or more third layer reconstructed frame-compatible interlace representations; and decoding the one or more fourth layer bitstreams to obtain one or more fourth layer reconstructed frame-compatible progressive representations.

According to an example embodiment of the present invention, a method for decoding a plurality of bitstreams representative of video data using a decoding system is provided, the plurality of bitstreams adapted to be received by the decoding system from an encoding system, each bitstream comprising data associated with one or more data categories, the method comprising: providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein: the at least one first layer comprises a frame-compatible interlace representation of the plurality of data categories from the video data; each second layer comprises a second set of frame-compatible interlace representations of the plurality of data categories from the video data, and each third layer comprises a set of interlace representations of the plurality of data categories from the video data; decoding the one or more first layer bitstreams to obtain a first layer reconstructed frame-compatible interlace representation; decoding the one or more second layer bitstreams to obtain one or more second layer reconstructed frame-compatible interlace representations; and decoding the one or more third layer bitstreams to obtain one or more reconstructed interlace representations.

According to an example embodiment of the present invention, an encoding system for encoding video data into a plurality of bitstreams is provided, each bitstream being associated with at least one first layer or at least one second layer, the video data comprising data from a plurality of data categories, the encoding system comprising: a frame-compatible interlace input module that is configured to generate the at least one first layer from the video data, wherein the at least one first layer comprises a frame-compatible interlace representation of the plurality of data categories from the video data; a first layer encoder connected with the frame-compatible interlace input module and that is configured to encode the at least one first layer to generate one or more encoded first layer bitstreams; and a second layer encoder that is configured to encode the at least one second layer to generate one or more encoded second layer bitstreams, wherein each second layer comprises one or more progressive representations, each progressive representation being associated with one or more of the data categories.

According to an example embodiment of the present invention, an encoding system for encoding input video data into a plurality of bitstreams is provided, each bitstream being associated with at least one first layer, at least one second layer, or at least one third layer, the video data comprising data from a plurality of data categories, the encoding system comprising: a frame-compatible interlace input module that is configured to generate the at least one first layer from the video data, wherein the at least one first layer comprises a frame-compatible interlace representation of the plurality of data categories from the video data; an interlace input module that is configured to generate the at least one second layer from the video data, wherein each second layer comprises one or more second layer interlace representations, each second layer interlace representation being associated with one or more of the data categories; a first layer encoder connected with the frame-compatible interlace input module and that is configured to encode the at least one first layer to generate one or more encoded first layer bitstreams; a second layer encoder connected with the interlace input module and that is configured to encode the at least one second layer to generate one or more encoded second layer bitstreams; and a third layer encoder that is configured to encode the at least one third layer to generate one or more encoded third layer bitstreams, wherein each third layer comprises one or more progressive representations, each progressive representation being associated with one or more of the data categories.

According to an example embodiment of the present invention, an encoding system for encoding video data into a plurality of bitstreams is provided, each bitstream being associated with at least one first layer, at least one second layer, or at least one third layer, the video data comprising data from a plurality of data categories, the encoding system comprising: a frame-compatible interlace input module that is configured to generate the at least one first layer, wherein the at least one first layer comprises a frame-compatible interlace representation of the plurality of data categories from the video data; a frame-compatible progressive input module that is configured to generate the at least one second layer from the video data, wherein each second layer in the at least one second layer comprises a frame-compatible progressive representation of one or more data categories; a first layer encoder that is connected with the frame-compatible interlace input module and configured to encode the at least one first layer to generate one or more encoded first layer bitstreams; a second layer encoder that is connected with the frame-compatible progressive input module and configured to encode the at least one second layer to generate one or more encoded second layer bitstreams; and a third layer encoder that is configured to encode the at least one third layer to generate one or more encoded third layer bitstreams, wherein each third layer comprises an enhanced resolution progressive representation of one or more data categories.

According to an example embodiment of the present invention, an encoding system for encoding video data into a plurality of bitstreams is provided, each bitstream being associated with at least one first layer, at least one second layer, at least one third layer, or at least one fourth layer, the video data comprising data from a plurality of data categories, the encoding system comprising: a first frame-compatible interlace input module that is configured to generate the at least one first layer, wherein the at least one first layer comprises a first set of frame-compatible interlace representations of the plurality of data categories from the video data; a first frame-compatible progressive input module that is configured to generate the at least one second layer, wherein each second layer in the at least one second layer comprises a first set of frame-compatible progressive representations of the plurality of data categories from the video data; a second frame-compatible interlace input module that is configured to generate the at least one third layer, wherein each third layer in the at least one third layer comprises a second set of frame-compatible interlace representations of the plurality of data categories from the video data; a second frame-compatible progressive input module that is configured to generate the at least one fourth layer, wherein each fourth layer in at least one fourth layer comprises a second set of frame-compatible progressive representations of the plurality of data categories from the video data; a first layer encoder that is connected with the first frame-compatible interlace input module and configured to encode the at least one first layer to generate one or more encoded first layer bitstreams; a second layer encoder that is connected with the first frame-compatible progressive input module and configured to encode the at least one second layer to generate one or more encoded second layer bitstreams; a third layer encoder that is connected with the second frame-compatible interlace input module and configured to encode the at least one third layer to generate one or more encoded third layer bitstreams; and a fourth layer encoder that is connected with the second frame-compatible progressive input module and configured to encode the at least one fourth layer to generate one or more encoded fourth layer bitstreams.

According to an example embodiment of the present invention, an encoding system for encoding video data into a plurality of bitstreams is provided, each bitstream being associated with at least one first layer, at least one second layer, or at least one third layer, the video data comprising data from a plurality of data categories, the encoding system comprising: a first frame-compatible interlace input module that is configured to generate the at least one first layer, wherein the at least one first layer comprises a first set of frame-compatible interlace representations of the plurality of data categories from the video data; a second frame-compatible interlace input module that is configured to generate the at least one second layer, wherein each second layer comprises a second set of frame-compatible interlace representations of the plurality of data categories from the video data; a first interlace input module that is configured to generate the at least one third layer, wherein each third layer comprises a set of interlace representations of the plurality of data categories from the video data; a first layer encoder that is connected with the first frame-compatible interlace input module and configured to encode the at least one first layer to generate one or more encoded first layer bitstreams; a second layer encoder that is connected with the second frame-compatible interlace input module and configured to encode the at least one second layer to generate one or more encoded second layer bitstreams; and a third layer encoder that is connected with the first interlace input module and configured to encode the at least one third layer to generate one or more encoded third layer bitstreams.

According to an example embodiment of the present invention, a decoding system for decoding a plurality of bitstreams representative of video data and adapted to be received from an encoding system, the plurality of bitstreams comprising one or more first layer bitstreams representative of at least one first layer and one or more second layer bitstreams representative of at least one second layer, each bitstream comprising data associated with one or more data categories of the video data, the decoding system comprising: a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation; and a second layer decoder that is configured to decode the one or more second layer bitstreams associated with the at least one second layer, wherein the at least one second layer comprises one or more progressive representations, each progressive representation being associated with one or more of the data categories, the second layer decoder thus being configured to obtain one or more reconstructed progressive representations.

According to an example embodiment of the present invention, a decoding system for decoding a plurality of bitstreams representative of video data and adapted to be received from an encoding system is provided, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories of the video data, the decoding system comprising: a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation; a second layer decoder that is configured to decode the one or more second layer bitstreams associated with the at least one second layer, wherein the at least one second layer comprises one or more interlace representations, each interlace representation being associated with one or more of the data categories, the second layer decoder thus being configured to obtain one or more reconstructed interlace representations; and a third layer decoder configured to decode the one or more third layer bitstreams associated with the at least one third layer, wherein the at least one third layer comprises one or more progressive representations, each progressive representation being associated with one or more of the data categories, the third layer decoder thus being configured to obtain one or more reconstructed progressive representations.

According to an example embodiment of the present invention, a decoding system for decoding a plurality of bitstreams representative of video data and adapted to be received from an encoding system is provided, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories, the decoding system comprising: a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation; a second layer decoder that is configured to decode the one or more second layer bitstreams associated with the at least one second layer, wherein the at least one second layer comprises one or more frame-compatible progressive representations, each frame-compatible progressive representation being associated with one or more of the data categories, the second layer decoder thus being configured to obtain one or more reconstructed frame-compatible progressive representations; and a third layer decoder that is configured to decode the one or more third layer bitstreams associated with the at least one third layer, wherein the at least one third layer comprises one or more enhanced resolution progressive representation representations, each enhanced resolution progressive representation being associated with one or more of the data categories, the third layer decoder thus being configured to obtain one or more reconstructed enhanced resolution progressive representations.

According to an example embodiment of the present invention, a decoding system for decoding a plurality of bitstreams representative of video data and adapted to be received from an encoding system is provided, the plurality of bitstreams comprising one or more first layer bitstreams representative of at least one first layer, one or more second layer bitstreams representative of at least one second layer, one or more third layer bitstreams representative of at least one third layer, and one or more fourth layer bitstreams representative of at least one fourth layer, each bitstream comprising data associated with one or more data categories, the decoding system comprising: a first layer decoder that is configured to decode the one or more first layer bitstreams associated with the at least one first layer, wherein the at least one first layer comprises a first set of frame-compatible interlace representations, each frame-compatible interlace representation being associated with one or more data categories, the first layer decoder thus being configured to obtain one or more first layer reconstructed frame-compatible interlace representation; a second layer decoder that is configured to decode the one or more second layer bitstreams associated with the at least one second layer, wherein the at least one second layer comprises a first set of frame-compatible progressive representations, each frame-compatible progressive representation being associated with one or more of the data categories, the second layer decoder thus being configured to obtain one or more second layer reconstructed frame-compatible progressive representations; a third layer decoder that is configured to decode the one or more third layer bitstreams associated with the at least one third layer, wherein the at least one third layer comprises a second set of frame-compatible interlace representations, each frame-compatible interlace representation being associated with one or more of the data categories, the third layer decoder thus being configured to obtain one or more third layer reconstructed frame-compatible interlace representations; and a fourth layer decoder that is configured to decode the one or more fourth layer bitstreams associated with the at least one fourth layer, wherein the at least one fourth layer comprises a second set of frame-compatible progressive representations, each frame-compatible progressive representation being associated with one or more of the data categories, the third layer decoder thus being configured to obtain one or more fourth layer reconstructed frame-compatible progressive representations.

According to an example embodiment of the present invention, a decoding system for decoding a plurality of bitstreams representative of video data and adapted to be received from an encoding system is provided, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories, the decoding system comprising: a first layer decoder that is configured to decode the one or more first layer bitstreams associated with the at least one first layer, wherein the at least one first layer comprises a first set of frame-compatible interlace representations, each frame-compatible interlace representation being associated with one or more data categories, the first layer decoder thus being configured to obtain one or more first layer reconstructed frame-compatible interlace representation; a second layer decoder configured to decode the one or more second layer bitstreams associated with the at least one second layer, wherein the at least one second layer comprises a second set of frame-compatible interlace representations, each frame-compatible interlace representation being associated with one or more of the data categories, the second layer decoder thus being configured to obtain one or more second layer reconstructed frame-compatible interlace representations; and a third layer decoder configured to decode the one or more third layer bitstreams associated with the at least one third layer, wherein the at least one third layer comprises one or more interlace representations, each interlace representation being associated with one or more of the data categories, the third layer decoder thus being configured to obtain one or more third layer reconstructed interlace representations.

Stereoscopic delivery can be challenging. In part, such challenges can be due to doubling of amount of information to be delivered/communicated relative to a single-view case. Specifically, to deliver stereoscopic content, information is transmitted for two view sequences. The two view sequences can be, for instance, a left view sequence and a right view sequence generally associated with what can be seen by a left eye and a right eye, respectively. Furthermore, relative to the single-view case, computational and memory throughput specifications generally increase as well for stereoscopic applications.

In general, channels through which stereoscopic content can be delivered to a consumer include fixed media (such as Blu-Ray discs) and streaming solutions, where the content is delivered primarily to a set-top box and secondarily to a PC. Many currently deployed Blu-Ray players and set-top boxes support codecs such as those based on the profiles of Annex A of the ITU-T/ISO/IEC H.264/14496-10 state-of-the-art video coding standard (also known as MPEG-4 Part 10 AVC) (see reference [1], incorporated herein by reference in its entirety) and the SMPTE VC-1 standard (see reference [2], incorporated herein by reference in its entirety). Either of those codecs enables a service provider to deliver a single HD image sequence at 1920×1080 pixel resolution.

One approach of transmitting stereoscopic content is to encode two separate bitstreams, one for each view. Such an approach is generally referred to as simulcast. However, this approach of sending two separate bitstreams can yield less efficient compression and an increase in bandwidth to maintain an acceptable level of quality, since the left and right view sequences are coded independently from each other even though information in the view sequences are generally correlated.

Consequently, delivery of stereoscopic content may benefit from improved compression efficiency for stereoscopic video. Additionally, the delivery of stereoscopic content should maintain compatibility (e.g., backwards compatibility) with existing devices. Such compatibility can be accomplished with codecs that support multiple layers.

Multi-layer or scalable bitstreams comprise information on multiple layers. The various layers are characterized by set dependency relationships. One or more of these layers are referred to as base layers that are independently decodable and are decoded prior to decoding other layers that depend on information from one or more of the base layers. These remaining layers are usually referred to as enhancement layers, since information from the enhancement layers can generally be utilized to improve content provided relative to when just the base layer or layers are parsed and decoded.

Enhancement layers are also referred to as dependent layers, since decoding of any particular enhancement layer may involve utilizing information from one or more higher priority layers (e.g., base layers and higher priority enhancement layers) on which the particular enhancement layer depends. Consequently, these higher priority layers on which the particular enhancement layer depends are decoded prior to decoding of the particular enhancement layer.

Decoding can be terminated at one of the intermediate layers. For instance, consider a base layer, a first enhancement layer that depends on information from the base layer, and a second enhancement layer that depends on information from the base layer and/or the first enhancement layer. In one case, the base layer can be decoded alone (without decoding the first and second enhancement layers). In another case, the base layer and the first enhancement layer are decoded whereas the second enhancement layer is not decoded. In yet another case, all three layers are decoded in the following order (from first decoded layer to last decoded layer): the base layer, the first enhancement layer, and the second enhancement layer.

Multi-layer or scalable bitstreams can enable scalability in terms of, by way of example and not of limitation, quality (e.g., signal-to-noise ratio (SNR) and/or peak signal-to-noise ratio (PSNR)), spatial resolution, temporal resolution, and/or availability of additional views. For example, using codecs based on Annex A profiles of H.264/MPEG-4 Part 10, VC-1, or VP8, bitstreams that are temporally scalable can be produced. Specifically, for instance, a base layer, if decoded, may provide a version of an image sequence at 15 frames per second (fps) while an enhancement layer dependent on the base layer, if decoded, can provide, in conjunction with the already decoded base layer, the same image sequence at 30 fps. Spatial and SNR scalability can be implemented, for example, when adopting Annex G of the H.264/MPEG-4 Part 10 AVC video coding standard. In such a case, the base layer, if decoded, may generate a coarse quality version of the image sequence, while the enhancement layer or layers, if decoded, may provide additional incremental improvements to visual quality of the image sequence. Similarly, the base layer may provide a low resolution version of the image sequence. The resolution may be increased/improved by decoding an additional enhancement layer or layers. Multi-layer or scalable bitstreams can also be utilized for providing multi-view scalability.

The Stereo High Profile of the Multi View Coding (MVC) extension (Annex H) of H.264/AVC has been recently finalized and adopted as the video codec for the next generation of Blu-Ray discs (Blu-Ray 3D) that feature stereoscopic content (e.g., left view and right view). The Stereo High Profile utilizes a base layer that is compliant with the High Profile of Annex A of H.264/AVC and that compresses one of the views (usually the left) that is termed the base view. An enhancement layer then compresses the other view, which is termed the dependent view.

While the base layer is on its own a valid H.264/AVC bitstream and is independently decodable from the enhancement layer, the same is generally not true for the enhancement layer. For instance, the enhancement layer can utilize as motion-compensated prediction references decoded pictures from the base layer, and thus decoding of the enhancement layer involves first decoding the base layer. As a result, the dependent view (e.g., the enhancement layer) may benefit from inter-view prediction. Compression may improve for scenes with high inter-view correlation (e.g., low stereo disparity). However, a loss of compatibility with existing deployed set-top box and Blu-Ray player infrastructure may be associated with coding gain from utilizing inter-view correlation. Even though an existing H.264 decoder may be able to decode and display the base view, it will discard and ignore the dependent (right) view. As a result, an existing H.264 decoder will only be able to view 2D content. Hence, while the MVC extension retains 2D compatibility, the MVC extension does not take into consideration delivery of 3D content in legacy devices.

Deployment of consumer 3D can be achieved by exploiting the installed base of set-top boxes, Blu-Ray players, and 3D-capable HDTV sets. Specifically, a display can be provided with content that contains both views but fits within a single frame and utilizes existing and deployed codecs such as VC-1 and H.264/AVC. Such an approach, referred to as frame-compatible, formats the stereo content so that both views fit within a single picture or frame. Note that size of the frame-compatible representation can be, but needs not be, the same as that of the original view frames.

Similar to the MVC extension (Annex H) of H.264, an example stereoscopic 3D consumer delivery system (provided in reference [3], incorporated herein by reference in its entirety) features a base layer and an enhancement layer. In contrast to the MVC approach, the views may be multiplexed into both layers in order to provide consumers with a base layer that is frame-compatible. The base layer contains sub-sampled versions of both views, and combining of the base layer and the enhancement layer may result in enhanced resolution (ER) reconstruction of both views.

As used herein, the term "coding" may refer to both encoding and decoding. Similarly, the term "coding system" may encompass either or both of an encoding system and a decoding system.

As used herein, the terms "picture", "region", and "partition" are used interchangeably and may refer to image data pertaining to a pixel, a block of pixels (such as a macroblock or any other defined coding unit), an entire picture or frame, or a collection of pictures/frames (such as a sequence or subsequence). Macroblocks can comprise, by way of example and not of limitation, 4×4, 4×8, 8×4, 8×8, 8×16, 16×8, and 16×16 pixels within a picture. In general, a region can be of any shape and size. A pixel can comprise not only luma but also chroma components. Pixel data may be in different formats such as 4:0:0, 4:2:0, 4:2:2, and 4:4:4; different color spaces (e.g., YUV, RGB, and XYZ); and may use different bit precision.

As used herein, the terms "present layer" and "current layer" are used interchangeably and may refer to a layer presently under consideration. The present or current layer can thus be a base layer or an enhancement layer.

As used herein, the term "higher priority layer" may refer to a layer that is coded prior to the coding of the present layer. Consequently, the higher priority layer is available to provide inter-layer information for inter-layer prediction of the present layer.

As used herein, the term "first layer" is defined herein to refer to any layer, such as a base layer or an enhancement layer, whereas the term "second layer" is defined herein to refer to any layer of lower priority than the first layer. The first layer can be a base layer while the second layer can be an enhancement layer. Alternatively, the first layer can be an enhancement layer while the second layer can be another enhancement layer of lower priority than the first layer.

As used herein, the terms "original signal" and "original image" are used interchangeably and may refer to input video or picture information to be encoded by an encoder. By way of example and not of limitation, the original signal/picture can comprise information on one or more views and/or layers, a frame-compatible picture or sequence of pictures, and so forth.

As used herein, the term "full resolution" (FR) may refer to resolution of the original signal/image.

As used herein, the terms "enhanced resolution" (ER) and "higher representation" are used interchangeably and defined herein to refer to a resolution higher than a frame-compatible resolution associated with an original image and less than or equal to full resolution of the original image. For instance, for a particular view in a frame-compatible representation, the original resolution may refer to resolution of the particular view in the frame-compatible representation.

As used herein, the term "viewpoint" may refer to a position, angle, and/or direction from which to view a scene. The terms "view", "perspective", and "viewpoint image" can be used interchangeably and may refer to a portion of the scene seen/captured from a particular viewpoint.

As used herein, the term "quality" may refer to both objective image/video quality and subjective image/video quality. Objective image/video quality generally can be quantified. Examples of measures of (objective) image/video quality include distortion between an expected image and a predicted image, signal-to-noise ratio (SNR) of an image signal, peak signal-to-noise ratio (PSNR) of an image signal, and so forth.

Subjective image/video quality refers to the quality of the image as seen by a viewer of the image. Although subjective video quality can also be measured using objective measures of image/video quality, an increase in objective image/video quality does not necessarily yield an increase in subjective image/video quality, and vice versa. In relation to images processed using block-based operations, for instance, subjective image/video quality considerations can involve determining how to process pixels along block boundaries such that perception of block artifacts are reduced in a final displayed image. To an observer of an image, subjective quality measurements are made based on evaluating features such as, but not limited to, smoothness, sharpness, details, and temporal continuity of various features in the image.

As used herein, the term "data categories" may refer to data pertaining to, by way of example and not of limitation, views, low and/or high frequency information from the views, and/or depth-maps.

As used herein, the terms "set" and "group" are used interchangeably and may refer to "one or more" or "at least one". Consequently, a set of enhancement layers refers to one or more enhancement layers.

As used herein, the terms "module" and "unit" are used interchangeably and may refer to a unit configured to perform certain functions. Modules and units may be implemented in hardware, software, firmware, or combination thereof.

Example frame-compatible formats include side-by-side, over-under, and quincunx/checkerboard interleaved. Some examples of frame-compatible formats and associated samplings are depicted in FIG. 1 through FIG. 6. In particular, FIG. 1 through FIG. 6 depict frame-compatible formats for delivery of stereoscopic material using a checkerboard interleaved arrangement, horizontal sampling/column interleaved arrangement, vertical sampling/row interleaved arrangement, horizontal sampling/side-by-side arrangement, vertical sampling/over-under arrangement, and quincunx sampling/side-by-side arrangement, respectively.

Figure 7:
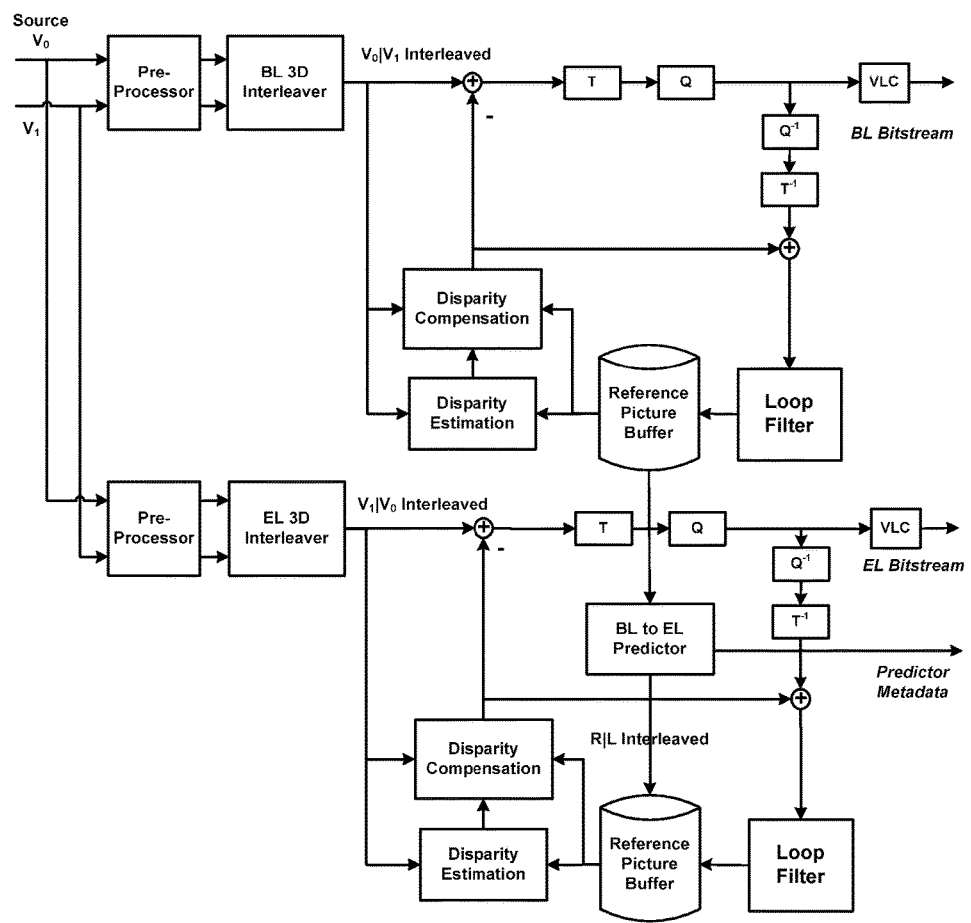
FIG. 7 and FIG. 8 depict diagrams of an encoder and a decoder, respectively, for an example stereoscopic 3D consumer delivery system.
Figure 8:
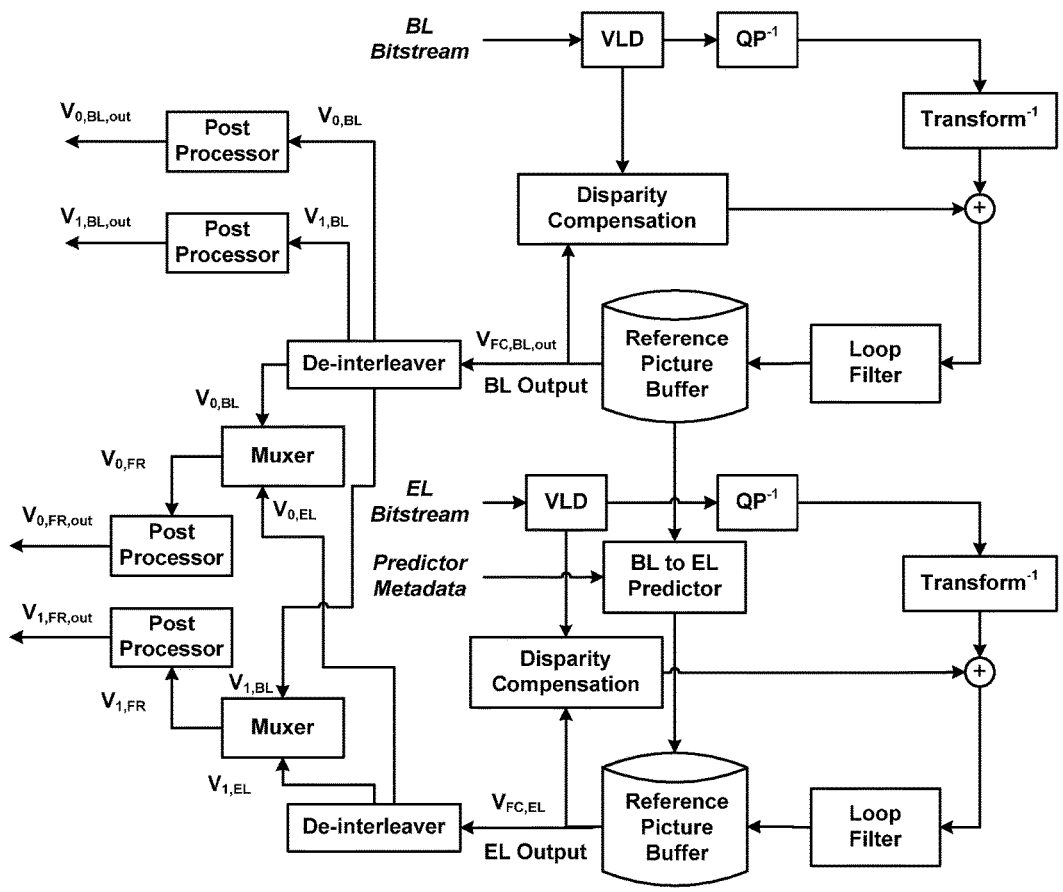

Furthermore, an additional reference processing unit (RPU) may be present that predicts an enhancement layer frame given a base layer decoded frame prior to using the base layer decoded frame as a motion-compensated reference for prediction of the enhancement layer. FIG. 7 and FIG. 8 depict diagrams of an encoder and a decoder, respectively, for the example stereoscopic 3D consumer delivery system of reference [3].

Frame-compatible techniques provided in reference [3] involve a frame-compatible base layer and, through use of an RPU, can allow a reduction in overhead to realize full-resolution reconstruction of stereoscopic views. Based on availability of one or more enhancement layers, final reconstructed views can be obtained in different ways, which are depicted, for instance, in FIG. 8.

In one example, the final reconstructed views can be interpolated from a frame-compatible output of the base layer $V_{FC,BL,out}$, which can be optionally post-processed via one or more post-processor units associated with each view, to yield a first view $V_{0,BL,out}$ and a second view $V_{1,BL,out}$. In another example, the final reconstructed views can be multiplexed with samples of the enhancement layer to yield a higher representation (also referred to as enhanced resolution) reconstruction $V_{0,BL,out}$ (840) and $V_{1,BL,out}$ of each view. Additional techniques for enhanced resolution multi-layer 3D delivery can be found in U.S. Provisional Application No. 61/366,512, entitled "Systems and Methods for Multi-Layered Frame-Compatible Video Delivery", filed on Jul. 21, 2010, which is incorporated herein by reference in its entirety.

Video content may be delivered as progressive content (e.g., progressive frames) or as interlace content (e.g., a series of top and bottom fields). In progressive content delivery, a frame is transmitted in raster-scan order for each time instance, where pixel positions in a sampling grid generally stay constant for the duration of an image sequence.

Figure 9:
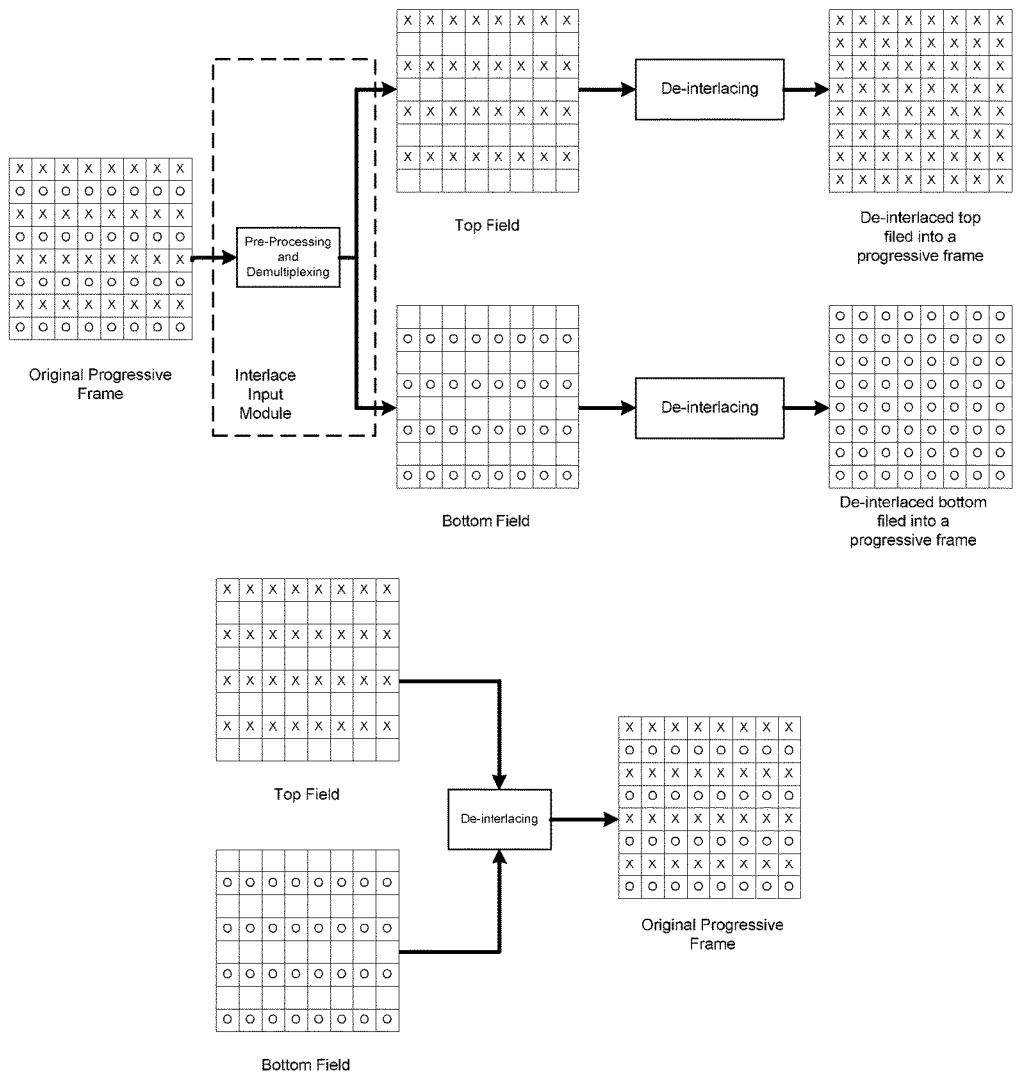
FIG. 9 depicts an example schematic for interlace content delivery.

FIG. 9 depicts an example schematic for interlace content delivery. In the example schematic for interlace content delivery depicted in FIG. 9, a top field (comprising even rows of a frame) is transmitted at time instances 2n while a bottom field (comprising odd rows of the same frame) is transmitted for time instances 2n+1. Consequently, a complete frame is transmitted every two time units (2n and 2n+1 for a given n). Alternatively, the bottom field can be transmitted first (e.g., time instances 2n) followed by the top field (e.g., time instances 2n+1). Generally, either of these orderings (e.g., transmitting top field or bottom field first) is maintained for the duration of a sequence of frames.

One notes similarities between interlacing and line-interleaving for frame-compatible representations. For instance, if line-interleaving is utilized to prepare a frame-compatible representation of a picture, a top field of the frame-compatible picture can be a left view while a bottom field of the frame-compatible picture can be a right view. The top-field can be generally defined as retaining the even lines of the progressive representation while the bottom field can be generally defined as retaining the odd lines of the progressive representation.

The top and bottom fields can be pre-processed/filtered in order to, for instance, reduce or avoid aliasing issues, perform denoising, improve quality (e.g., objective or subjective quality), and/or improve compression efficiency.

For de-interlacing, for a given time instance (even or odd), information can be accessed for only one of the fields or for both of the fields. In a case where information from only one of the fields is accessible, interpolation (and, optionally, motion compensated prediction from previously coded fields) may be used to estimate the missing samples for the given time instance. The accessible field and predicted samples from the inaccessible field can then be interleaved to derive the progressive representation for the given time instance. In an alternative case where information from both fields is accessible for the given time instance, the two fields can be interleaved to derive the progressive representation for the given time instance. Optionally, the resulting progressive representation may be filtered to avoid issues (e.g., generally perceptual issues) due to, for instance, separate coding of each layer.

According to many embodiments of the present disclosure, systems and methods are provided for delivering a frame-compatible interlace 3D stereoscopic content representation at a base layer while maintaining ability to derive either enhanced resolution interlace or enhanced resolution progressive representation of multi-view content through decoding of additional enhancement/dependent layers. The systems and methods can also be extended to more than two views.

According to many embodiments of the present disclosure, each field in a frame-compatible interlace representation comprises information from all views. For example, for top-bottom frame-compatible interleaving for stereoscopic content, the top-half of the field can contain one view and the bottom-half of the field can contain the other view. Similarly, for side-by-side frame-compatible interleaving for stereoscopic content, the left-half of the field can contain one view and the right-half of the field can contain the other view.

Figure 10A:
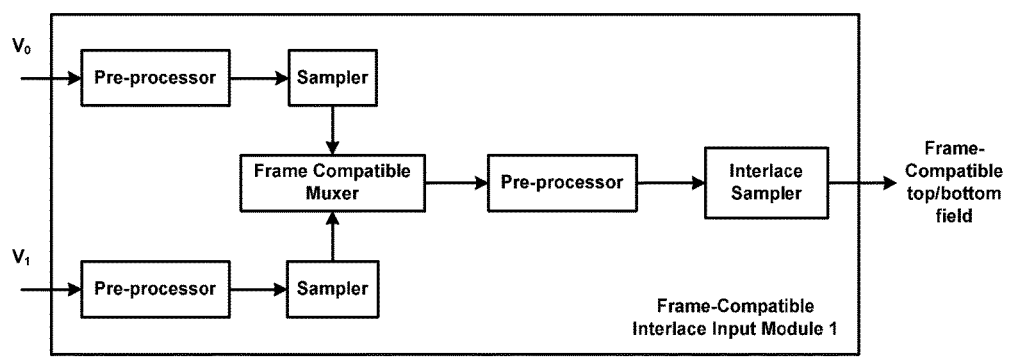
FIGS. 10A and 10B depict two possible implementations of input modules that can produce a frame-compatible interlace representation using input from two views.
Figure 10B:
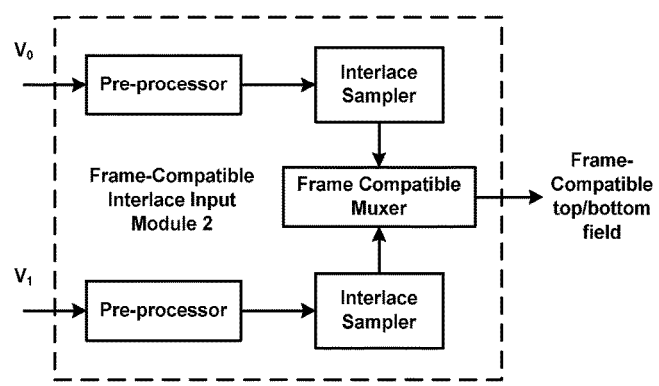

FIGS. 10A and 10B depict two possible implementations of input modules that can produce a frame-compatible interlace representation using input from two views. In FIG. 10A, a frame-compatible progressive representation is first derived at pre-processors and then sampled to derive the fields. In FIG. 10B, the fields are first derived for each view and then sampled to derive a frame-compatible output field. An enhanced resolution interlace representation can comprise one field for each view at a given time instance. Generally, a view that has, for instance, a top/bottom field at time instances 2n can have a bottom/top field at time instances 2n+1. Furthermore, the views in the input do not necessarily have the same type of field for any given time instance. Exploiting stereo visual masking for a same time instance, a top field can comprise information on a first view while a bottom field can comprise information on a second view.

By way of example and not of limitation, five methods are briefly described below and will be presented in more detail throughout this disclosure:

In accordance with a first embodiment of the present disclosure, an encoding and a decoding arrangement/method for a multiple-layer codec for compression of a video sequence are described, where the video sequence comprises frames comprising data from multiple data categories at a given time instance. As previously mentioned, data categories can be data pertaining to, by way of example and not of limitation, views, low and/or high frequency information from the views, and/or depth-maps.

Figure 11:
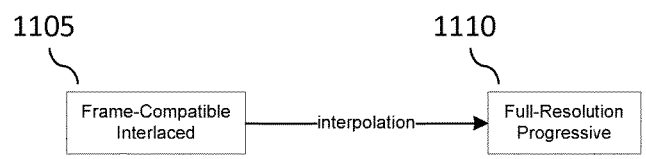
FIGS. 11-15 depict example block diagrams according to various embodiments of the present disclosure.

FIG. 11 depicts an example block diagram in accordance with the first embodiment. In the encoding and decoding arrangement according to the first embodiment, a base layer compresses a frame-compatible interlace representation (1105) of the data categories and a first set of enhancement layers (e.g., one for each data category) yields an enhanced resolution progressive representation (1110), where the enhanced resolution can be full-resolution, of the data categories. The first set of enhancement layers may utilize, for instance, inter-layer prediction through one or more RPU elements from the base layer.

Figure 12:
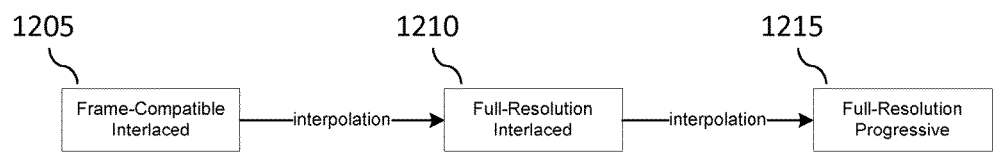

In accordance with a second embodiment of the present disclosure, an encoding and a decoding arrangement/method for a multiple-layer codec for compression of a video sequence are described, where the video sequence comprises frames comprising data from multiple data categories at a given time instance. FIG. 12 depicts an example block diagram in accordance with the second embodiment. In the encoding and decoding arrangement according to the second embodiment, a base layer compresses a frame-compatible interlace representation (1205) of the data categories, a first set of enhancement layers (e.g., one for each category of data) yields an enhanced resolution interlace representation (1210) of the data categories, and a second set of enhancement layers (e.g., one for each category of data) yields an enhanced resolution progressive representation (1215) of the data categories. Enhancement layers in the second set of enhancement layers are of lower priority than enhancement layers in the first set of enhancement layers. The first set of enhancement layers may use inter-layer prediction through one or more RPU elements from the base layer. The second set of enhancement layers may utilize inter-layer prediction through one or more RPU elements from the base layer and/or the first set of enhancement layers.

It should be noted in the embodiments provided throughout the present disclosure (such as those already described above as well as those to follow), an enhanced resolution comprises a resolution that is higher than resolution in an original image (e.g., resolution of a particular view in a frame-compatible resolution). In the above case, the enhanced resolution interlaced representation (1210) can be, but need not be, at the same resolution as the enhanced resolution progressive representation (1215).

Figure 13:
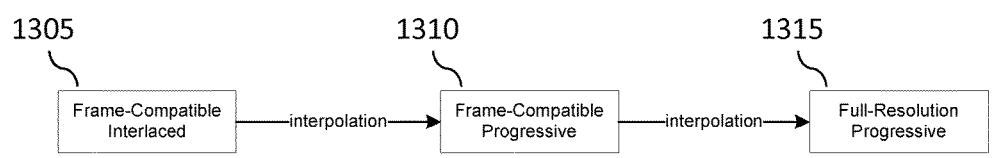

In accordance with a third embodiment of the present disclosure, an encoding and a decoding arrangement/method for a multiple-layer codec for compression of a video sequence are described, where the video sequence comprises frames comprising data from multiple data categories at a given time instance. FIG. 13 depicts an example block diagram in accordance with the third embodiment. In the encoding and decoding arrangement according to the third embodiment, a base layer compresses a frame-compatible interlace representation (1305) of the data, a first set of enhancement layers yields a frame-compatible progressive representation (1310) of the data categories, and a second set of enhancement layers yields an enhanced resolution progressive representation (1315) of the data categories. Enhancement layers in the second set of enhancement layers are of lower priority than enhancement layers in the first set of enhancement layers. The first set of enhancement layers may utilize inter-layer prediction through one or more RPU elements from the base layer. The second set of enhancement layers may utilize inter-layer prediction through one or more RPU elements from the base layer and/or the first set of enhancement layers.

Figure 14:
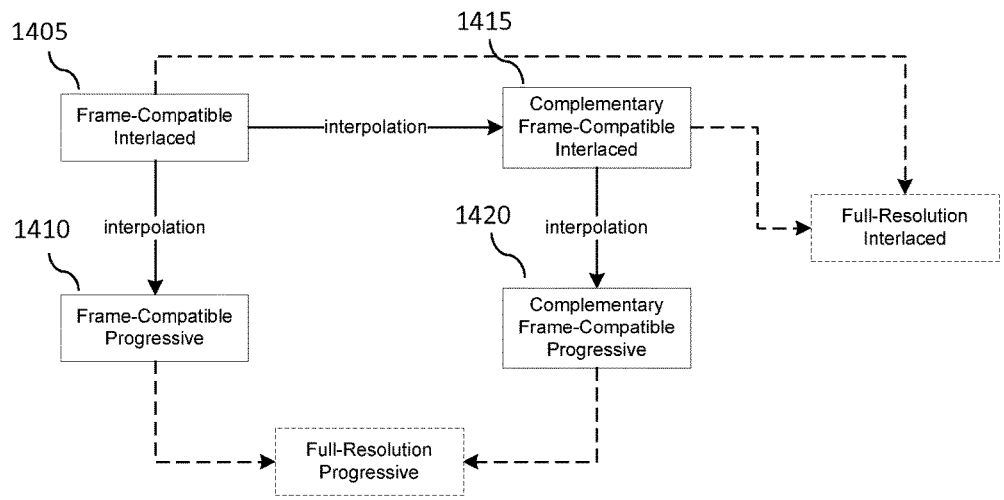

In accordance with a fourth embodiment of the present disclosure, an encoding and a decoding arrangement/method for a multiple-layer codec for compression of a video sequence are described, where the video sequence comprises frames comprising data from multiple data categories at a given time instance. FIG. 14 depicts an example block diagram in accordance with the fourth embodiment. In the encoding and decoding arrangement according to the fourth embodiment, a base layer compresses a frame-compatible interlace representation (1405) of the data categories, a first set of enhancement layers yields a frame-compatible progressive representation (1410) of the data categories, a second set of enhancement layers yields a complementary frame-compatible interlace representation (1415) of the data categories, and a third set of enhancement layers yields a complementary frame-compatible progressive representation (1420) of the data categories.

Enhancement layers in the third set of enhancement layers are of lower priority than enhancement layers in the first and second sets of enhancement layers while enhancement layers in the second set of enhancement layers are of lower priority than enhancement layers in the first set of enhancement layers. The first and second sets of enhancement layers may utilize inter-layer prediction through one or more RPU elements from the base layer. The second set of enhancement layers may also utilize inter-layer prediction through one or more RPU elements from the first set of enhancement layers. The third set of enhancement layers may utilize inter-layer prediction through one or more RPU elements from the second set of enhancement layers.

Figure 15:
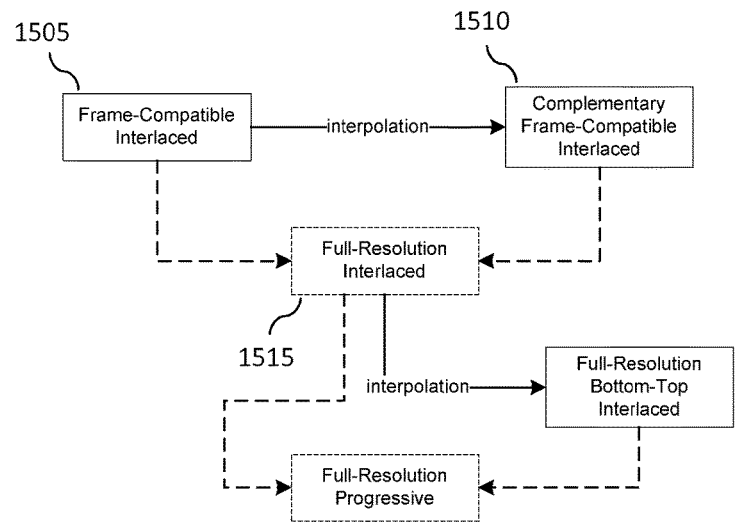

In accordance with a fifth embodiment of the present disclosure, an encoding and a decoding arrangement/method for a multiple-layer codec for compression of a video sequence are described, where the video sequence comprises frames comprising data from multiple data categories at a given time instance. FIG. 15 depicts an example block diagram in accordance with the fifth embodiment. In the encoding and decoding arrangement according to the fifth embodiment, a base layer compresses a frame-compatible interlace representation (1505) of the data, a first set of enhancement layers yields a complementary frame-compatible interlace representation (1510) of the data categories, and a second set of enhancement layers yields an enhanced resolution interlace representation (1515) of the data categories with opposite parity in terms of field ordering with respect to the base and the first set of enhancement layers (e.g., if the base layer and first set of enhancement layers utilize top-bottom, the second set of enhancement layers utilizes bottom-top). Enhancement layers in the second set of enhancement layers are of lower priority than enhancement layers in the first set of enhancement layer. The first set of enhancement layers may utilize inter-layer prediction through one or more RPU elements from the base layer. The second set of enhancement layers may utilize inter-layer prediction through one or more RPU elements from the base layer and the first set of enhancement layers.

It should be noted that, in each of the embodiments provided in the present disclosure, number of enhancement layer can be lower, higher, or the same as the number of data categories. As one example, a single data category can be provided to a base layer and upsampled to provide a second data category (without use of an enhancement layer). As another example, more than one enhancement layer can be associated with a single data category.

Detailed descriptions each of the systems and methods will now follow.

FIG. 11 depicts an example block diagram in accordance with the first embodiment. An encoding and a decoding arrangement/method for a multiple-layer codec for compression of a video sequence are described, where the video sequence comprises frames comprising data from multiple data categories at a given time instance.

According to many embodiments of the first arrangement/method, a base layer provides a frame-compatible interlace representation (1105) of multiple data categories, where a frame-compatible representation is generated through sampling and multiplexing the different data categories into a single field. Note that this field need not have the same size as that of the fields comprising the original data categories.

The base layer may be implemented and encoded using any available or future video codec such as, but not limited to, H.264/AVC, VP8, VC-1, and HEVC. Prior to inputting the data to the base layer, the data may be sampled and multiplexed as depicted, for example, in FIGS. 10A and 10B. Sampling may also comprise filtering. Furthermore, filtering can be asymmetric (e.g., yield different quality, resolution, frequency content, and so forth) between the different data categories. For example, in some embodiments, one data category may be filtered and sampled such that less than half of the information (e.g., less than half the frequency content) associated with the data category is retained. In contrast, another data category may be filtered and sampled such that more than half of the information is retained. As previously provided, FIGS. 1 through 6 provide example sampling and multiplexing arrangements for two categories of image data.

Note that for embodiments involving two data categories (e.g., two views, information pertaining to two frequency ranges, and so forth), for each frame-compatible representation of two data categories, there is also an associated complementary frame-compatible representation. A combination (e.g., multiplexing) between a frame-compatible representation and its complementary representation can yield, after processing, an enhanced resolution representation of one or both data categories.

For example, the two frame-compatible representations can be complementary in terms of sampling shifts. By way of example and not of limitation, side-by-side multiplexing may be utilized such that one frame-compatible representation retains even column samples of data category 0 and odd column samples of data category 1. Its complementary frame-compatible representation retains odd column samples of data category 0 and even column samples of data category 1. When both frame-compatible representations are available, an enhanced resolution representation (e.g., full resolution representation) of both data categories can be extracted. This example approach can be referred to as a sampling-shift-based approach.

In another example, one frame-compatible representation retains low-pass filtered coefficients (sometimes decimated by half) while its complementary representations carries filtered coefficients associated with the missing frequency information. If both representations are available, with appropriate filtering, an enhanced resolution representation (e.g., full resolution representation) can be derived. This example approach can be referred to as a frequency/filtering-based approach.

As used herein, the terms "frame-compatible" and "complementary frame-compatible" may refer to either the sampling-shift-based approach or the frequency/filtering-based approach. It should be noted that these two approaches are exemplary, and that other approaches identifiable by a person skilled in the art can be utilized with the embodiments described in the present disclosure.

With reference back to the first embodiment, aside from the base layer, a first set of additional enhancement layers can be coded. Number of the additional enhancement layers depends on number of data categories associated with frame data and data already sampled and interleaved within the base layer. Each enhancement layer is associated with one or more data category, and the enhancement layer codes information of the associated data categories for use in coding an enhanced resolution progressive representation. An input to each enhancement layer may be a pre-processed version of the enhanced resolution progressive representation for a given data category.

Figure 16:
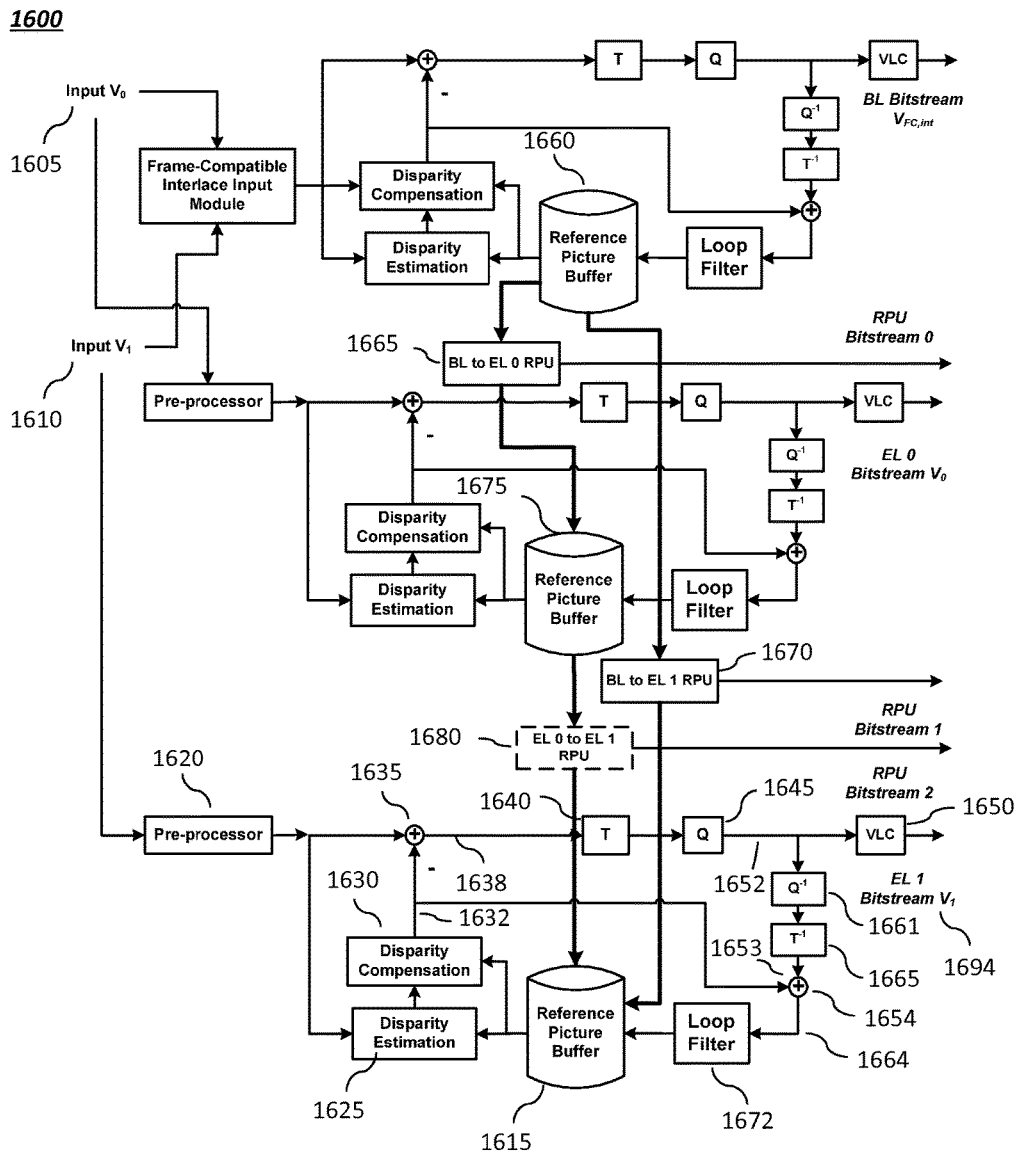
FIGS. 16-19 depict many embodiments of a multi-layer encoder and decoder.
Figure 17:
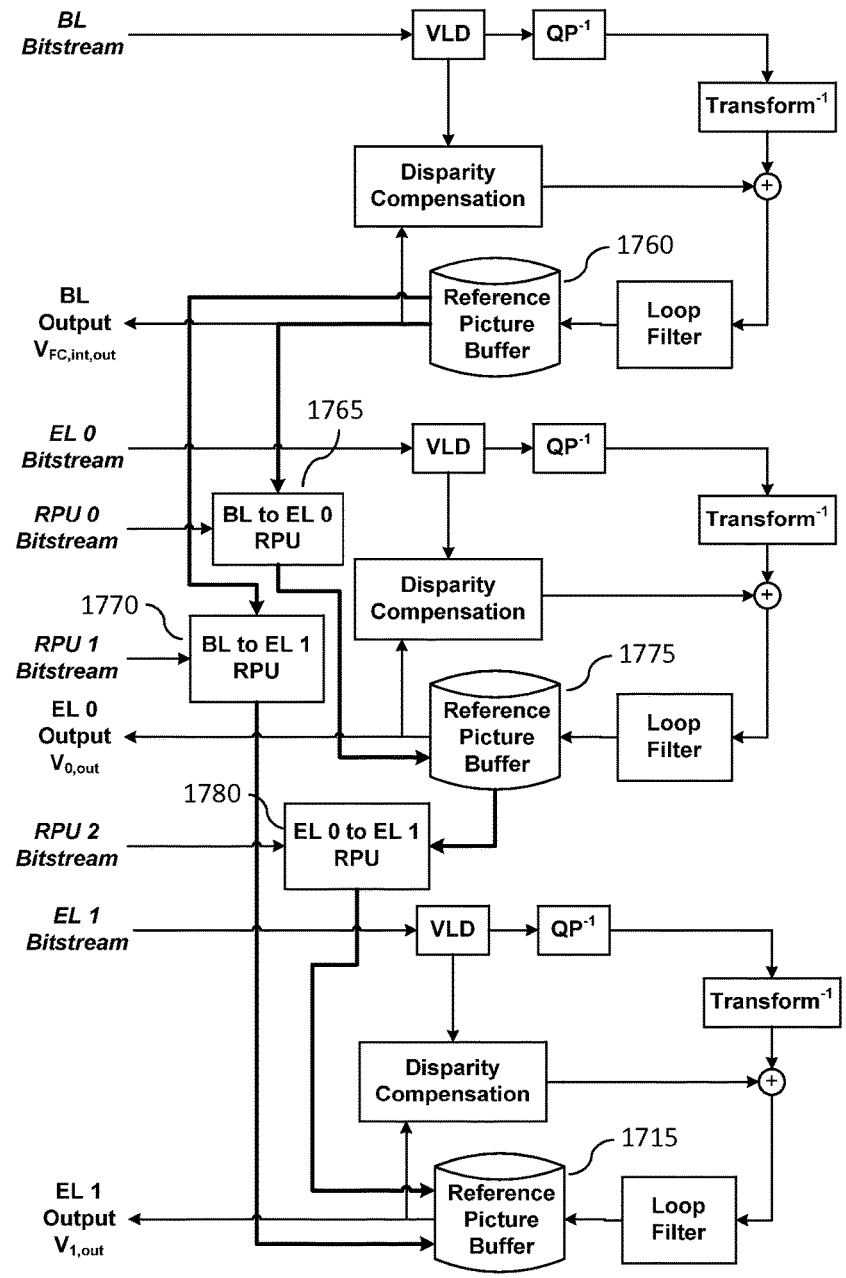

An example encoder and its associated decoder are depicted in FIG. 16 and FIG. 17, respectively. FIG. 16 depicts a multi-layer encoder (1600) that codes input data comprising two data categories $V_0$ (1605) and $V_1$ (1610). The multi-layer encoder (1600) codes a frame-compatible interlace representation of the data categories (1605, 1610) in a base layer and enhanced resolution progressive representations in a set of enhancement layers (denoted EL0 and EL1 in FIG. 17). FIG. 17 depicts a multi-layer decoder (1700) that decodes a frame-compatible interlace representation of data categories in a base layer and enhanced resolution progressive representations in a first set of enhancement layers. The decoder (1700) of FIG. 17 is configured to be utilized with the encoder (1600) of FIG. 16.

An enhancement layer can adopt a hybrid video coding model that is also found in modern video codecs such as, for instance, VC-1 and H.264/AVC. Such hybrid video coding models comprise performing prediction of a current image (or region thereof) utilizing intra prediction (e.g., spatial prediction) or inter prediction (e.g., motion-compensated or temporal prediction), generating a residual based on taking a difference (e.g., pixel-by-pixel difference) between the current image and the prediction of the current image to generate a prediction residual, transformation of the prediction residual (via, e.g., discrete cosine transform, Fourier transform, Hadamard transform, and so forth), quantization of the transformed residual, and entropy coding of the quantized transform residual. Such a coding method can also be utilized for a base layer. It should be noted that such a coding method can be utilized in each of the embodiments of the present disclosure.

For instance, with reference to FIG. 16, consider an enhancement layer EL1 encoding input data for data category $V_1$ (1610). A picture or frame at the enhancement layer EL1 can be predicted either from neighboring samples in the same picture or frame (using intra prediction) or from samples from past decoded frames (using inter prediction) that belong to the enhancement layer EL1 and can be buffered as reference pictures within a reference picture buffer (1615) for use in motion-compensated prediction. Inter-layer prediction is also possible if decoded information from higher priority layer or layers (such as the base layer) is/are available to the enhancement layer EL1 One way to have access to such information is by considering decoded pictures from the higher priority layer or layers as references on which to perform motion estimation and compensation.

As depicted in FIG. 16, based on current, optionally pre-processed (1620) by a pre-processor (1620), pictures or frames in the input data for the enhancement layer EL1 and the reference pictures, motion estimation (1625) and compensation (1630) can be performed to obtain disparity compensated prediction pictures (1632). By taking a difference (1635) between the disparity compensated prediction pictures (1632) and the pictures or frames in the input data, prediction residuals (1638) can be generated. The prediction residuals undergo transformation (1640) and quantization (1645) and such transformed and quantized coefficients (1652) can then be coded using entropy coding (1650) to generate a bitstream (1694) associated with the enhancement layer EL1 The optional pre-processing (1620) can include, but is not limited to, such processing as performing low-pass filtering, denoising, anti-aliasing, spatio-temporal filtering, deblocking (artifact removal), color correction, and gamma correction. The enhancement layer decoder, depicted in FIG. 17, reverses this process. Such coding of the current pictures or frames in the input data into one or more bitstreams also applies to each of the other layers.

Reference pictures of a given layer can be generated as follows. With continued reference to the enhancement layer EL1, the transformed and quantized coefficients (1652) can be inverse quantized (1661) and inverse transformed (1665) to generate inverse processed residuals (1653). Generally, the inverse quantization (1661) and the inverse transformation (1665) remove quantizing and transforming of the prediction residuals (1638) from the quantization (1645) and the transformation (1640) steps. Reconstructed data (e.g., reconstructed images or regions thereof) (1664) of enhancement layer EL1 can be obtained through combining (1654) the inverse processed residuals (1653) with the disparity compensated prediction pictures (1632). The reconstructed data (1664) can then be, but need not be, loop filtered (1672), which can include one or more of deblocking filtering, denoising filtering, Wiener filtering, and explicit filtering, among others.

Note that such operations also apply to enhancement layer EL0, also depicted in FIG. 16, as well as different sets of enhancement layers (e.g., associated with frame-compatible versus progressive representation, associated with frame-compatible interlace versus complementary frame-compatible interlace representation, and so forth) in general, as provided in the present disclosure.

With continued reference to FIGS. 16 and 17, the enhancement layers EL0 and EL1 may benefit from additional motion compensated prediction references generated from reference pictures stored in a reference picture buffer (1660 in FIG. 16, 1760 in FIG. 17) of the base layer using reference processing units (RPUs) (1665 and 1670 in FIGS. 16, 1765 and 1770 in FIG. 17). Each RPU (1665 and 1670 in FIGS. 16, 1765 and 1770 in FIG. 17) takes an input from the base layer reference picture buffer (1660 in FIG. 16, 1760 in FIG. 17) and processes the input in order to estimate the data category associated with the enhancement layer to whose reference picture buffer (1615 and 1675 in FIGS. 16, 1715 and 1775 in FIG. 17) the RPU (1665 and 1670 in FIGS. 16, 1765 and 1770 in FIG. 17) stores its output.

In the first embodiment, a frame-compatible interlace representation of the data categories can be processed (e.g., through interpolation) to yield an estimate of an enhanced resolution progressive representation. The RPU (1665 and 1670 in FIGS. 16, 1765 and 1770 in FIG. 17) takes as input data comprising frame-compatible decoded pictures from the reference picture buffer (1615 and 1675 in FIGS. 16, 1715 and 1775 in FIG. 17) of a given layer, and then de-multiplexes and up-samples the input data to estimate the enhanced resolution progressive representation of the pictures or frames belonging to different data categories. Additionally, the RPU (1665 and 1670 in FIGS. 16, 1765 and 1770 in FIG. 17) may perform such processes including, but not limited to, filtering, upscaling, de-interlacing, interpolation of missing samples, as well as recovery and/or estimation of frequency content, among other operations. Recovery and/or estimation of frequency content may be performed when the base layer primarily codes specific frequency content (e.g., low frequencies) while coding to a lesser extent (or disregarding) other frequency content.

The RPUs (1665 and 1670 in FIG. 16) at the encoder generate information on techniques used for prediction, up-sampling, and so forth, and communicate this information to the corresponding RPUs (1765 and 1770 in FIG. 17) located at the decoder so that the encoder prediction operation may be duplicated at the decoder. Example interpolation and prediction techniques (among others) used by an RPU may comprise techniques provided, for example, in reference [5], which is incorporated herein by reference in its entirety.

In an additional embodiment, inter-layer prediction can be performed within a first set of enhancement layers comprising EL0 and EL1. An RPU may generate a reference picture that predicts the enhanced resolution progressive representation of one data category (e.g., $V_0$) using decoded frames from the reference picture buffer (1615 and 1675 in FIGS. 16, 1715 and 1775 in FIG. 17) of another category (e.g., $V_1$). Such an embodiment for two data categories is depicted as an EL0 to EL1 RPU (1680 in FIG. 16, 1780 in FIG. 17). Such an RPU (1680 in FIG. 16, 1780 in FIG. 17) can be configured to estimate data of one data category from the other data category. Techniques for estimation of such data can involve higher-order motion model motion and disparity compensation.

In another additional embodiment, the first set of enhancement layers comprising EL0 and EL1 can code each data category at a resolution (that can be referred to as an enhancement or enhanced resolution) that may be lower than full resolution (as opposed to equal to the full resolution). In such a case, additional up-samplers and/or RPU modules (that may also perform up-sampling) may be utilized at the decoder side to derive full-resolution reconstruction for each data category from the data categories at the enhanced resolution. Furthermore, the resolution may be different for each data category.

In a further embodiment, each of the multiple reference picture buffers (1615, 1660, and 1675 in FIGS. 16; 1715, 1770, and 1775 in FIG. 17) in the encoder (1600 in FIG. 16) and decoder (1700 in FIG. 17) system may be controlled using memory management control operations (MMCO) such as those defined in reference [1] or operations in future coding standards (e.g., HEVC). These MMCO operations can control how reference pictures are added, removed, and/or ordered in the reference picture buffers (1615, 1660, and 1675 in FIGS. 16; 1715, 1770, and 1775 in FIG. 17). In general, the MMCO operations are generated at a base layer and then utilized in the later coded layers (e.g., one or more sets of enhancement layers).

In the case that MMCO operations are transmitted for the enhancement layer or layers, signaled information sets corresponding to each reference picture buffer (1615, 1660, and 1675 in FIGS. 16; 1715, 1770, and 1775 in FIG. 17) may be the same, or one set of operations can be signaled that applies to each of the reference picture buffers (1615, 1660, and 1675 in FIGS. 16; 1715, 1770, and 1775 in FIG. 17). This can allow operation of the reference picture buffers (1615, 1660, and 1675 in FIGS. 16; 1715, 1770, and 1775 in FIG. 17) to remain synchronized. Such synchronization can exist with respect to reference picture list modification/reordering signaling, such as, but not limited to, methods defined in reference [1]. This signaling information controls generation of reference picture lists that point to the reference pictures in the reference picture buffers (1615, 1660, and 1675 in FIGS. 16; 1715, 1770, and 1775 in FIG. 17). These reference picture lists are then used during prediction. Alternatively, a single set can be transmitted that applies to all reference picture lists of the enhancement layers.

Note that such signaling can be applied to any codec utilizing signaling for controlling the content of the reference picture buffers (1615, 1660, and 1675 in FIGS. 16; 1715, 1770, and 1775 in FIG. 17) and signaling for controlling initialization and modification of reference picture lists.

Figure 18:
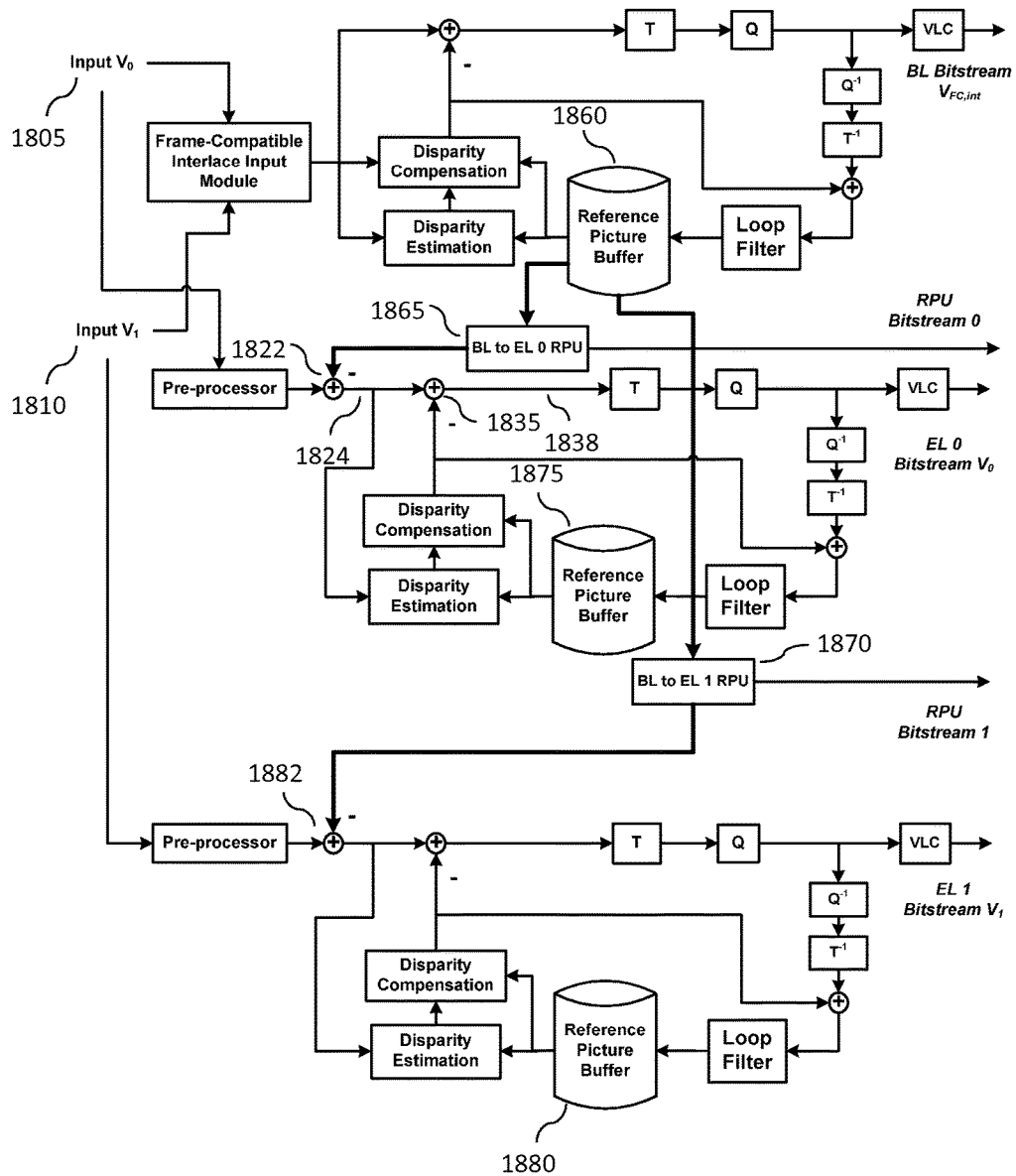
Figure 19:
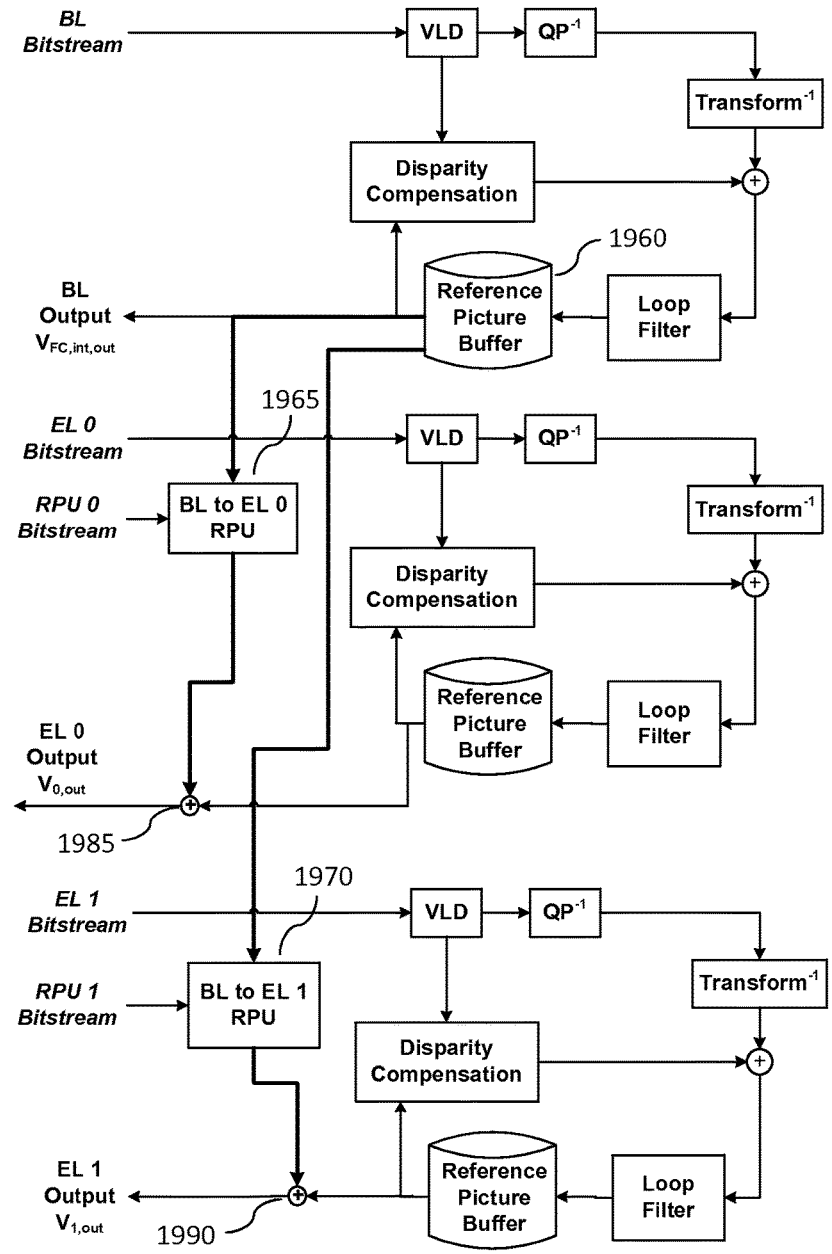

According to another embodiment of the first arrangement/method, where the same input and output from each layer is retained relative to the previous embodiment of the first method, the enhancement layers EL0 and EL1 can be operated differently relative to the previous embodiment. FIGS. 18 and 19 depict an example multi-layered encoder (1800) and decoder (1900), respectively, involving two data categories. Base layer to enhancement layer RPUs (1865 and 1870 in FIGS. 18, 1965 and 1970 in FIG. 19) can be utilized to process decoded pictures in a base layer reference picture buffer (1860 in FIG. 18, 1960 in FIG. 19) and yield an estimated picture of an enhanced resolution progressive representation for each data category.

However, instead of storing these predicted pictures into the reference picture buffers (1875, 1880) of each first set enhancement layer, these prediction pictures are subtracted (1822, 1882) from the, optionally pre-processed, enhanced resolution progressive representation input of each data category. The enhancement layers are thus coding prediction residuals (difference signals) instead of the data category content itself. Specifically, the multi-layer encoder (1800) codes a frame-compatible interlace representation of data categories $V_0$ (1805) and $V_1$ (1810) in a base layer and enhanced resolution progressive representations in enhancement layers EL0 and EL1 using residuals. Optionally, difference signals/residuals (e.g., 1824, 1838) resulting from each difference (e.g., 1822, 1835) may be offset and/or clipped to allow proper operation in enhancement layer encoders (e.g., due to potential negative values and/or other values not necessarily supported by the enhancement layer encoders).

FIG. 19 depicts a multi-layer decoder (1900) that decodes the frame-compatible interlace representation of the data categories in the base layer and the enhanced resolution progressive representations in the enhancement layers EL0 and EL1 using residuals. The decoder (1900) of FIG. 19 adds (1985, 1990) RPU prediction signals from the RPUs (1965, 1970) to the enhancement layer output in order to derive the enhanced resolution progressive representation of the data category associated with the enhancement layer.

Features related to the memory management control operations and spatial scalability are also applicable to this embodiment of the first arrangement/method.

In yet another embodiment of the first arrangement/method, the base layer operation and input from the previous embodiments can be retained while the multiple enhancement layers, one for each data category, can be replaced with a single enhancement layer that codes a frame-compatible enhanced resolution representation of all data categories. Other numbers of enhancement layers can also be utilized.

Figure 20:
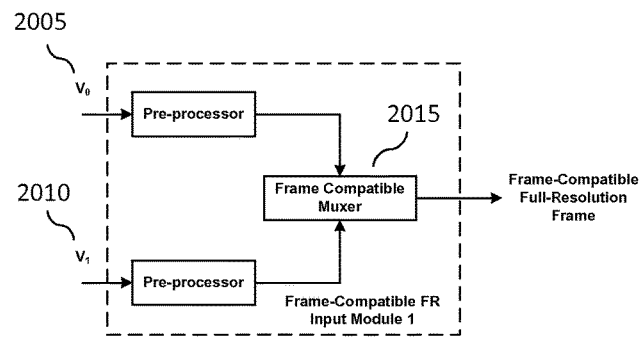
FIG. 20 depicts an example system/method for derivation of an input to the enhancement layer.

FIG. 20 depicts an example system/method for derivation of an input to the enhancement layer for two data categories $V_0$ (2005) and $V_1$ (2010). Generally, enhanced resolution frames belonging to different data categories (2005, 2010) may be multiplexed (e.g., without decimation) by a multiplexer (2015) into a packaged frame. Pre-processing (e.g., filtering to reduce aliasing, denoising, low-pass filtering, and so forth) can be performed depending on type of frame-compatible interleaving (e.g., side-by-side, line-based, over-under, etc.) and depending on sampling type. Data can also be copied without pre-processing. Note that a frame-compatible packaging arrangement for the enhancement layer need not correspond to the frame-compatible packaging arrangement of the base layer.

Figure 21:
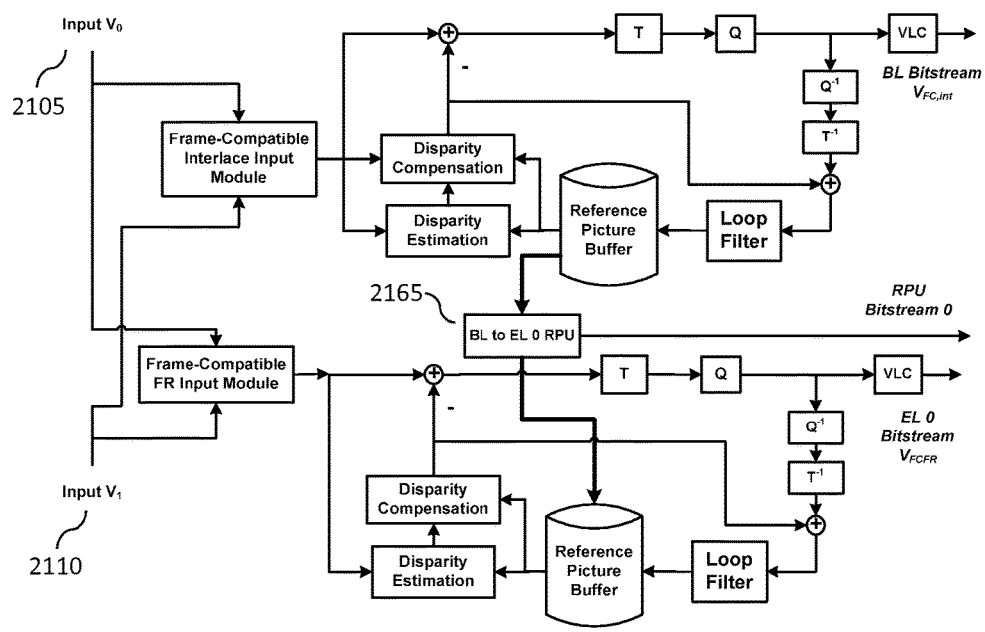
FIGS. 21 and 22 depict another embodiment of a multi-layer encoder and a multi-layer decoder.
Figure 22:
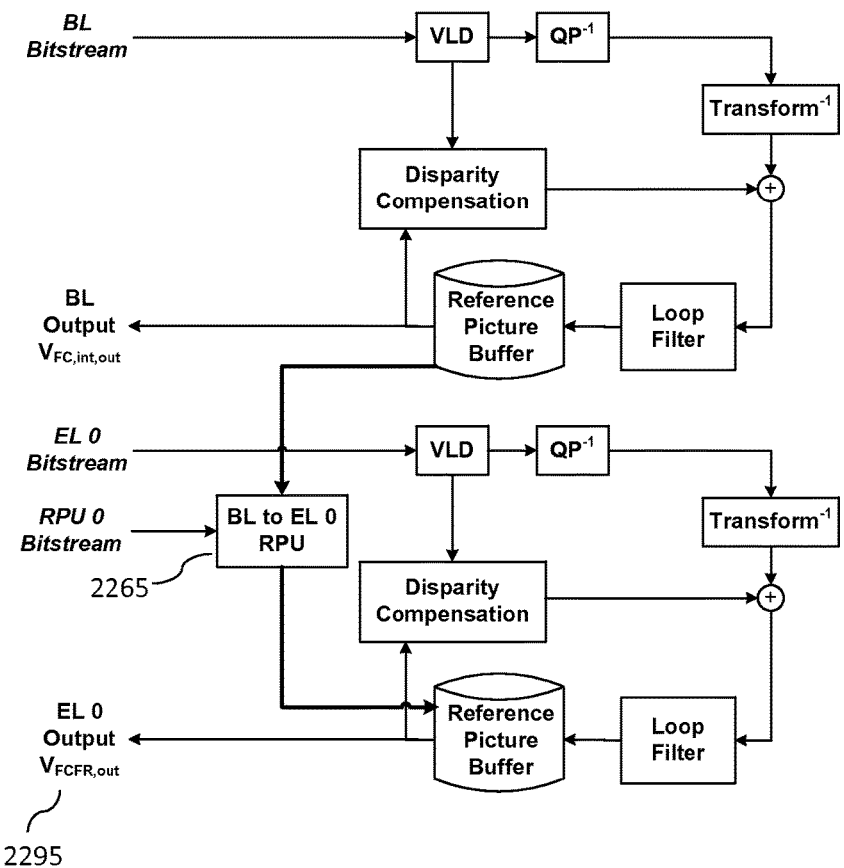

FIGS. 21 and 22 depict an example multi-layer encoder (2100) and a multi-layer decoder (2200) according to this embodiment. Specifically, FIG. 21 depicts a multi-layer encoder (2100) that codes a frame-compatible interlace representation in the base layer and enhanced resolution progressive representations in the single enhancement layer as a single frame. Similarly, FIG. 22 depicts a multi-layer decoder (2200) that decodes the frame-compatible interlace representation in the base layer and the enhanced resolution progressive representations in the single enhancement layer packed as a single frame. It should be noted that both data categories $V_0$ (2105 in FIG. 21) and $V_1$ (2110 in FIG. 21) are provided to the single enhancement layer and an output (2295 in FIG. 22) of the single enhancement layer comprising a single frame with both data categories.

Operation of an RPU (2165 in FIG. 21, 2265 in FIG. 22) differs from previously described embodiments of the first method. An input to the RPUs (2165 in FIG. 21, 2265 in FIG. 22) contains frame-compatible interlace data from all data categories. Using this frame-compatible interlace data, the RPUs (2165 in FIG. 21, 2265 in FIG. 22) can be used to predict a frame-compatible enhanced resolution representation of each of the data categories. For instance, prediction of a frame-compatible full resolution representation of each of the data categories may be performed. The RPUs (2165 in FIG. 21, 2265 in FIG. 22), apart from de-interlacing, takes into consideration different frame-compatible arrangements that may have been used for each layer (e.g., the base layer and the enhancement layer). As previously provided, each of the enhanced resolutions can be, but need not be, of the same resolution as one another. Specifically, in the above case, the enhanced resolutions associated with the representations of the data categories can be, but need not be the same.

In one case, the same frame-compatible arrangements are used for both layers. The RPUs (2165 in FIG. 21, 2265 in FIG. 22) can utilize up-sampling techniques used for spatial scalability applications.

In another case, different frame-compatible arrangements can be used for each layer. The RPUs (2165 in FIG. 21, 2265 in FIG. 22) may rearrange a base layer reference picture to match the arrangement used in the enhancement layer and then up-sample the newly arranged data to predict data in the enhancement layer.

Although FIG. 22 depicts an output of the enhancement layer decoder as a frame comprising all data categories, a de-multiplexer can be added at the output of the enhancement layer decoder to separate each data category into a separate frame ready for additional processing and/or display.

Features related to the memory management control operations and spatial scalability are also applicable to this embodiment of the first method.

FIG. 12 depicts an example block diagram in accordance with the second embodiment. An encoding and a decoding arrangement/method for a multiple-layer codec for compression of a video sequence are described, where the video sequence comprises frames comprising data from multiple data categories at a given time instance. Base layer architecture utilized with the first arrangement/method, depicted in FIG. 11, can also be utilized in the second method. Differences can be found in enhancement layer architecture between the first and second arrangements/methods.

Figure 23:
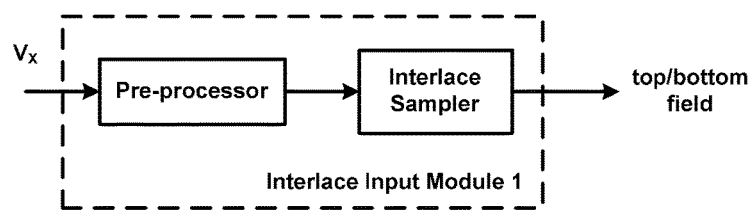
FIG. 23 depicts an example input module for preparing an interlace representation.

A first set of enhancement layers can be utilized to encode enhanced resolution interlace representations of each data category. In general, one enhancement layer can be associated with one data category. FIG. 23 depicts an example input module for preparing an interlace representation. Specifically, the input module takes as input a progressive representation of a data category and can be configured to output a top/bottom field at time instances 2n and a bottom/top field at time instances 2n+1. Note that, at a given time instance, an input to each first set enhancement layer need not have the same field parity. In some cases, opposite parity may be desirable. For instance, stereo visual masking can aid in increasing perceptual resolution when opposite parity is utilized.

As used herein, the term "parity" may refer to whether a field is a top field or a bottom field. In a case of opposite parity, one view can be coded as top/bottom while another view can be coded as bottom/top. Thus, in the example above, at time instances 2n, a left view can code a top field while a right view can code a bottom field, and vice versa at time instances 2n+1.

Figure 24:
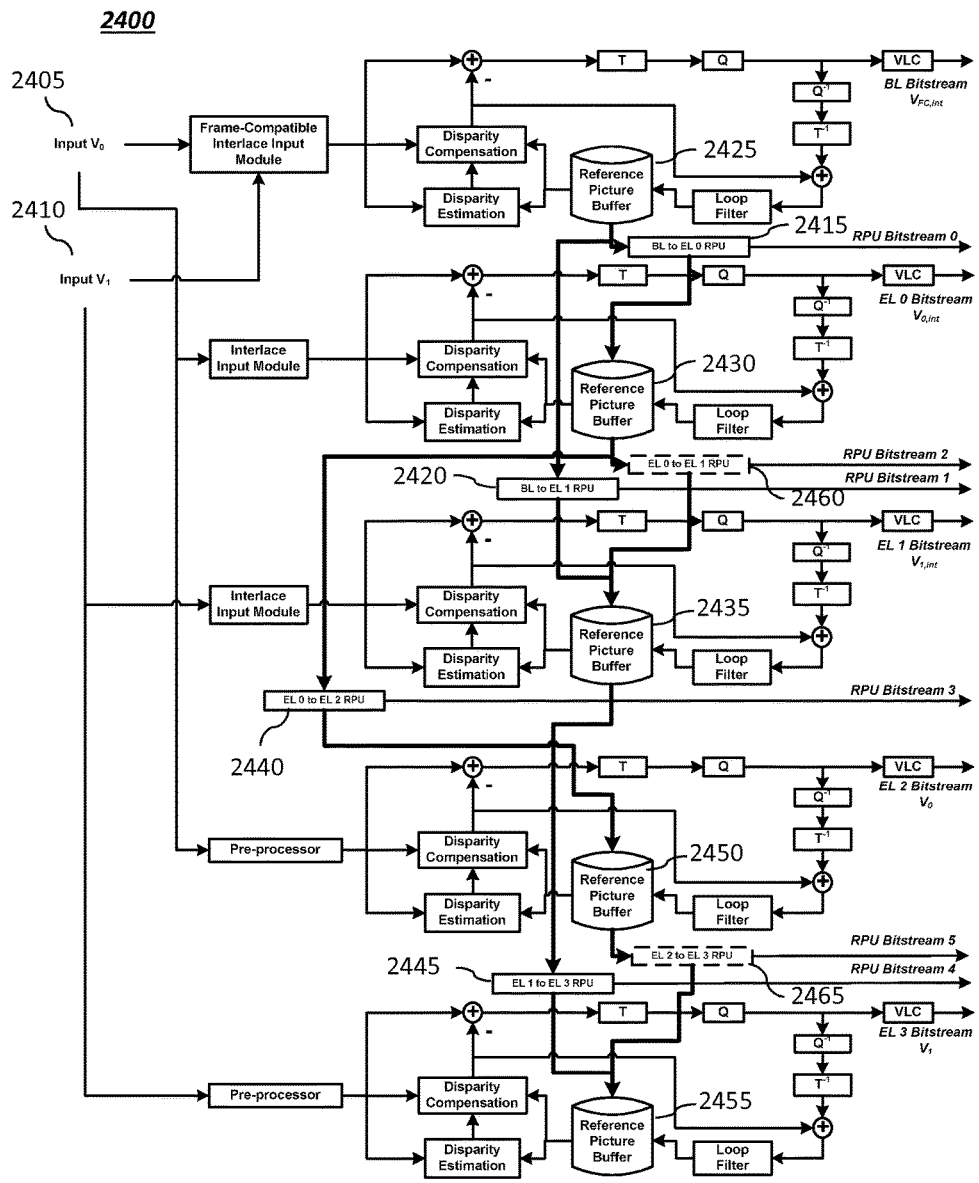
FIGS. 24 and 25 depict another embodiment of a multi-layer encoder and a multi-layer decoder.
Figure 25:
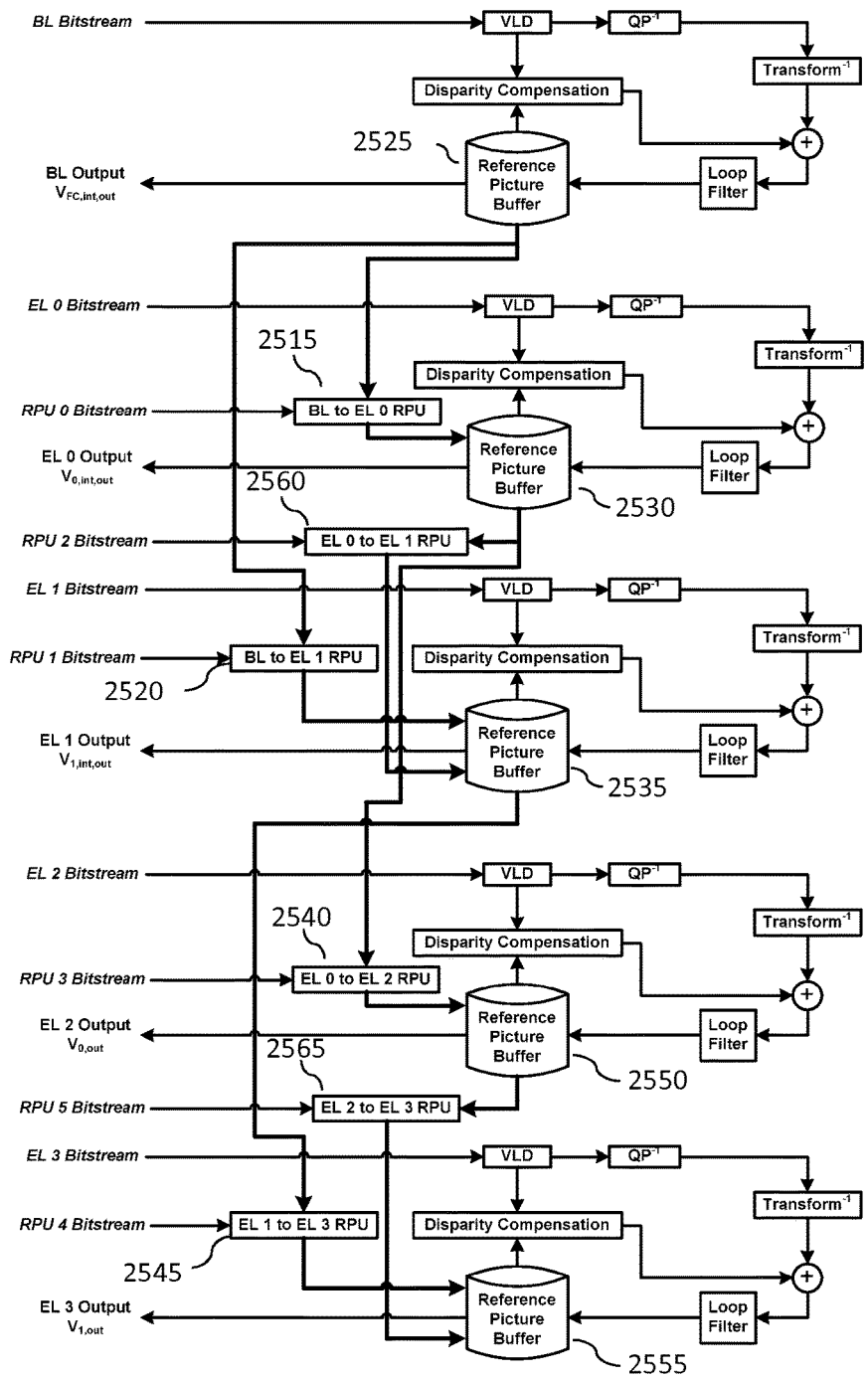

FIGS. 24 and 25 depict an embodiment of a multi-layer encoder (2400) and a multi-layer decoder (2500) for two data categories $V_0$ (2405) and $V_1$ (2410). Specifically, the encoder (2400) of FIG. 24 codes a frame-compatible interlace representation in a base layer, enhanced resolution interlace representations in a first set of enhancement layers, and enhanced resolution progressive representations in a second set of enhancement layers. The decoder (2500) of FIG. 25 can be configured to decode information coded by the encoder (2400) of FIG. 24. One enhancement layer can be associated with one data category. An input to each layer (e.g., base layer and enhancement layers) may be pre-processed.

It should be noted that resolution of one enhanced resolution interlace representation can be, but need not be, the same as resolution of another enhanced resolution interlace representation and similarly resolutions between different enhanced resolution progressive representations can be, but need not be, the same. Similarly, resolutions associated with the enhanced resolution interlace representations can be, but need not be, the same as resolutions associated with the enhanced resolution progressive representations.

The first set of enhancement layers is designated as EL0 and EL1 This first set of enhancement layers may benefit from inter-layer prediction from the base layer. The inter-prediction may be performed by using RPUs (2415, 2420) to predict and store additional enhanced resolution fields in reference picture buffers (2430, 2435) of the first set enhancement layers using as input frame-compatible fields stored in a reference picture buffer (2425) of the base layer. One such RPU (2415, 2420) can be associated with one first set enhancement layer. It should be noted again that field type/parity at the enhancement layer being predicted and the field type/parity at the base layer at a given time instance may differ. The RPUs (2415, 2420) take into account such parities and can be configured to properly interpolate samples of the opposite parity. Additionally, it should be noted that corresponding reference picture buffers (2525, 2530, 2535) and RPUs (2515, 2520) can be found in the decoder of FIG. 25.

A second set of enhancement layers encodes an enhanced resolution progressive representation of each data category. The second set of enhancement layers is designated in FIG. 24 and FIG. 25 as EL2 and EL3. This second set of enhancement layers may benefit from inter-layer prediction from the first set of enhancement layers. This may be done by using RPUs (2440, 2445) to predict and store additional enhanced resolution progressive frames in reference picture buffers (2450, 2455) of the second set enhancement layers using as input enhanced resolution fields stored in the reference picture buffers (2430, 2435) of the first set enhancement layers associated with the same data category. One such RPU module (2440, 2445) can be associated with each second set enhancement layer. The RPUs (2440, 2445) can perform processing such as de-interlacing, resampling, interpolating, and inpainting, among others, which can consider multiple previously coded fields in the first group enhancement layer reference picture buffers (2430, 2435). Corresponding RPUs (2540, 2545) and reference picture buffers (2530, 2535, 2550, 2555) can also be present in the decoder (2500) of FIG. 25.

In an additional embodiment, inter-layer prediction can be performed between enhancement layers among the first set enhancement layers. As depicted in FIG. 24, an RPU (2460) between EL0 and EL1 may be used to predict and store additional fields in the reference picture buffer of EL1 (2435) from fields (even if of opposite parity) stored in the reference picture buffer of EL0 (2430). Similarly, although not depicted, an RPU can be placed between EL1 and EL0 such that EL1 can utilize information from EL0 for inter-prediction. In general, a first set enhancement layer can predict and store additional fields based on fields in other first set enhancement layers. These RPUs (e.g., 2460) may benefit from higher-order motion model and disparity compensation techniques, among others. A corresponding EL0 to EL1 RPU (2560) can also be present in the decoder (2500) of FIG. 25.

In an additional embodiment, inter-layer prediction can be performed between second set enhancement layers. As depicted in FIG. 24, an RPU (2465) between EL3 and EL2 may be used to predict and store additional fields in the reference picture buffer of EL3 (2455) from fields (even if of opposite parity) stored in the reference picture buffer of EL2 (2450). Similarly, although not depicted, an RPU can be placed between EL3 and EL2 such that EL2 can utilize information from EL3 for inter-prediction. In general, a second set enhancement layer can predict and store additional fields based on fields in other second group enhancement layers. These RPUs (e.g., 2465) may benefit from higher-order motion model and disparity compensation techniques, among others. A corresponding EL2 to EL3 RPU (2565) can also be present in the decoder (2500) of FIG. 25.

Additional embodiments are also possible through combinations of the various embodiments of the first method. More specifically, either or both of the first and second set enhancement layers can encode prediction residuals by redirecting outputs of the RPUs (2415, 2420, 2440, 2445, 2460, 2465 in FIG. 24; 2515, 2520, 2540, 2545, 2560, 2565 in FIG. 25). Alternatively, either or both of the first and second set enhancement layers can be replaced with a single layer that codes all data categories in each set as a single frame.

Features related to the memory management control operations and spatial scalability are also applicable the various embodiments of the second method.

FIG. 13 depicts an example block diagram in accordance with a third embodiment. An encoding and a decoding arrangement/method for a multiple-layer codec for compression of a video sequence are described, where the video sequence comprises frames comprising data from multiple data categories at a given time instance. Base layer architecture utilized in the previous methods can also be utilized in the third method. Differences can be found in enhancement layer architecture between the third method and the first and second methods previously described.

Figure 26:
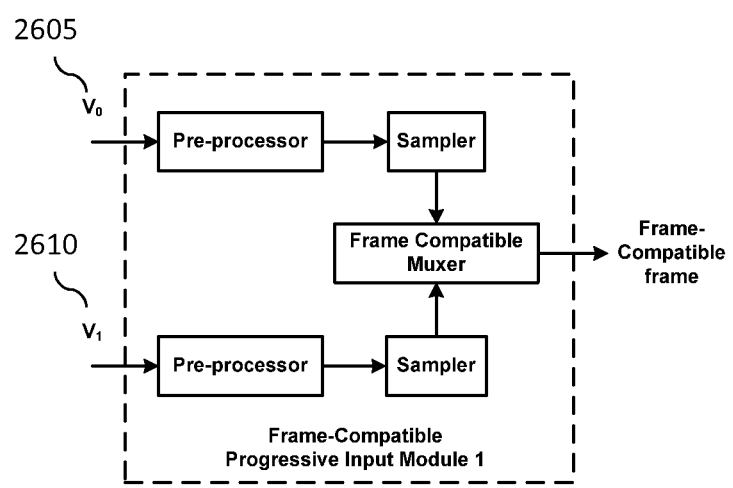
FIG. 26 depicts an example input module for preparing a frame-compatible progressive representation.

A first set of enhancement layers may encode a frame-compatible progressive representation of all data categories. FIG. 26 depicts an example input module for preparing such a frame-compatible progressive representation. Specifically, the input module takes as input enhanced resolution progressive representations of two data categories $V_0$ (2605) and $V_1$ (2610) and can be configured to output a frame compatible progressive representation including both data categories (2605, 2610).

Figure 27:
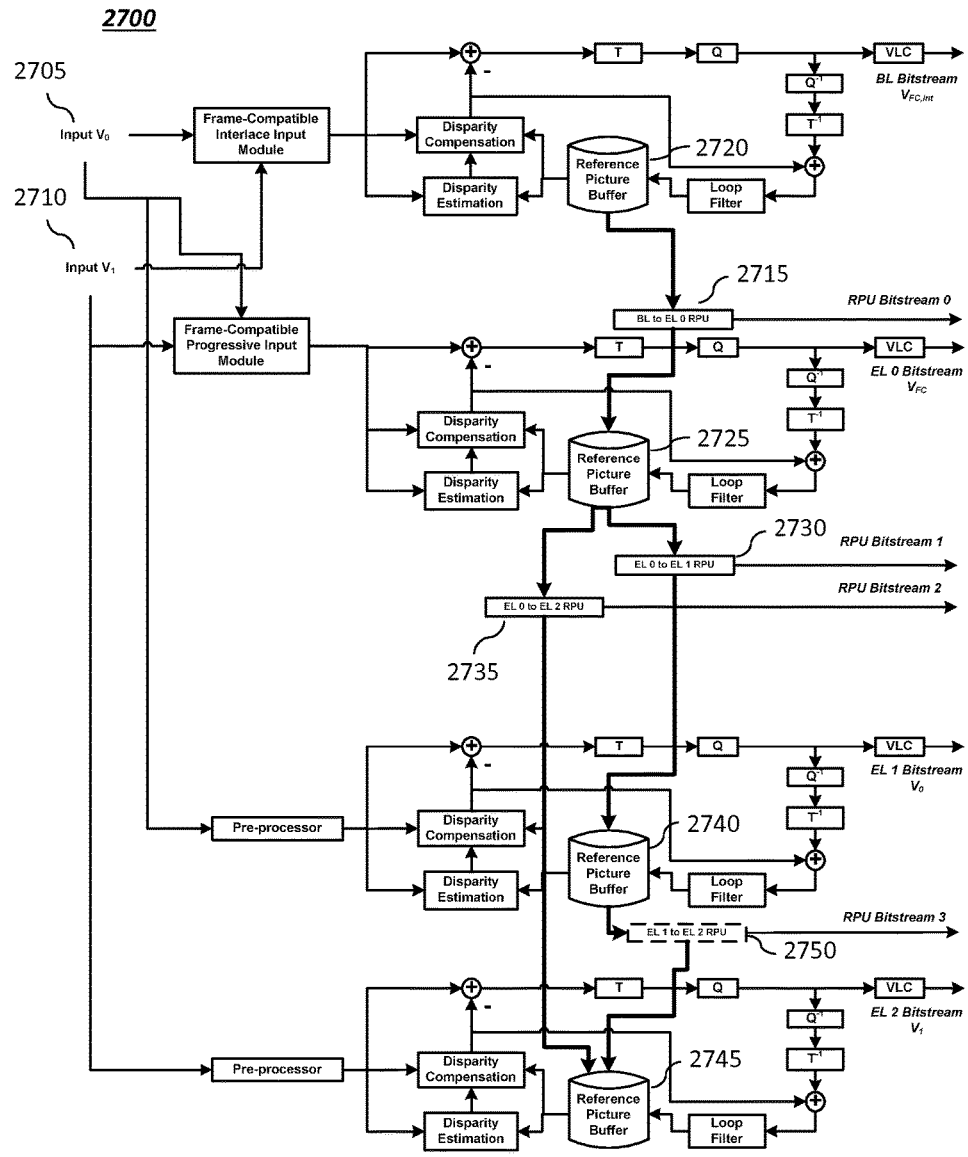
FIGS. 27-32 depict example embodiments of a multi-layer encoder and a multi-layer decoder.
Figure 28:
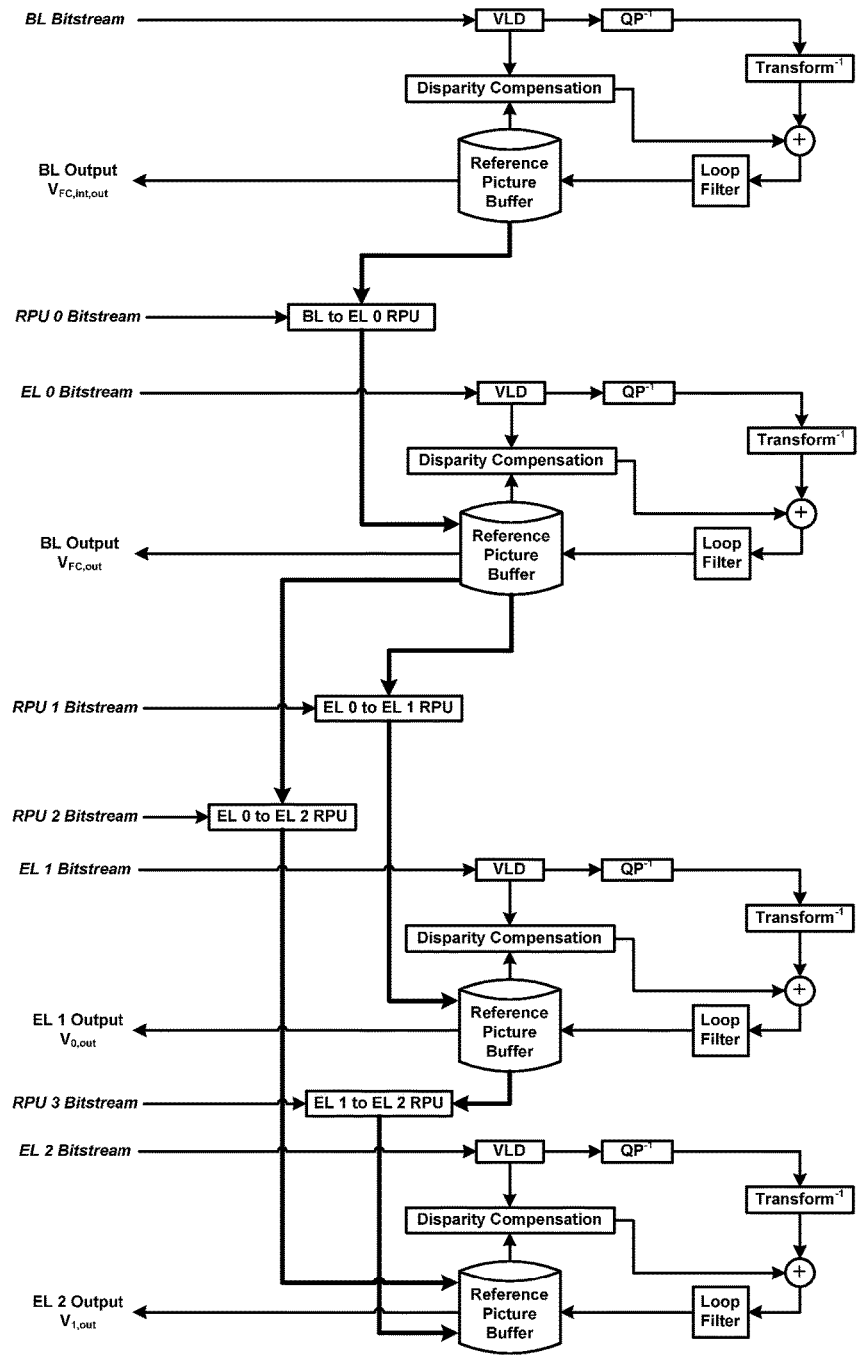

FIGS. 27 and 28 depict an embodiment of a multi-layer encoder (2700) and a multi-layer decoder (2800) for two data categories $V_0$ (2705) and $V_1$ (2710). In FIGS. 27 and 28, the first set of enhancement layers comprises a single enhancement layer designated as EL0. This first set enhancement layer may benefit from inter-layer prediction from the base layer. The inter-layer prediction may be performed by using an RPU (2715) to predict and store additional frame-compatible frames in a reference picture buffer (2725) of the first set enhancement layer using as input frame-compatible fields stored in a reference picture buffer (2720) of the base layer. Since frame-compatible progressive representations are predicted from frame-compatible interlace representations, the RPU (2715) may perform such processes including, but not limited to, filtering, upscaling, de-interlacing, interpolation of missing samples, as well as recovery and/or estimation of frequency content, among other operations.

A second set of enhancement layers encodes an enhanced resolution progressive representation of each data category. Each enhancement layer in the second set can be associated with one data category. An input to each layer may be pre-processed. The second set of enhancement layers is designated EL1 and EL2. The second set of enhancement layers may benefit from inter-layer prediction from the first set enhancement layer. The inter-prediction may be performed by using RPUs (2730, 2735) to predict and store additional enhanced resolution progressive frames in reference picture buffers (2740, 2745) of the second set enhancement layers using as input frame-compatible progressive frames stored in the reference picture buffer (2725) of the first set enhancement layer. Each second set enhancement layer is associated with one such RPU (2730, 2735).

In an additional embodiment, inter-layer prediction can be performed between enhancement layers among the second set enhancement layers. As depicted in FIG. 27, an RPU (2750) between EL1 and EL2 may be used to predict and store additional frames in the reference picture buffer of EL2 (2745) from frames stored in the reference picture buffer of EL1 (2740). Similarly, although not depicted, an RPU can be placed between EL2 and EL1 such that EL1 can utilize information from EL2 for inter-prediction. These RPUs (e.g., 2750) may benefit from higher-order motion model and disparity compensation techniques, among others.

It should be noted that corresponding reference picture buffers and RPUs are depicted in the decoder of FIG. 28.

Additional embodiments are also possible through combinations of the various embodiments of the first and second arrangements/methods with the third arrangement/method. More specifically, the second set enhancement layers can encode prediction residuals by redirecting outputs of the RPUs (2715, 2730, 2735, 2750). Alternatively, the second set enhancement layers can be replaced with a single layer that codes all data categories as a single frame or as multiple layers where each layer codes one or more data categories.

Further embodiments may involve combinations the third arrangement/method with the teachings of U.S. Provisional Application No. 61/366,512, entitled "Systems and Methods for Multi-Layered Frame-Compatible Video Delivery", filed on Jul. 21, 2010. More specifically, the first enhancement layer can adopt multiple internal reference picture buffers, one for each data category. This generally increases number of RPUs that can be utilized for inter-layer prediction. Furthermore, disparity compensation in the enhancement layer can either take place at a resolution of the reference picture buffers or at a resolution and format of the frame-compatible input to the enhancement layer.

Features related to the memory management control operations and spatial scalability are also applicable to the various embodiments of the third method.

FIG. 14 depicts an example block diagram in accordance with the fourth embodiment. An encoding and a decoding arrangement for a multiple-layer codec for compression of a video sequence are described, where the video sequence comprises frames comprising data from multiple data categories at a given time instance. Base layer architecture utilized in the previous methods can also be utilized in the fourth method. Differences can be found in enhancement layer architecture between the fourth method and the previously described methods.

A first set of enhancement layers encodes a frame-compatible progressive representation of all data categories. The example input module depicted in FIG. 26 can be utilized to prepare the frame-compatible representation.

Figure 29:
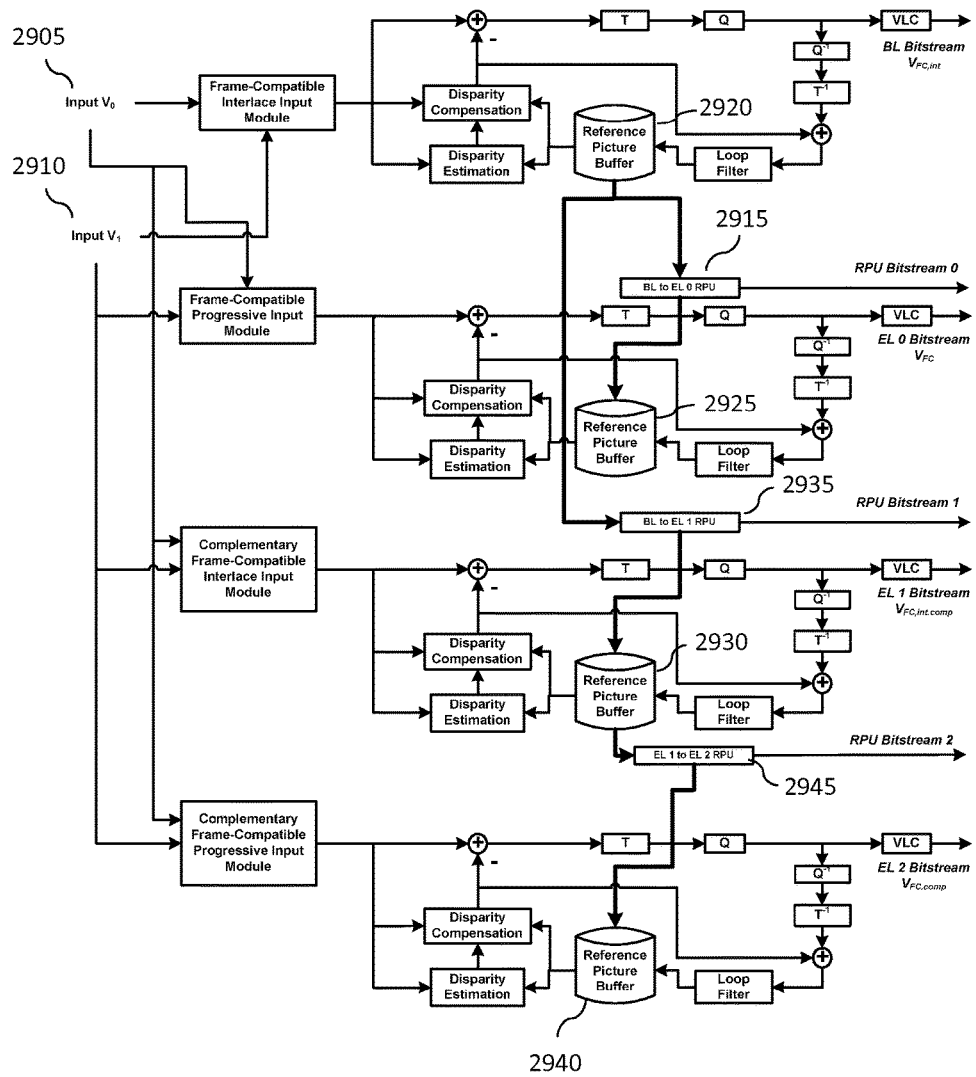
Figure 30:
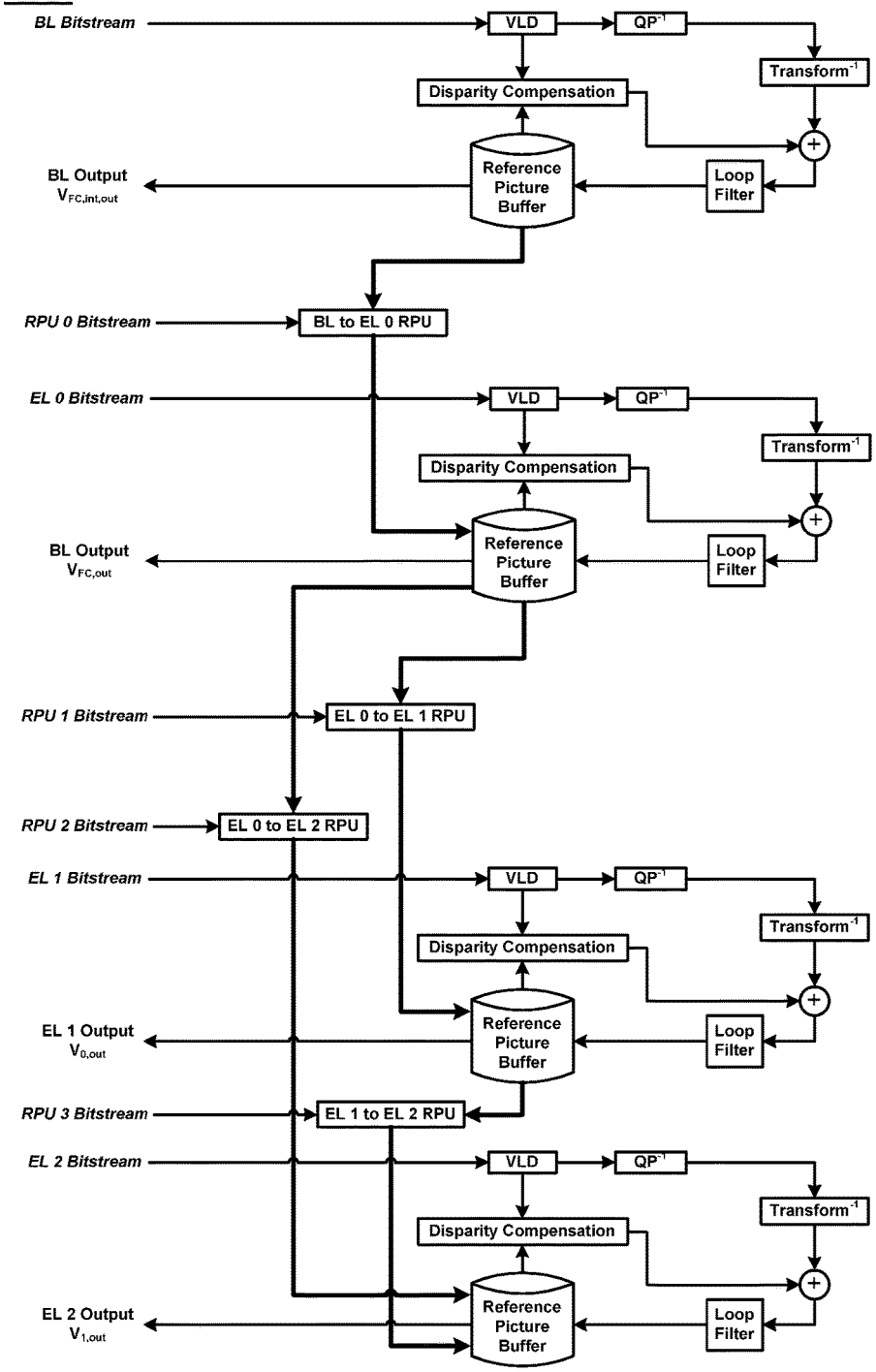

FIGS. 29 and 30 depict an embodiment of a multi-layer encoder (2900) and a multi-layer decoder (3000) for two data categories $V_0$ (2905) and $V_1$ (2910). In FIGS. 29 and 30, the first set of enhancement layers comprises a single enhancement layer designated as EL0. This first set enhancement layer may benefit from inter-layer prediction from the base layer. The inter-layer prediction may be performed by using an RPU (2915) to predict and store additional frame-compatible frames in a reference picture buffer (2925) of the first set enhancement layer using as input frame-compatible fields stored in a reference picture buffer (2920) of the base layer. Since frame-compatible progressive representations are predicted from frame-compatible interlace representations, the RPU (2915) may perform such processes including, but not limited to, filtering, upscaling, de-interlacing, interpolation of missing samples, as well as recovery and/or estimation of frequency content, among other operations.

A second set of enhancement layers encodes a frame-compatible interlace representation of all data categories that is complementary to the frame-compatible interlace representation of the base layer. The complementary frame-compatible interlace representation can be prepared using an input module such as those depicted in FIGS. 10A and 10B, with an added note that the input module codes information that, when combined with the base layer information, can yield an enhanced resolution interlace representation of all data categories.

In FIGS. 29 and 30, the second set of enhancement layers comprises a single enhancement layer designated as EL1 The second set enhancement layer may benefit from inter-layer prediction from the base layer. The inter-prediction may be performed by using an RPU (2935) to predict and store additional frame-compatible fields in a reference picture buffer (2930) of the second set enhancement layer using as input frame-compatible fields stored in the reference picture buffer (2920) of the base layer.

A third set of enhancement layers may encode a frame-compatible progressive representation of all data categories that is complementary to the frame-compatible progressive representation of the first set of enhancement layers. The complementary frame-compatible progressive representation can be prepared using an input module such as that depicted in FIG. 20, with an added note that the input module codes information that, when combined with information associated with the first set of enhancement layers, can yield an enhanced resolution progressive representation of all data categories.

In FIGS. 29 and 30, the third set of enhancement layers comprises a single enhancement layer designated as EL2. The third set enhancement layer may benefit from inter-layer prediction from the second set of enhancement layers. The inter-prediction may be performed by using an RPU (2945) to predict and store additional frame-compatible frames in a reference picture buffer (2940) of the third set enhancement layer using as input frame-compatible fields stored in the reference picture buffer (2930) of the second enhancement layer. It should be noted that, although not explicitly depicted in FIG. 29, the third set of enhancement layers may also benefit from inter-layer prediction from the first set of enhancement layers. Specifically, an EL0 to EL2 RPU can be placed in FIG. 29, allowing inter-layer prediction of frame-compatible progressive representations associated with the third set of enhancement layers based on frame-compatible progressive representations associated with the first set of enhancement layers.

It should be noted that corresponding reference picture buffers and RPUs are depicted in the decoder of FIG. 30.

Additional embodiments may involve combinations of the fourth arrangement/method with the teachings of U.S. Provisional Application No. 61/366,512, entitled "Systems and Methods for Multi-Layered Frame-Compatible Video Delivery", filed on Jul. 21, 2010. More specifically, each enhancement layer can adopt multiple internal reference picture buffers, one for each data category. This generally increases number of RPUs that can be utilized for inter-layer prediction. Furthermore, disparity compensation in each enhancement layer can either take place at a resolution of the reference picture buffers or at a resolution and format of the frame-compatible input to each enhancement layer.

Features related to the memory management control operations and spatial scalability are also applicable to various embodiments of the fourth method.

In an additional embodiment, the frame-compatible format associated with the first set of enhancement layers may comprise even columns from a first view (e.g., $V_0$ (2905) in FIG. 29) and odd columns from a second view (e.g., $V_1$ (2910) in FIG. 29) while the frame-compatible format associated with the third set of enhancement layers may comprise odd columns from the first view and even columns from the second view. A combination of the first and third sets of enhancement layers at the decoder (3000) of FIG. 30 can provide an enhanced resolution progressive representation of the original data categories (2905, 2910) provided to the encoder (2900) of FIG. 29.

Similarly, in an additional embodiment, the first set of enhancement layers may code a representation with a first range of frequency content (e.g., low frequencies) while the third set of enhancement layers may provide a second range of frequency content (e.g., frequencies not associated with the first set of enhancement layers). An output from each enhancement layer may be combined at the decoder (3000) of FIG. 30 to provide a better progressive representation (e.g., enhanced resolution and possibly full resolution) of the original data categories (2905, 2910) provided to the encoder (2900) of FIG. 29.

In a further embodiment, the frame-compatible format associated with the base layer may comprise even columns from a first view and odd columns from a second view while frame-compatible format associated with the second set of enhancement layers may comprise odd columns from the first view and even columns from the second view. A combination of the base layer and second set of enhancement layers at the decoder (3000) of FIG. 30 can provide an enhanced resolution interlace representation of the original data categories (2905, 2910) provided to the encoder (2900) of FIG. 29.

In another embodiment, the base layer may code a representation with a first range of frequency content while the second set of enhancement layers may code a representation with a second range of frequency content. An output from each of the base layer and the second set of enhancement layers may be combined at the decoder (3000) of FIG. 30 to provide a better interlace representation (e.g., enhanced resolution and possibly full resolution) of the original data categories (2905, 2910) provided to the encoder (2900) of FIG. 29.

In one case, the decoder output of the base layer and second set of enhancement layers can be combined to yield an enhanced resolution top-bottom interlace representation. Similarly, in the same case or in another case, the decoder output of the first and third sets of enhancement layers can be combined to yield an enhanced resolution top-bottom progressive representation.

FIG. 14 depicts an example block diagram in accordance with the fifth embodiment. An encoding and a decoding arrangement/method for a multiple-layer codec for compression of a video sequence are described, where the video sequence comprises frames comprising data from multiple data categories at a given time instance. Base layer architecture utilized in the previous arrangements/methods can also be utilized in the fifth arrangement/method. Differences can be found in enhancement layer architecture between the fifth method and the previously described methods.

A first set of enhancement layers may encode a complementary frame-compatible interlace representation of all data categories. FIGS. 10A and 10B depict example input modules for preparing such a complementary frame-compatible interlace representation, with an added note that the input module codes information that, when combined with the base layer information, can yield an enhanced resolution interlace representation of all data categories.

Figure 31:
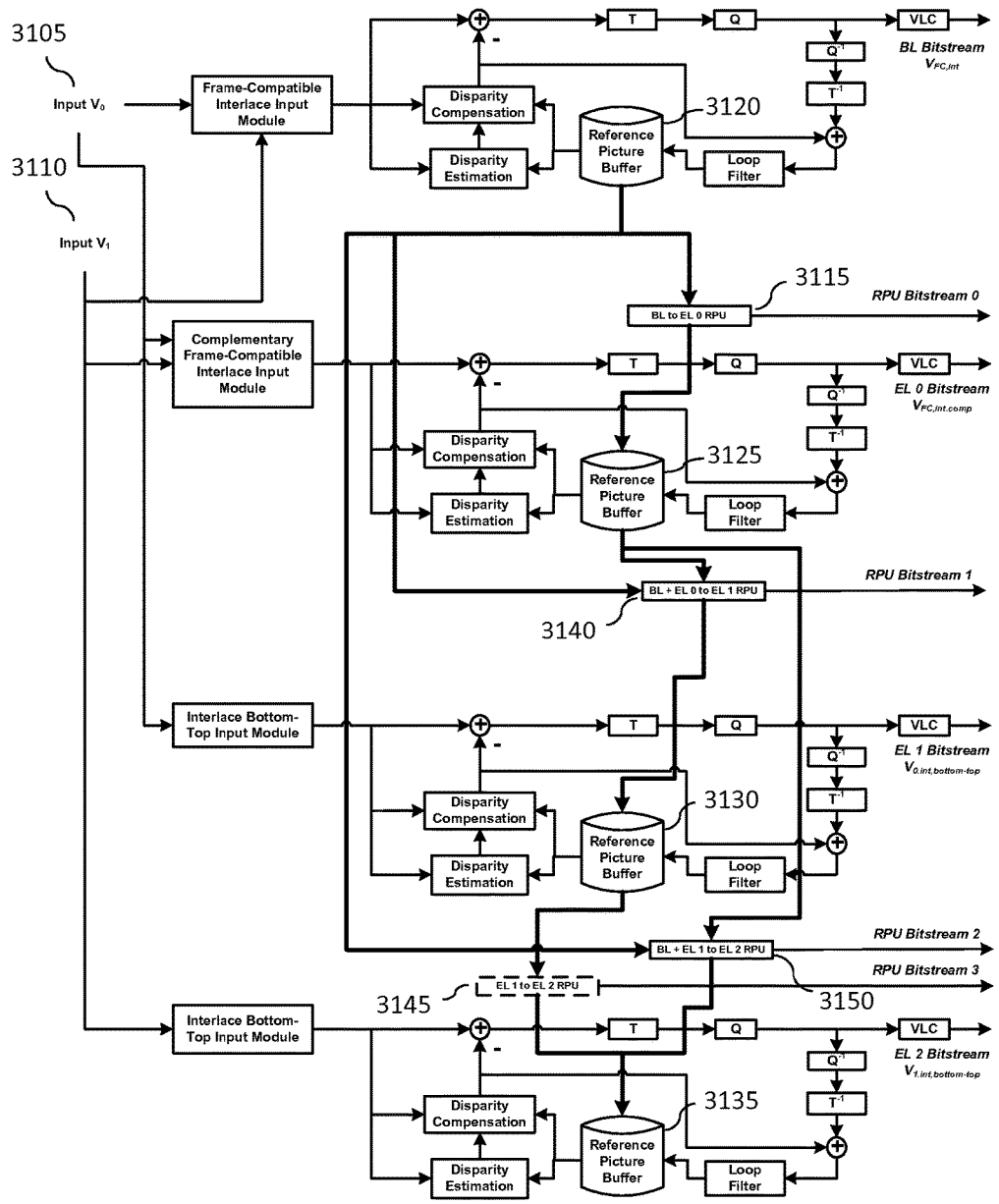
Figure 32:
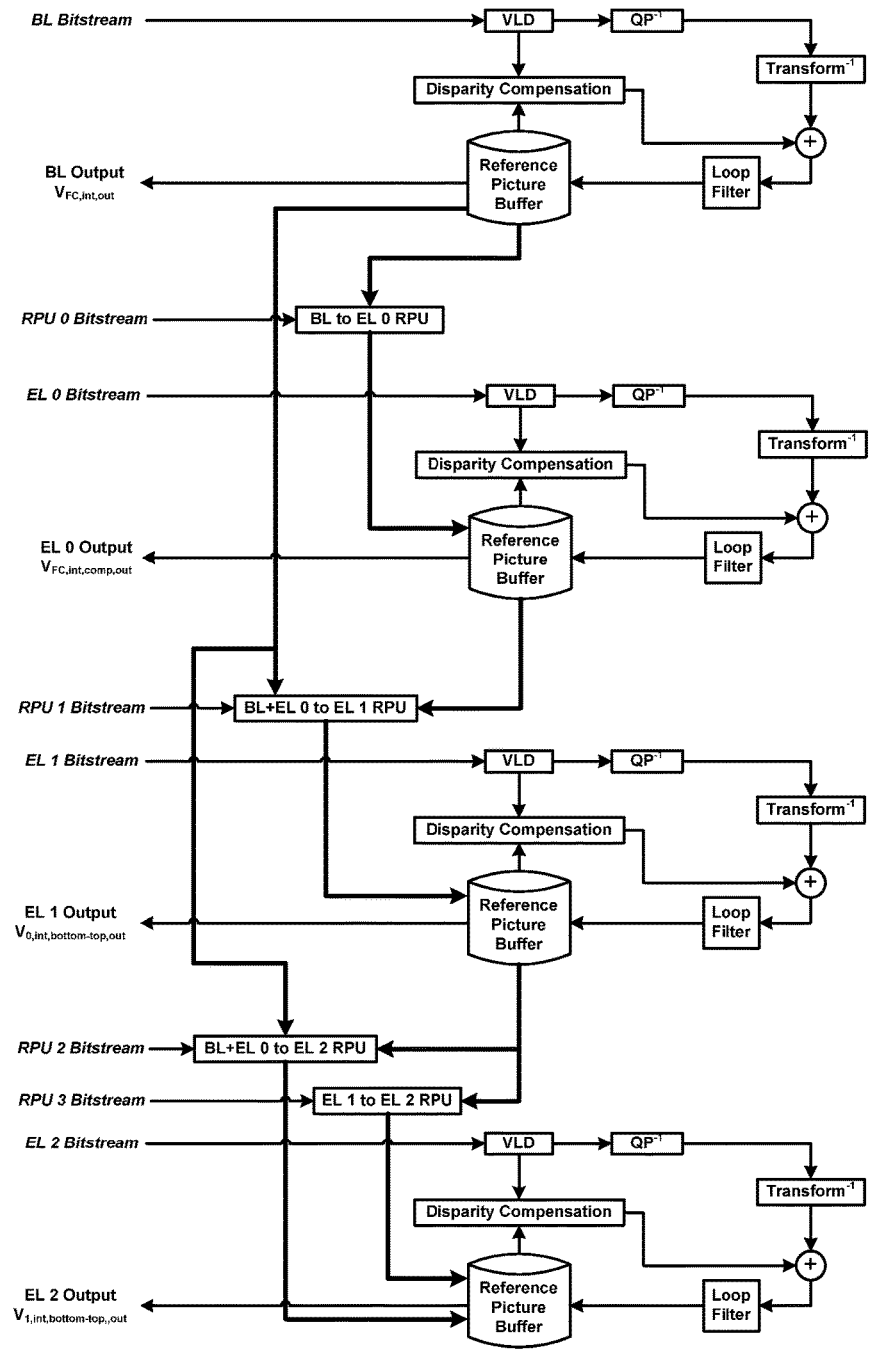

FIGS. 31 and 32 depict an embodiment of a multi-layer encoder (3100) and a multi-layer decoder (3200) for two data categories $V_0$ (3105) and $V_1$ (3110). In FIGS. 31 and 32, the first set of enhancement layers comprises a single enhancement layer designated as EL0. The first set enhancement layer may benefit from inter-layer prediction from the base layer. The inter-layer prediction may be performed by using an RPU (3115) to predict and store additional frame-compatible fields in a reference picture buffer (3125) of the first set enhancement layer using as input frame-compatible fields stored in a reference picture buffer (3120) of the base layer. In such a case, the base layer and first set enhancement layer can have the same field parity to avoid interlace. However, the base layer and the first set enhancement layer may instead have different field parity.

A second set of enhancement layers may encode an enhanced resolution interlace bottom-top representation of each data category. Each enhancement layer in the second group may be associated with one data category. The interlace representation can be prepared using, for instance, an input module such as that depicted in FIG. 23. By way of example, the input module can produce a bottom/top field for a time instance 2n and a top/bottom field for a time instance 2n+1. At a given time instance, each enhancement layer of the second set has an input of the same field parity as each other, and this parity is the opposite that of the base and first enhancement layer. In this example, a combination of the base layer and the first set of enhancement layers can yield an enhanced resolution top/bottom field whereas a combination of the first set of enhancement layers and the second set of enhancement layers can yield an enhanced resolution bottom/top field. It should be noted that resolution referred to as the enhanced resolution associated with each field can be, but need not be, the same resolution as each other. A combination of these four resulting fields can yield an enhanced resolution progressive representation of all data categories.

The second set of enhancement layers are designated as EL1 and EL2. This second set of enhancement layers may benefit from inter-layer prediction from the base layer and the first set of enhancement layers. The inter-layer prediction may be performed by using an RPU (3140) to predict and store additional enhanced resolution fields in a reference picture buffer (3130) of an enhancement layer in the second set of enhancement layers using as joint input frame-compatible fields stored in the reference picture buffers (3120, 3125) of the base layer and the first set of enhancement layers. By combining information output from the base layer and the first set of enhancement layers, an enhanced resolution interlace top-bottom representation for a given category can be formed, which can be utilized when predicting a bottom-top representation. Each second set enhancement layer is associated with one such RPU (3140). It should be noted that although only a BL+EL0 to EL1 RPU (3140) is depicted in FIG. 31, FIG. 31 can also include a BL+EL0 to EL2 RPU.

In an additional embodiment, inter-layer prediction can be performed between enhancement layers among the second set enhancement layers. As depicted in FIG. 31, an RPU (3145) between EL1 and EL2 may be used to predict and store additional fields in the reference picture buffer of EL2 (3135) from fields stored in the reference picture buffer of EL1 (3130). Similarly, although not depicted, an RPU can be placed between EL2 and EL1 such that EL1 can utilize information from EL2 for inter-prediction. These RPUs (e.g., 3145) may benefit from higher-order motion model and disparity compensation techniques, among others.

It should be noted that corresponding reference picture buffers and RPUs are depicted in the decoder of FIG. 32.

Additional embodiments are also possible through combinations of the various embodiments of the previous methods with the fifth method. More specifically, the second set enhancement layers can encode prediction residuals by redirecting output of the RPUs (3115, 3140, 3145, 3150). Alternatively, the second set enhancement layers can be replaced with a single layer that codes all data categories as a single field or as multiple layers where each layer codes one or more data categories.

Further embodiments may involve combinations of the fifth arrangement/method with the teachings of U.S. Provisional Application No. 61/366,512, entitled "Systems and Methods for Multi-Layered Frame-Compatible Video Delivery", filed on Jul. 21, 2010. More specifically, the first enhancement layer can adopt multiple internal reference picture buffers, one for each data category. This generally increases number of RPUs that can be utilized for inter-layer prediction. Furthermore, disparity compensation in the first set of enhancement layers can either take place at a resolution of the reference picture buffers or at a resolution and format of the frame-compatible input to the first set of enhancement layers.

Features related to the memory management control operations and spatial scalability are also applicable to this embodiment of the fifth method.

In an additional embodiment, the frame-compatible format associated with the base layer may comprise even columns from a first view (e.g., $V_0$ (3105) in FIG. 31) and odd columns from a second view (e.g., $V_1$ (3110) in FIG. 31) while the frame-compatible format associated with the first set of enhancement layers may comprise odd columns from the first view and even columns from the second view. A combination of the base layer and the first set of enhancement layers at the decoder (3200) of FIG. 32 can provide an enhanced resolution interlace representation of the original data categories (3105, 3110) provided to the encoder (3100) of FIG. 31.

Similarly, in an additional embodiment, the base layer may code a representation with a first range of frequency content (e.g., low frequencies) while the first set of enhancement layers may provide a second range of frequency content (e.g., frequencies not associated with the base layer). An output from each layer may be combined at the decoder (3200) of FIG. 32 to provide a better interlace representation (e.g., enhanced resolution and possibly full resolution) of the original data categories (3105, 3110) provided to the encoder (3100) of FIG. 31.

In one case, the decoder output of the base layer and first set of enhancement layers can be combined to yield an enhanced resolution top-bottom interlace representation. Similarly, in the same case or in another case, the decoder output of all layers can be combined to yield an enhanced resolution progressive representation.

In each of the methods provided above, the following can apply. In cases with sufficient correlation in motion parameters used throughout multiple disparity/motion estimators and compensation modules, motion parameters can be set so as to enable efficient prediction of parameters of one module from parameters from another module. In one such embodiment, the motion parameters can be set to be identical and only one set per enhancement layer is sent. In another case, a set of parameters can be signaled for each module. Additionally, motion parameter prediction can also benefit from neighboring or co-located parameters signaled from higher priority disparity estimation/compensation modules, which are those modules associated with higher priority layers.

The methods and systems described in the present disclosure may be implemented in hardware, software, firmware, or combination thereof. Features described as blocks, modules, or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the multi-layer interlace frame-compatible enhanced resolution video delivery of the disclosure, and are not intended to limit the scope of what the inventors regard as their disclosure.

Modifications of the above-described modes for carrying out the disclosure may be used by persons of skill in the video art, and are intended to be within the scope of the following claims.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. Unless defined otherwise, all technical and scientific terms used herein have the same meaning as commonly understood by one of ordinary skill in the art to which the disclosure pertains.

As described herein, an embodiment of the present invention may thus relate to one or more of the example embodiments that are enumerated in Table 1, below. Nevertheless, it will be understood that various modifications can be made without departing from the spirit and scope of the present disclosure. Accordingly, other embodiments are within the scope of the following example embodiments or the listed claims.

Table 1

Enumerated Example Embodiments

EEE1. A method for encoding video data into a plurality of bitstreams using an encoding system, the video data comprising data from a plurality of data categories, the method comprising:
providing at least one first layer, wherein the at least one first layer comprises a frame-compatible interlace representation of the plurality of data categories from the video data;
providing at least one second layer, wherein each second layer comprises one or more progressive representations, each progressive representation being associated with one or more of the data categories;
encoding the at least one first layer to generate one or more encoded first layer bitstreams; and
encoding the at least one second layer to generate one or more encoded second layer bitstreams.

EEE2. The method according to EEE 1, wherein the encoding the at least one second layer comprises, for a particular second layer:
performing disparity estimation on one or more progressive representations associated with the particular second layer based on second layer reference pictures from a reference picture buffer associated with the particular second layer to generate disparity parameters;
performing disparity compensation on the second layer reference pictures based on the disparity parameters to generate predicted progressive pictures;
taking a difference between each progressive representation associated with the particular second layer and a corresponding predicted progressive picture to obtain second layer residuals, each second layer residual being associated with an data category;
performing transformation and quantization on the second layer residuals to obtain second layer quantized transform residuals; and
performing entropy encoding on the second layer quantized transform residuals to generate one or more second layer bitstreams.

EEE3. The method according to EEE 2, wherein the second layer reference pictures from a reference picture buffer associated with the particular second layer are based on first layer reference pictures stored in a reference picture buffer associated with the at least one first layer, the method further comprising:

performing disparity estimation on the frame-compatible interlace representation based on the first layer reference pictures to generate disparity parameters associated with each data category;

performing disparity compensation on the first layer reference pictures based on the disparity parameters to generate predicted frame-compatible interlace pictures;

taking a difference between the frame-compatible interlace representation and the predicted frame-compatible interlace pictures to obtain first layer residuals; and generating first layer reconstructed pictures based on the first layer residuals and the predicted frame-compatible interlace pictures, wherein the first layer reference pictures are based on the first layer reconstructed pictures.

EEE4. The method according to EEE 3, wherein the generating first layer reconstructed pictures comprises:

performing transformation and quantization of the first layer residuals to obtain first layer quantized transform residuals;

performing inverse quantization and inverse transformation of the first layer quantized transform residuals to obtain first layer inverse processed residuals; and generating the first layer reconstructed pictures by combining the first layer inverse processed residuals and the predicted frame-compatible interlace pictures.

EEE5. The method according to EEE 3 or 4, further comprising:

loop filtering the first layer reconstructed pictures to obtain filtered first layer reconstructed pictures, wherein the first layer reference pictures are based on the filtered first layer reconstructed pictures.

EEE6. The method according to EEE 5, wherein the loop filtering comprises performing one or more of deblocking filtering, denoising filtering, Wiener filtering, and explicit filtering.

EEE7. The method according to any one of EEEs 3-6, further comprising:

generating the second layer reference pictures from a reference picture buffer associated with the particular second layer by processing the frame-compatible interlace representation to obtain predicted progressive representations, wherein the second layer reference pictures are based on the predicted progressive representations.

EEE8. The method according to any one of EEEs 3-6, further comprising:

generating the second layer reference pictures from the first layer reference pictures comprises performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE9. The method according to any one of the previous claims, wherein the providing at least one second layer comprises, for a particular second layer:

processing each of the one or more progressive representations to obtain predicted enhanced resolution progressive representations.

EEE10. The method according to EEE 9, wherein the processing is based on at least one of:

samples within the one or more progressive representations;

one or more reference pictures from the reference picture buffer associated with the particular second layer; and samples within previously coded pictures from the at least one first layer.

EEE11. The method according to EEE 9 or 10, wherein the processing is based on samples within previously coded pictures associated with another second layer among the at least one second layer.

EEE12. The method according to any one of EEEs 2-11, wherein one or more second layer reference pictures from the reference picture buffer associated with the particular second layer are previously coded pictures from the at least one first layer.

EEE13. The method according to any one of EEEs 2-12, wherein one or more second layer reference pictures from the reference picture buffer associated with the particular second layer are based on a set of second layer reference pictures from another second layer reference picture buffer.

EEE14. The method according to any one of EEEs 3-6, wherein the encoding the at least one second layer comprises, for a particular second layer:

performing reference processing on the first layer reference pictures via a first layer reference processing unit to obtain a set of predicted progressive pictures for each data category, wherein the predicted progressive pictures are adapted to be stored in a reference picture buffer associated with the particular second layer;

performing disparity estimation on one or more progressive representations with the particular second layer based on second layer reference pictures from a reference picture buffer associated with the particular second layer to generate disparity parameters;

performing disparity compensation on the second layer reference pictures based on the disparity parameters to generate a set of disparity compensated progressive pictures;

taking a difference between each predicted disparity compensated progressive picture and corresponding progressive representation in the one or more progressive representations to obtain second layer residuals;

performing transformation and quantization of the second layer residuals to obtain second layer quantized transform residuals; and performing entropy encoding on the second layer quantized transform residuals to generate one or more second layer bitstreams.

EEE15. The method according to any one of EEEs 3-6, wherein the encoding the at least one second layer comprises, for a particular second layer:

performing reference processing on the first layer reference pictures via a first layer reference processing unit to obtain predicted progressive pictures for each data category;

taking a difference between each progressive representation associated with the particular second layer and corresponding predicted progressive pictures to obtain a first set of residuals, each residual in the first set of residuals being associated with a data category;

performing disparity estimation on the first set of residuals based on second layer reference pictures from a reference picture buffer associated with the particular second layer to generate disparity parameters;

performing disparity compensation on the second layer reference pictures based on the disparity parameters to generate predicted second layer residuals;

taking a difference between each predicted second layer residual and corresponding residual in the first set of residuals to obtain a second set of residuals;

performing transformation and quantization of the second set of residuals to obtain a second set of quantized transform residuals; and performing entropy encoding on the second set of quantized transform residuals to generate one or more second layer bitstreams.

EEE16. The method according to any one of the previous EEEs, wherein each second layer is associated with one data category from among the plurality of data categories.

EEE17. The method according to any one of the previous EEEs, wherein the at least one second layer is one second layer comprising a frame-compatible full-resolution representation of all data category in the plurality of data categories.

EEE18. A method for encoding video data into a plurality of bitstreams using an encoding system, the video data comprising data from a plurality of data categories, the method comprising:

providing at least one first layer, wherein the at least one first layer comprises a frame-compatible interlace representation of the plurality of data categories from the video data;

providing at least one second layer and at least one third layer, wherein:
  each second layer comprises one or more second layer interlace representations, each second layer interlace representation being associated with one or more of the data categories, and
  each third layer comprises one or more progressive representations, each progressive representation being associated with one or more of the data categories;

encoding the at least one first layer to generate one or more encoded first layer bitstreams;

encoding the at least one second layer to generate one or more encoded second layer bitstreams; and encoding the at least one third layer to generate one or more encoded third layer bitstreams.

EEE19. The method according to EEE 18, wherein the encoding the at least one second layer or the encoding the at least one third layer comprises, for a particular layer, the particular layer being a second or third layer:

performing disparity estimation on one or more representations associated with the particular layer based on reference pictures from a reference picture buffer associated with the particular layer to generate disparity parameters;

performing disparity compensation on the particular layer reference pictures based on the disparity parameters to generate predicted pictures;

taking a difference between each representation associated with the particular layer and a corresponding predicted picture to obtain particular layer residuals, each particular residual being associated with a data category;

performing transformation and quantization on the particular layer residuals to obtain particular layer quantized transform residuals; and performing entropy encoding on the particular layer quantized transform residuals to generate one or more second or third layer bitstreams.

EEE20. The method according to EEE 18 or 19, wherein the reference pictures from a reference picture buffer associated with the particular layer are based on first layer reference pictures stored in a reference picture buffer associated with the at least one first layer, the method further comprising:

performing disparity estimation on the frame-compatible interlace representation based on the first layer reference pictures to generate disparity parameters associated with each data category;

performing disparity compensation on the frame-compatible interlace representation based on the disparity parameters to generate predicted frame-compatible interlace pictures;

taking a difference between the frame-compatible interlace representation and the predicted frame-compatible interlace pictures to obtain first layer residuals;

generating first layer reconstructed pictures based on the first layer residuals and the predicted frame-compatible interlace pictures, wherein the first layer reference pictures are based on the first layer reconstructed pictures.

EEE21. The method according to EEE 20, wherein the generating first layer reconstructed pictures comprises:

performing transformation and quantization of the first layer residuals to obtain quantized transform residuals;

performing inverse quantization and inverse transformation of the quantized transform residuals to obtain inverse processed residuals; and generating the first layer reconstructed pictures by combining the inverse processed residuals and the predicted frame-compatible interlace pictures.

EEE22. The method according to EEE 20 or 21, further comprising:

loop filtering the first layer reconstructed pictures to obtain filtered first layer reconstructed pictures, wherein the first layer reference pictures are based on the filtered first layer reconstructed pictures.

EEE23. The method according to any one of EEEs 18-22, wherein the providing a set of second layers comprises, for a particular second layer:

generating predicted interlace representations of the data categories associated with the particular second layer based on corresponding interlace representations from the at least one first layer.

EEE24. The method according to any one of EEEs 20-23, further comprising:

generating second layer reference pictures associated with a particular second layer by processing the frame-compatible interlace representation to obtain predicted second layer interlace representations, wherein the second layer reference pictures are based on the predicted second layer interlace representations.

EEE25. The method according to any one of EEEs 20-23, further comprising:

generating second layer reference pictures associated with a particular second layer from the first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE26. The method according to any one of EEEs 20-23, further comprising:

generating third layer reference pictures associated with a particular third layer from second layer reference pictures by processing the one or more second layer interlace representations to obtain predicted second layer progressive representations, wherein the third layer reference pictures are based on the predicted second layer progressive representations.

EEE27. The method according to any one of EEEs 20-23, further comprising:

generating third layer reference pictures associated with a particular third layer from second layer reference pictures by performing reference processing on the second layer reference pictures via a reference processing unit, the reference processing comprising at least one of de-multiplexing, up-sampling, de-interlacing, frequency filtering, and interpolating the second layer reference pictures to obtain the third layer reference pictures.

EEE28. The method according to any one of EEEs 18-27, wherein the providing at least one second layer or the providing at least one third layer comprises, for a particular layer:

processing each of the one or more representations to obtain predicted enhanced resolution representations.

EEE29. The method according to EEE 28, wherein the processing is based on at least one of:

samples within the one or more representations; and one or more reference pictures from the reference picture buffer associated with the particular layer.

EEE30. The method according to EEE 28 or 29, wherein the processing is based on samples within previously coded pictures from another layer.

EEE31. The method according to any one of EEEs 28-30, wherein:

the particular layer comprises a third layer, and the processing is based on samples within previously coded pictures associated with a second layer.

EEE32. The method according to any one of EEEs 18-31, wherein field parity of the at least one first layer and at least one second layer is different.

EEE33. The method according to any one of EEEs 20-32, wherein the encoding the at least one second layer or the encoding the at least one third layer comprises, for a particular layer, the particular layer being a second layer or a third layer:

performing reference processing on reference pictures to obtain a set of predicted pictures for each data category, wherein the predicted pictures are adapted to be stored in a reference picture buffer associated with the particular layer;

performing disparity estimation on based on reference pictures from a reference picture buffer associated with the particular layer to generate disparity parameters;

performing disparity compensation on the reference pictures based on the disparity parameters to generate a set of disparity compensated pictures;

taking a difference between each predicted disparity compensated picture and corresponding representation in the one or more representations associated with the particular layer to obtain particular layer residuals;

performing transformation and quantization of the particular layer residuals to obtain particular layer quantized transform residuals; and performing entropy encoding on the particular quantized transform residuals to generate one or more second layer or third layer bitstreams.

EEE34. The method according to any one of EEEs 20-32, wherein the encoding the at least one second layer or the encoding the at least one third layer comprises, for a particular layer, the particular layer being a second layer or a third layer:

performing reference processing on reference pictures to obtain a set of predicted pictures for each data category;

taking a difference between each representation associated with the particular layer and corresponding predicted pictures to obtain a first set of residuals, each residual in the first set of residuals being associated with a data category;

performing disparity estimation on particular layer reference pictures from a reference picture buffer associated with the particular layer to generate disparity parameters;

performing disparity compensation on the particular layer reference pictures based on the disparity parameters to generate a set of disparity compensated pictures;

taking a difference between each disparity compensated picture and corresponding residual in the first set of residuals to obtain a second set of residuals;

performing transformation and quantization of the second set of residuals to obtain particular layer quantized transform residuals; and performing entropy encoding on the particular quantized transform residuals to generate one or more second layer or third layer bitstreams.

EEE35. The method according to EEE 33 or 34, wherein:

the particular layer comprises a second layer, the performing reference processing is performed on reference pictures associated with the at least one first layer, and the predicted pictures comprise interlace representations of one or more data categories associated with the particular layer.

EEE36. The method according to EEE 33 or 34, wherein:

the particular layer comprises a third layer, the performing reference processing is performed on reference pictures associated with the at least one second layer, and the predicted pictures comprise progressive representations of one or more data categories associated with the particular layer.

EEE37. The method according to any one of EEEs 18-36, wherein each second or third layer is associated with one input data categories from among the plurality of input data categories.

EEE38. The method according to any one of EEEs 18-36, wherein the at least one second layer is one second layer comprising a frame-compatible full-resolution interlace representation of all data categories in the plurality of data categories.

EEE39. The method according to any one of EEEs 18-36 or 38, wherein the at least one third layer is one third layer comprising a frame-compatible full-resolution progressive representation of all data categories in the plurality of data categories.

EEE40. A method for encoding video data into a plurality of bitstreams using an encoding system, the video data comprising data from a plurality of data categories, the method comprising:

providing at least one first layer, wherein the at least one first layer comprises a frame-compatible interlace representation of the plurality of data categories from the video data;

providing at least one second layer and at least one third layer, wherein:

each second layer in the at least one second layer comprises a frame-compatible progressive representation of one or more data categories, and each third layer in the at least one third layer comprises an enhanced resolution progressive representation of one or more data categories;

encoding the at least one first layer to generate one or more encoded first layer bitstreams;

encoding the at least one second layer to generate one or more encoded second layer bitstreams; and encoding the at least one third layer to generate one or more encoded third layer bitstreams.

EEE41. The method according to EEE 40, further comprising:

generating second layer reference pictures associated with a particular second layer in the at least one second layer by processing the frame-compatible interlace representation to obtain predicted second layer progressive representations, wherein the second layer reference pictures are based on the predicted second layer progressive representations.

EEE42. The method according to EEE 40, further comprising:
generating second layer reference pictures associated with a particular second layer in the at least one second layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures.

EEE43. The method according to EEE 40, further comprising:
generating third layer reference pictures associated with a particular third layer in the at least one third layer from a reference pictures associated with second layers in the at least one second layer by processing the one or more second layer progressive representations to obtain predicted second layer enhanced resolution progressive representations, wherein the third layer reference pictures are based on the predicted second layer enhanced resolution progressive representations.

EEE44. The method according to EEE 40, further comprising:
generating third layer reference pictures associated with a particular third layer in the at least one third layer from second layer reference pictures associated with second layers in the at least one second layer by performing reference processing on the second layer reference pictures via a reference processing unit, the reference processing comprising at least one of de-multiplexing, up-sampling, de-interlacing, frequency filtering, and interpolating the second layer reference pictures to obtain the third layer reference pictures.

EEE45. The method according to any one of EEEs 40-44, wherein the encoding the at least one second layer or the encoding the at least one third layer comprises, for a particular layer, the particular layer being a second layer or a third layer:
performing reference processing on reference pictures to obtain a set of predicted pictures for each data category, wherein the predicted pictures are adapted to be stored in a reference picture buffer associated with the particular layer;
performing disparity estimation on reference pictures from a reference picture buffer associated with the particular layer to generate disparity parameters;
performing disparity compensation on the reference pictures based on the disparity parameters to generate a set of disparity compensated pictures;
taking a difference between each predicted disparity compensated picture and corresponding representation in the one or more representations associated with the particular layer to obtain particular layer residuals;
performing transformation and quantization of the particular layer residuals to obtain particular layer quantized transform residuals; and
performing entropy encoding on the particular quantized transform residuals to generate one or more second layer or third layer bitstreams.

EEE46. The method according to any one of EEEs 40-44, wherein the encoding the at least one second layer or the encoding the at least one third layer comprises, for a particular layer, the particular layer being a second layer or a third layer:
performing reference processing on reference pictures to obtain a set of predicted pictures for each data category;
taking a difference between each representation associated with the particular layer and corresponding predicted pictures to obtain a first set of residuals, each residual in the first set of residuals being associated with a data category;
performing disparity estimation on the reference pictures from a reference picture buffer associated with the particular layer to generate disparity parameters;
performing disparity compensation on the reference pictures based on the disparity parameters to generate a set of disparity compensated pictures;
taking a difference between each disparity compensated picture and corresponding residual in the first set of residuals to obtain a second set of residuals;
performing transformation and quantization of the second set of residuals to obtain particular layer quantized transform residuals; and
performing entropy encoding on the particular layer quantized transform residuals to generate one or more second layer or third bitstreams.

EEE47. The method according to EEE 45 or 46, wherein:
the particular layer comprises a second layer,
the performing reference processing is performed on reference pictures associated with the at least one first layer, and
the set of predicted pictures comprises frame-compatible progressive representations of one or more data categories associated with the particular layer.

EEE48. The method according to EEE 45 or 46, wherein:
the particular layer comprises a third layer,
the performing reference processing is performed on reference pictures associated with the at least one second layer, and
the set of predicted pictures comprises progressive representations of one or more data categories associated with the particular layer.

EEE49. The method according to any one of EEEs 40-48, wherein each second layer or third layer is associated with one data category from among the plurality of data categories.

EEE50. The method according to any one of EEEs 40-49, wherein the at least one second layer is one second layer comprising a frame-compatible progressive representation of all data categories in the plurality of data categories.

EEE51. The method according to any one of EEEs 40-50, wherein the at least one third layer is one third layer comprising a frame-compatible full-resolution representation of all data categories in the plurality of data categories.

EEE52. A method for encoding video data into a plurality of bitstreams, the video data comprising data from a plurality of data categories, the method comprising:
providing at least one first layer, wherein the at least one first layer comprises a first set of frame-compatible interlace representations of the plurality of data categories from the video data;
providing at least one second layer, at least one third layer, and at least one fourth layer, wherein:
each second layer in the at least one second layer comprises a first set of frame-compatible progressive representations of the plurality of data categories from the video data,
each third layer in the at least one third layer comprises a second set of frame-compatible interlace representations of the plurality of data categories from the video data, and each fourth layer in the at least one fourth layer comprises a second set of frame-compatible progressive representations of the plurality of data categories from the video data;

encoding the at least one first layer to generate one or more encoded first layer bitstreams; encoding the at least one second layer to generate one or more encoded second layer bitstreams;

encoding the at least one third layer to generate one or more encoded third layer bitstreams; and encoding the at least one third layer to generate one or more encoded fourth layer bitstreams.

EEE53. The method according to EEE 52, wherein:
the first set of frame-compatible interlace representations is complementary to the second set of frame-compatible interlace representations, and
the first set of frame-compatible progressive representations is complementary to the second set of frame-compatible progressive representations.

EEE54. The method according to EEE 52 or 53, wherein:
the first set of frame-compatible interlace representations comprises a first set of samples from the video data, and
the second set of frame-compatible interlace representations comprises samples of the video data not associated with the first set of frame-compatible interlace representations.

EEE55. The method according to any one of EEEs 52-54, wherein:
the first set of frame-compatible progressive representations comprises a first set of samples from the video data, and
the second set of frame-compatible progressive representations comprises samples of the video data not associated with the first set of frame-compatible progressive representations.

EEE56. The method according to any one of EEEs 52-55, wherein:
the first set of frame-compatible interlace representations comprises a first set of frequency components of the video data, and
the second set of frame-compatible interlace representations comprises frequency components of the video data not associated with the first set of frame-compatible interlace representations.

EEE57. The method according to any one of EEEs 52-56, wherein:
the first set of frame-compatible progressive representations comprises a first set of frequency components of the video data, and
the second set of frame-compatible progressive representations comprises frequency components of the video data not associated with the first set of frame-compatible progressive representations.

EEE58. The method according to any one of EEEs 52-56, wherein:
the at least one layer and the at least one third layer are adapted to be combined to form enhanced resolution interlace representations of each data category in the plurality of data categories, and
the at least one second layer and the at least one fourth layer are adapted to be combined to form enhanced resolution progressive representations of each data category in the plurality of data categories.

EEE59. The method according to claim any one of EEEs 52-58, further comprising:
generating second layer reference pictures associated with a particular second layer in the at least one second layer by processing the first set of frame-compatible interlace representations to obtain predicted second layer frame-compatible progressive representations, wherein the second layer reference pictures are based on the predicted second layer progressive representations.

EEE60. The method according to EEEs 52-58, further comprising:
generating second layer reference pictures associated with a particular second layer in the at least one second layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE61. The method according to claim any one of EEEs 52-58, further comprising:
generating third layer reference pictures associated with a particular third layer in the at least one third layer by processing the first set of frame-compatible interlace representations to obtain predicted third layer frame-compatible interlace representations, wherein the third layer reference pictures are based on the predicted third layer frame compatible interlace representations.

EEE62. The method according to any one of EEEs 52-60, further comprising:
generating third layer reference pictures associated with a particular third layer in the at least one third layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the third layer reference pictures.

EEE63. The method according to any one of EEEs 52-62, further comprising:
generating fourth layer reference pictures associated with a particular fourth layer of the at least one fourth layer by processing the first set of frame-compatible progressive representations to obtain predicted fourth layer frame-compatible progressive representations, wherein the fourth layer reference pictures are based on the predicted fourth layer frame-compatible progressive representations.

EEE64. The method according to any one of EEEs 52-62, further comprising:
generating fourth layer reference pictures associated with a particular fourth layer in the at least one fourth layer from second layer reference pictures by performing reference processing on the second layer reference pictures, the reference processing comprising at least one of de-multiplexing, up-sampling, de-interlacing, frequency filtering, and interpolating the second layer reference pictures to obtain the fourth layer reference pictures.

EEE65. The method according to claim any one of EEEs 52-64, further comprising:
generating fourth layer reference pictures associated with a particular fourth layer of the at least one fourth layer by processing the second set of frame-compatible interlace representations to obtain predicted fourth layer frame-compatible progressive representations, wherein the fourth layer reference pictures are based on the predicted fourth layer frame-compatible progressive representations.

EEE66. The method according to any one of EEEs 52-64, further comprising:
generating fourth layer reference pictures associated with a particular fourth layer in the at least one fourth layer from third layer reference pictures by performing reference processing on the third layer reference pictures, the reference processing comprising at least one of de-multiplexing, up-sampling, de-interlacing, frequency filtering, and interpolating the third layer reference pictures to obtain the fourth layer reference pictures.

EEE67. The method according to any one of EEEs 52-66, wherein each of the encoding the at least one second layer, the encoding the at least one third layer, or the encoding the at least one fourth layer comprises, for a particular layer, the particular layer being a second layer, a third layer, or a fourth layer:

performing reference processing on reference pictures to obtain a set of predicted pictures for each data category, wherein the predicted pictures are adapted to be stored in a reference picture buffer associated with the particular layer;

performing disparity estimation on reference pictures from a reference picture buffer associated with the particular layer to generate disparity parameters;

performing disparity compensation on the reference pictures based on the disparity parameters to generate a set of disparity compensated pictures;

taking a difference between each predicted disparity compensated picture and corresponding representation in the one or more representations associated with the particular layer to obtain particular layer residuals;

performing transformation and quantization of the particular layer residuals to obtain particular layer quantized transform residuals; and performing entropy encoding on the particular quantized transform residuals to generate one or more bitstreams associated with the second, third, or fourth layer.

EEE68. The method according to any one of EEEs 52-66, wherein each of the encoding the at least one second layer, the encoding the at least one third layer, or the encoding the at least one fourth layer comprises, for a particular layer, the particular layer being a second layer, a third layer, or a fourth layer:

performing reference processing on reference pictures associated with the particular layer to obtain a set of predicted pictures for each data category;

taking a difference between each representation associated with the particular second layer and corresponding predicted pictures to obtain a first set of residuals, each residual in the first set of residuals associated with a data category;

performing disparity estimation on the reference pictures from a reference picture buffer associated with the particular layer to generate disparity parameters;

performing disparity compensation on the reference pictures based on the disparity parameters to generate a set of disparity compensated pictures;

taking a difference between each disparity compensated picture and corresponding residual in the first set of residuals to obtain a second set of residuals;

performing transformation and quantization of the second set of residuals to obtain particular layer quantized transform residuals; and performing entropy encoding on the particular layer quantized transform residuals to generate one or more bitstreams associated with the second, third, or fourth layer.

EEE69. The method according to EEE 67 or 68, wherein:
the particular layer comprises a second layer,
the performing reference processing is performed on reference pictures associated with the at least one first layer, and the set of predicted pictures comprises frame-compatible progressive representations of one or more data categories associated with the particular layer.

EEE70. The method according to EEE 67 or 68, wherein:
the particular layer is a third layer,
the performing reference processing is performed on reference pictures associated with the at least one second layer, and
the set of predicted pictures comprises frame-compatible interlace representations of one or more data categories associated with the particular layer.

EEE71. The method according to EEE 67 or 68, wherein:
the particular layer comprises a fourth layer,
the performing reference processing is performed on reference pictures associated with the at least one second layer and/or reference pictures associated with the at least one third layer, and
the set of predicted pictures comprises frame-compatible progressive representations of one or more data categories associated with the particular layer.

EEE72. The method according to any one of EEEs 52-71, wherein the at least one third layer is one third layer comprising a full-resolution representation of all data categories in the plurality of data categories.

EEE73. A method for encoding video data into a plurality of bitstreams, the video data comprising data from a plurality of data categories, the method comprising:

providing at least one first layer, wherein the at least one first layer comprises a first set of frame-compatible interlace representations of the plurality of data categories from the video data;

providing at least one second layer and at least one third layer, wherein:
each second layer comprises a second set of frame-compatible interlace representations of the plurality of data categories from the video data, and
each third layer comprises a set of interlace representations of the plurality of data categories from the video data;

encoding the at least one first layer to generate one or more encoded first layer bitstreams;

encoding the at least one second layer to generate one or more encoded second layer bitstreams; and encoding the at least one third layer to generate one or more encoded third layer bitstreams.

EEE74. The method according to EEE 73, wherein the first set of frame-compatible interlace representations is complementary to the second set of frame-compatible interlace representations.

EEE75. The method according to EEE 73 or 74, wherein, at a given time instance, field parities of each first layer and each second layer are the same.

EEE76. The method according to any one of EEEs 73-75, wherein, at a given time instance, field parities of each third layer are opposite field parities of each first layer and each second layer.

EEE77. The method according to any one of EEEs 73-76, wherein the at least one first layer and
the at least one second layer are adapted to be combined to form enhanced resolution interlace representations of a first parity for each data category in the plurality of data categories.

EEE78. The method according to EEE 77, wherein the at least one first layer and the at least one second layer are adapted to be combined to form full-resolution interlace representations of a first parity for each data category in the plurality of data categories.

EEE79. The method according to any one of EEEs 73-78, wherein each third layer comprises an enhanced resolution interlace representation of a parity opposite the first parity for each data category in the plurality of data categories.

EEE80. The method according to EEE 79, wherein each third layer comprises a full-resolution interlace representation of a parity opposite the first parity for each data category in the plurality of data categories.

EEE81. The method according to claim any one of EEEs 73-80, further comprising:
generating second layer reference pictures associated with a particular second layer by processing the first set of frame-compatible interlace representations to obtain predicted second layer frame-compatible interlace representations, wherein the second layer reference pictures are based on the predicted second layer interlace representations.

EEE82. The method according to any one of EEEs 73-80, further comprising:
generating second layer reference pictures associated with a particular second layer from first layer reference pictures by performing reference processing on first layer reference pictures via a reference processing unit, the reference processing comprising at least one of de-multiplexing, up-sampling, de-interlacing, frequency filtering, and interpolating the first layer reference pictures to obtain the second layer reference pictures.

EEE83. The method according to claim any one of EEEs 73-82, further comprising:
generating third layer reference pictures associated with a particular third layer by processing the first set and/or second set of frame-compatible interlace representations to obtain predicted third layer interlace representations, wherein the third layer reference pictures are based on the predicted third layer interlace representations.

EEE84. The method according to claim any one of EEEs 73-82, further comprising:
generating third layer reference pictures associated with a particular third layer from first layer reference pictures and/or the second layer reference pictures by performing reference processing on the first layer reference pictures and/or the second layer reference pictures, the reference processing comprising at least one of de-multiplexing, up-sampling, de-interlacing, frequency filtering, and interpolating the first layer reference pictures and/or the second layer reference pictures to obtain the third layer reference pictures.

EEE85. The method according to any one of EEEs 73-84, wherein the encoding the at least one second layer or the encoding the at least one third layer comprises, for a particular layer, the particular layer being a second layer or a third layer:
performing reference processing on reference pictures associated with the particular layer to obtain a set of predicted pictures for each data category, wherein the predicted pictures are adapted to be stored in a reference picture buffer associated with the particular layer;
performing disparity estimation on reference pictures from a reference picture buffer associated with the particular layer to generate disparity parameters;
performing disparity compensation on the reference pictures based on the disparity parameters to generate a set of disparity compensated pictures;
taking a difference between each predicted disparity compensated picture and corresponding representation in the one or more representations associated with the particular layer to obtain particular layer residuals;
performing transformation and quantization of the particular layer residuals to obtain particular layer quantized transform residuals; and
performing entropy encoding on the particular quantized transform residuals to generate one or more second layer or third layer bitstreams.

EEE86. The method according to any one of EEEs 73-84, wherein the encoding the at least one second layer or the encoding the at least one third layer comprises, for a particular layer, the particular layer being a second layer or a third layer:
performing reference processing on reference pictures associated with the particular layer to obtain a set of predicted pictures for each data category;
taking a difference between each representation associated with the particular layer and corresponding predicted pictures to obtain a first set of residuals, each residual in the first set of residuals associated with a data category;
performing disparity estimation on the reference pictures from a reference picture buffer associated with the particular layer to generate disparity parameters;
performing disparity compensation on the reference pictures based on the disparity parameters to generate predicted residuals;
taking a difference between each predicted residual and corresponding residual in the first set of residuals to obtain a second set of residuals;
performing transformation and quantization of the second set of residuals to obtain particular layer quantized transform residuals; and
performing entropy encoding on the second set of particular layer quantized transform residuals to generate one or more second or third layer bitstreams.

EEE87. The method according to EEE 85 or 86, wherein:
the particular layer comprises a second layer,
the performing reference processing is performed on reference pictures associated with the at least one first layer, and
the predicted pictures comprise frame-compatible interlace representations of one or more data categories associated with the particular layer.

EEE88. The method according to EEE 85 or 86, wherein:
the particular layer comprises a third layer,
the performing reference processing is performed on reference pictures associated with the at least one first layer and/or the at least one second layer, and
the predicted pictures comprise interlace representations of one or more data categories associated with the particular layer.

EEE89. The method according to any one of the previous EEEs, wherein disparity parameters associated with each encoding are adapted to be signaled to a decoder.

EEE90. The method according to EEE 89, wherein one set of disparity parameters is adapted to be signaled to a decoder for each layer.

EEE91. The method according to EEE 89, wherein one set of disparity parameters is adapted to be signaled to a decoder for all layers.

EEE92. The method according to any one of the previous EEEs, wherein the providing at least one first layer comprises:
performing sampling on each of the plurality of data categories to generate a plurality of sampled data categories;
performing multiplexing of the plurality of sampled data categories to generate the frame-compatible interlace representation of the plurality of data categories.

EEE93. The method according to EEE 92, wherein the performing sampling comprises filtering at least one data category from among the plurality of data categories, wherein the filtering comprises performing at least one of low-pass filtering, denoising, anti-aliasing, spatio-temporal filtering, deblocking, color correction, and gamma correction.

EEE94. A method for decoding a plurality of bitstreams representative of video data using a decoding system, the plurality of bitstreams adapted to be received by the decoding system from an encoding system, each bitstream comprising data associated with one or more data categories, the method comprising:
providing the plurality of bitstreams to the decoding system, wherein the plurality of bitstreams comprises one or more first layer bitstreams representative of at least one first layer and one or more second layer bitstreams representative of at least one second layer, wherein the at least one first layer comprises a frame-compatible interlace representation of the one or more data categories and the at least one second layer comprises one or more progressive representations, each progressive representation being associated with one or more of the data categories;
decoding the one or more first layer bitstreams to obtain a reconstructed frame-compatible interlace representation; and
decoding the one or more second layer bitstreams to obtain one or more reconstructed progressive representations.

EEE95. The method according to EEE 94, wherein the decoding the one or more second layer bitstreams comprises, for a particular second layer bitstream associated with a particular second layer from among the at least one second layer:
performing entropy decoding on the particular second layer bitstream to obtain second layer quantized transform residuals associated with the particular second layer;
performing disparity compensation on second layer reference pictures from a reference picture buffer associated with the particular second layer based on disparity parameters to generate predicted progressive pictures, wherein the disparity parameters are adapted to be received by the decoding system from the encoding system;
performing inverse quantization and inverse transformation on the second layer quantized transform residuals to obtain second layer inverse processed residuals; and
combining the second layer inverse processed residuals with the predicted progressive pictures to obtain one or more reconstructed progressive representations associated with the particular second layer, wherein the one or more reconstructed progressive representations are adapted to be stored in the reference picture buffer associated with the particular second layer.

EEE96. The method according to EEE 95, wherein the second layer reference pictures from a reference picture buffer associated with the particular second layer are based on first layer reference pictures stored in a reference picture buffer associated with the at least one first layer, the method further comprising:
performing entropy decoding on the one or more first layer bitstreams to obtain first layer quantized transform residuals associated with the at least one first layer;
performing inverse quantization and inverse transformation on the first layer quantized transform residuals to obtain first layer inverse processed residuals;
performing disparity compensation on the first layer reference pictures based on disparity parameters to generate predicted frame-compatible interlace pictures, wherein the disparity parameters are adapted to be received by the decoding system from the encoding system; and
combining the first layer inverse processed residuals with the predicted frame-compatible interlace pictures to obtain the reconstructed frame-compatible interlace representation associated with the at least one first layer, wherein the reconstructed frame-compatible interlace representation is adapted to be stored in the reference picture buffer associated with the at least one first layer.

EEE97. The method according to EEE 96, further comprising:
loop filtering the reconstructed frame-compatible interlace representation to obtain a filtered frame-compatible interlace representation, wherein the filtered frame-compatible interlace representation is adapted to be stored in the reference picture buffer associated with the at least one first layer.

EEE98. The method according to EEE 97, wherein the loop filtering comprises performing one or more of deblocking filtering, denoising filtering, Wiener filtering, and explicit filtering.

EEE99. The method according to any one of EEEs 96-98, further comprising:
generating the second layer reference pictures from a reference picture buffer associated with the particular second layer by processing the first layer reference pictures to obtain predicted progressive representations, wherein the second layer reference pictures are based on the predicted progressive representations.

EEE100. The method according to any one of EEEs 96-98, further comprising:
generating the second layer reference pictures from the first layer reference pictures comprises performing reference processing on the first layer reference pictures via a reference processing unit, the reference processing comprising at least one of de-multiplexing, up-sampling, de-interlacing, frequency filtering, and interpolating the first layer reference pictures to generate the second layer reference pictures.

EEE101. The method according to any one of EEEs 95-100, wherein the second layer reference pictures from the reference picture buffer associated with the particular second layer are previously coded pictures from the at least one first layer.

EEE102. The method according to any one of EEEs 95-101, wherein the second layer reference pictures from the reference picture buffer associated with the particular second layer are based on a set of second layer reference pictures from another second layer reference picture buffer.

EEE103. The method according to any one EEEs 94-102, wherein at least one of the one or more of the reconstructed progressive representations are of lower resolution than full-resolution, the method further comprising:
performing up-sampling on the at least one progressive representation of lower resolution than full-resolution to generate predicted full-resolution progressive representations for the at least one progressive representation.

EEE104. The method according to any one of EEEs 96-98, wherein the decoding the one or more second layer bitstreams comprises, for a particular second layer bitstream associated with a particular second layer from among the at least one second layer:
performing entropy decoding on the particular second layer bitstream to obtain second layer quantized transform residuals associated with the particular second layer;
performing reference processing on the first layer reference pictures via a first layer reference processing unit to obtain a set of predicted progressive pictures for each data category, wherein the predicted progressive pictures are adapted to be stored in a reference picture buffer associated with the particular second layer;

performing inverse quantization and inverse transformation on the second layer quantized transform residuals to obtain second layer inverse processed residuals;

performing disparity compensation on the second layer reference pictures based on disparity parameters to generate a set of disparity compensated progressive pictures, wherein the disparity parameters are adapted to be received by the decoding system from the encoding system; and combining the second layer inverse processed residuals with the set of disparity compensated progressive pictures to obtain one or more reconstructed progressive representations associated with the particular second layer, wherein the one or more reconstructed progressive representations are adapted to be stored in the reference picture buffer associated with the particular second layer.

EEE105. The method according to any one of EEEs 96-98, wherein the decoding the one or more second layer bitstreams comprises, for a particular second layer bitstream associated with a particular second layer from among the at least one second layer:

performing reference processing on the first layer reference pictures via a first layer reference processing unit to obtain predicted progressive pictures for each data category; and combining the predicted progressive pictures with second layer reference pictures from a reference picture buffer associated with the particular second layer to obtain one or more reconstructed progressive representations associated with the particular second layer.

EEE106. The method according to any one of the EEEs 94-105, wherein each second layer is associated with one data category from among the plurality of data categories.

EEE107. The method according to any one of EEEs 94-106, wherein the at least one second layer is one second layer comprising a frame-compatible full-resolution representation of all data categories in the plurality of data categories.

EEE108. A method for decoding a plurality of bitstreams representative of video data using a decoding system, the plurality of bitstreams adapted to be received by the decoding system from an encoding system, each bitstream comprising data associated with one or more data categories, the method comprising:

providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein:

the at least one first layer comprises a frame-compatible interlace representation of the plurality of data categories from the video data;

each second layer comprises one or more second layer interlace representations, each second layer interlace representation being associated with one or more of the data categories, and each third layer comprises one or more progressive representations, each progressive representation being associated with one or more of the data categories;

decoding the one or more first layer bitstreams to obtain a reconstructed frame-compatible interlace representation;

decoding the one or more second layer bitstreams to obtain one or more reconstructed interlace representations; and decoding the one or more third layer bitstreams to obtain one or more reconstructed progressive representations.

EEE109. The method according to EEE 108, wherein the decoding the at least one second layer or the decoding the at least one third layer comprises, for a particular layer, the particular layer being a second or third layer:

performing entropy decoding on a bitstream associated with the particular layer to obtain quantized transform residuals associated with the particular layer;

performing disparity compensation on reference pictures from a reference picture buffer associated with the particular layer based on disparity parameters to generate predicted pictures, wherein the disparity parameters are adapted to be received by the decoding system from the encoding system;

performing inverse quantization and inverse transformation on the quantized transform residuals to obtain inverse processed residuals associated with the particular layer; and combining the inverse processed residuals with the predicted pictures to obtain one or more reconstructed representations associated with the particular layer, wherein the one or more reconstructed representations are adapted to be stored in the reference picture buffer associated with the particular layer.

EEE110. The method according to EEE 109, wherein the reference pictures from a reference picture buffer associated with the particular layer are based on first layer reference pictures stored in a reference picture buffer associated with the at least one first layer, the method further comprising:

performing entropy decoding on the one or more first layer bitstreams to obtain first layer quantized transform residuals associated with the at least one first layer;

performing inverse quantization and inverse transformation on the first layer quantized transform residuals to obtain first layer inverse processed residuals;

performing disparity compensation on the first layer reference pictures based on disparity parameters to generate predicted interlace pictures, wherein the disparity parameters are adapted to be received by the decoding system from the encoding system; and combining the first layer inverse processed residuals with the predicted interlace pictures to obtain the reconstructed frame-compatible interlace representation associated with the at least one first layer, wherein the reconstructed frame-compatible interlace representation is adapted to be stored in the reference picture buffer associated with the at least one first layer.

EEE111. The method according to EEE 109 or 110, further comprising:

loop filtering the first layer reconstructed pictures to obtain filtered first layer reconstructed pictures, wherein the first layer reference pictures are based on the filtered first layer reconstructed pictures.

EEE112. The method according to EEE 111, wherein the loop filtering comprises performing one or more of deblocking filtering, denoising filtering, Wiener filtering, and explicit filtering.

EEE113. The method according to any one of EEEs 110-112, further comprising:

generating second layer reference pictures associated with a particular second layer by processing the frame-compatible interlace representation to obtain predicted second layer interlace representations, wherein the second layer reference pictures are based on the predicted second layer interlace representations.

EEE114. The method according to any one of EEEs 110-112, further comprising:

generating second layer reference pictures associated with a particular second layer from the first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE115. The method according to any one of EEEs 110-112, further comprising:

generating third layer reference pictures associated with a particular third layer from second layer reference pictures by processing the one or more second layer interlace representations to obtain predicted second layer progressive representations, wherein the third layer reference pictures are based on the predicted second layer progressive representations.

EEE116. The method according to any one of EEEs 110-112, further comprising:

generating third layer reference pictures associated with a particular third layer from second layer reference pictures by performing reference processing on the second layer reference pictures via a reference processing unit, the reference processing comprising at least one of de-multiplexing, up-sampling, de-interlacing, frequency filtering, and interpolating the second layer reference pictures to obtain the third layer reference pictures.

EEE117. The method according to any one of EEEs 108-116, wherein field parity of the at least one first layer and the at least one second layer is different.

EEE118. The method according to any one of EEEs 110-117, wherein the decoding the at least one second layer or the decoding the at least one third layer comprises, for a particular layer, the particular layer being a second layer or a third layer:

performing entropy decoding on a bitstream associated with the particular layer to obtain quantized transform residuals associated with the particular layer;

performing reference processing on reference pictures to obtain a set of predicted pictures for each data category, wherein the predicted pictures are adapted to be stored in a reference picture buffer associated with the particular layer;

performing inverse quantization and inverse transformation on the quantized transform residuals to obtain inverse processed residuals associated with the particular layer;

performing disparity compensation on the reference pictures based on disparity parameters to generate a set of disparity compensated pictures, wherein the disparity parameters are adapted to be received by the decoding system from the encoding system; and combining the inverse processed residuals with the set of disparity compensated pictures to obtain one or more reconstructed representations associated with the particular layer, wherein the one or more reconstructed representations are adapted to be stored in the reference picture buffer associated with the particular layer.

EEE119. The method according to any one of EEEs 110-117, wherein the decoding the at least one second layer or the decoding the at least one third layer comprises, for a particular layer, the particular layer being a second layer or a third layer:

performing reference processing on reference pictures to obtain a set of predicted pictures for each data category; and combining the set of predicted pictures with reference pictures from a reference picture buffer associated with the particular layer to obtain one or more reconstructed representations associated with the particular layer.

EEE120. The method according to EEE 118 or 119, wherein:

the particular layer comprises a second layer, the performing reference processing is performed on reference pictures associated with the at least one first layer, and the set of predicted pictures comprise interlace representations of one or more data categories associated with the particular layer.

EEE121. The method according to EEE 118 or 119, wherein:

the particular layer comprises a third layer, the performing reference processing is performed on reference pictures associated with the at least one second layer, and the set of predicted pictures comprise progressive representations of one or more data categories associated with the particular layer.

EEE122. The method according to any one of EEEs 108-121, wherein each second or third layer is associated with one data category from among the plurality of data categories.

EEE123. The method according to any one of EEEs 108-121, wherein the at least one second layer is one second layer comprising a frame-compatible full-resolution interlace representation of all data categories in the plurality of data categories.

EEE124. The method according to any one of EEEs 108-121 or 123, wherein the at least one third layer is one third layer comprising a frame-compatible full-resolution progressive representation of all data categories in the plurality of data categories.

EEE125. A method for decoding a plurality of bitstreams representative of video data using a decoding system, the plurality of bitstreams adapted to be received by the decoding system from an encoding system, each bitstream comprising data associated with one or more data categories, the method comprising:

providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein:

the at least one first layer comprises a frame-compatible interlace representation of the plurality of data categories from the video data;

each second layer in the at least one second layer comprises a frame-compatible progressive representation of one or more data categories, and each third layer in the at least one third layer comprises an enhanced resolution progressive representation of one or more data categories;

decoding the one or more first layer bitstreams to obtain a reconstructed frame-compatible interlace representation;

decoding the one or more second layer bitstreams to obtain one or more reconstructed frame-compatible progressive representations; and decoding the one or more third layer bitstreams to obtain one or more reconstructed enhanced resolution progressive representations.

EEE126. The method according to EEE 125, further comprising:

generating second layer reference pictures associated with a particular second layer in the at least one second layer by processing the frame-compatible interlace representation to obtain predicted second layer frame-compatible progressive representations, wherein the second layer reference pictures are based on the predicted second layer frame-compatible progressive representations.

EEE127. The method according to EEE 125, further comprising:

generating second layer reference pictures associated with a particular second layer in the at least one second layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE128. The method according to EEE 125, further comprising:

generating third layer reference pictures associated with a particular third layer in the at least one third layer from reference pictures associated with second layers in the at least one second layer by processing the one or more second layer progressive representations to obtain predicted third layer enhanced resolution progressive representations, wherein the third reference pictures are based on the predicted third layer enhanced resolution progressive representations.

EEE129. The method according to EEE 125, further comprising:

generating third layer reference pictures associated with a particular third layer in the at least one third layer from reference pictures associated with second layers in the at least one second layer by performing reference processing on the reference pictures via a reference processing unit, the reference processing comprising at least one of de-multiplexing, up-sampling, de-interlacing, frequency filtering, and interpolating the reference pictures associated with the second layers to obtain the third layer reference pictures.

EEE130. The method according to any one of EEEs 125-129, wherein the decoding the at least one second layer or the decoding the at least one third layer comprises, for a particular layer, the particular layer being a second layer or a third layer:

performing entropy decoding on a bitstream associated with the particular layer to obtain quantized transform residuals associated with the particular layer;

performing reference processing on reference pictures to obtain a set of predicted pictures for each data category, wherein the predicted pictures are adapted to be stored in a reference picture buffer associated with the particular layer;

performing inverse quantization and inverse transformation on the quantized transform residuals to obtain inverse processed residuals associated with the particular layer;

performing disparity compensation on the reference pictures based on disparity parameters to generate a set of disparity compensated pictures, wherein the disparity parameters are adapted to be received by the decoding system from the encoding system; and combining the inverse processed residuals with the set of disparity compensated pictures to obtain one or more reconstructed representations associated with the particular layer, wherein the one or more reconstructed representations are adapted to be stored in the reference picture buffer associated with the particular layer.

EEE131. The method according to any one of EEEs 125-129, wherein the decoding the at least one second layer or the decoding the at least one third layer comprises, for a particular layer, the particular layer being a second layer or a third layer:

performing reference processing on reference pictures to obtain a set of predicted pictures for each data category; and combining the set of predicted pictures with reference pictures from a reference picture buffer associated with the particular layer to obtain one or more reconstructed representations associated with the particular layer.

EEE132. The method according to EEE 130 or 131, wherein:

the particular layer comprises a second layer, the performing reference processing is performed on reference pictures associated with the at least one first layer, and the set of predicted pictures comprise frame-compatible progressive representations of one or more data categories associated with the particular layer.

EEE133. The method according to EEE 130 or 131, wherein:

the particular layer comprises a third layer, the performing reference processing is performed on reference pictures associated with the at least one second layer, and the set of predicted pictures comprise progressive representations of one or more input data categories associated with the particular layer.

EEE134. The method according to any one of EEEs 125-133, wherein each second layer or third layer is associated with one data category from among the plurality of data categories.

EEE135. The method according to any one of EEEs 125-134, wherein the at least one second layer is one second layer comprising a frame-compatible progressive representation of all data categories in the plurality of data categories.

EEE136. The method according to any one of EEEs 125-135, wherein the at least one third layer is one third layer comprising a frame-compatible full-resolution representation of all data categories in the plurality of data categories.

EEE137. A method for decoding a plurality of bitstreams representative of video data using a decoding system, the plurality of bitstreams adapted to be received by the decoding system from an encoding system, each bitstream comprising data associated with one or more data categories, the method comprising:

providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein:

the at least one first layer comprises a frame-compatible interlace representation of the plurality of data categories from the video data;

each second layer in the at least one second layer comprises a first set of frame-compatible progressive representations of the plurality of data categories from the video data, each third layer in the at least one third layer comprises a second set of frame-compatible interlace representations of the plurality of data categories from the video data, and each fourth layer in the at least one fourth layer comprises a second set of frame-compatible progressive representations of the plurality of data categories from the video data;

decoding the one or more first layer bitstreams to obtain a first layer reconstructed frame-compatible interlace representation;

decoding the one or more second layer bitstreams to obtain one or more second layer reconstructed frame-compatible progressive representations;

decoding the one or more third layer bitstreams to obtain one or more third layer reconstructed frame-compatible interlace representations; and decoding the one or more fourth layer bitstreams to obtain one or more fourth layer reconstructed frame-compatible progressive representations.

EEE138. The method according to EEE 137, wherein:

the first set of frame-compatible interlace representations is complementary to the second set of frame-compatible interlace representations, and the first set of frame-compatible progressive representations is complementary to the second set of frame-compatible progressive representations.

EEE139. The method according to EEE 137 or 138, wherein:

the first set of frame-compatible interlace representations comprises a first set of samples from the video data, and the second set of frame-compatible interlace representations comprises samples of the video data not associated with the first set of frame-compatible interlace representations.

EEE140. The method according to any one of EEEs 137-139, wherein:

the first set of frame-compatible progressive representations comprises a first set of samples based on the video data, and the second set of frame-compatible progressive representations comprises samples of the video data not associated with the first set of frame-compatible progressive representations.

EEE141. The method according to any one of EEEs 137-140, wherein:

the first set of frame-compatible interlace representations comprises a first set of frequency components of the video data, and the second set of frame-compatible interlace representations comprises frequency components of the video data not associated with the first set of frame-compatible interlace representations.

EEE142. The method according to any one of EEEs 137-141, wherein:

the first set of frame-compatible progressive representations comprises a first set of frequency components of the video data, and the second set of frame-compatible progressive representations comprises frequency components of the video data not associated with the first set of frame-compatible progressive representations.

EEE143. The method according to any one of EEEs 137-141, wherein:

the at least one layer and the at least one third layer are adapted to be combined to form enhanced resolution interlace representations of each data category in the plurality of data categories, and the at least one second layer and the at least one fourth layer are adapted to be combined to form enhanced resolution progressive representations of each data category in the plurality of data categories.

EEE144. The method according to claim any one of EEEs 137-143, further comprising:

generating second layer reference pictures associated with a particular second layer in the at least one second layer by processing the first set of frame-compatible interlace representations to obtain predicted second layer frame-compatible progressive representations, wherein the second layer reference pictures are based on the predicted second layer progressive representations.

EEE145. The method according to EEE 137-143, further comprising:

generating second layer reference pictures associated with a particular second layer in the at least one second layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the second layer reference pictures.

EEE146. The method according to claim any one of EEEs 137-145, further comprising:

generating third layer reference pictures associated with a particular third in the at least one third layer by processing the first set of frame-compatible interlace representations to obtain predicted third layer frame-compatible interlace representations, wherein the third layer reference pictures are based on the predicted third layer interlace representations.

EEE147. The method according to any one of EEEs 137-145, further comprising:

generating third layer reference pictures associated with a particular third layer in the at least one third layer from first layer reference pictures by performing reference processing on the first layer reference pictures via a reference processing unit, the reference processing comprising at least one of de-multiplexing, up-sampling, de-interlacing, frequency filtering, and interpolating the first layer reference pictures to obtain the third layer reference pictures.

EEE148. The method according to claim any one of EEEs 137-147, further comprising:

generating fourth layer reference pictures associated with a particular fourth layer of the at least one fourth layer by processing the first set of frame-compatible progressive representations to obtain predicted fourth layer frame-compatible progressive representations, wherein the fourth layer reference pictures are based on the predicted fourth layer frame-compatible progressive representations.

EEE149. The method according to any one of EEEs 137-147, further comprising:

generating fourth layer reference pictures associated with a particular fourth layer in the at least one fourth layer from second layer reference pictures by performing reference processing on the second layer reference pictures, the reference processing comprising at least one of de-multiplexing, up-sampling, de-interlacing, frequency filtering, and interpolating the second layer reference pictures to obtain the fourth layer reference pictures.

EEE150. The method according to claim any one of EEEs 137-149, further comprising:

generating fourth layer reference pictures associated with a particular fourth layer of the at least one fourth layer by processing the second set of frame-compatible interlace representations to obtain predicted fourth layer frame-compatible progressive representations, wherein the fourth layer reference pictures are based on the predicted fourth layer frame-compatible progressive representations.

EEE151. The method according to any one of EEEs 137-149, further comprising:

generating fourth layer reference pictures associated with a particular fourth layer in the at least one fourth layer from third layer reference pictures by performing reference processing on the third layer reference pictures, the reference processing comprising at least one of de-multiplexing, up-sampling, de-interlacing, frequency filtering, and interpolating the third layer reference pictures to obtain the fourth layer reference pictures.

EEE152. The method according to any one of EEEs 137-151, wherein each of the decoding the at least one second layer, the decoding the at least one third layer, or the decoding the at least one fourth layer comprises, for a particular layer, the particular layer being a second layer, a third layer, or a fourth layer:

performing entropy decoding on a bitstream associated with the particular layer to obtain quantized transform residuals associated with the particular layer;

performing reference processing on reference pictures to obtain a set of predicted pictures for each data category, wherein the predicted pictures are adapted to be stored in a reference picture buffer associated with the particular layer;

performing inverse quantization and inverse transformation on the quantized transform residuals to obtain inverse processed residuals associated with the particular layer;

performing disparity compensation on the reference pictures based on the disparity parameters to generate a set of disparity compensated pictures, wherein the disparity parameters are adapted to be received by the decoding system from the encoding system; and combining the inverse processed residuals with the set of disparity compensated pictures to obtain one or more reconstructed representations associated with the particular layer, wherein the one or more reconstructed representations are adapted to be stored in the reference picture buffer associated with the particular layer.

EEE153. The method according to any one of EEEs 137-151, wherein each of the decoding the at least one second layer, the decoding the at least one third layer, or the decoding the at least one fourth layer comprises, for a particular layer, the particular layer being a second layer, a third layer, or a fourth layer:

performing reference processing on reference pictures to obtain a set of predicted pictures for each data category; and combining the set of predicted pictures with reference pictures from a reference picture buffer associated with the particular layer to obtain one or more reconstructed representations associated with the particular layer.

EEE154. The method according to EEE 152 or 153, wherein:

the particular layer comprises a second layer, the performing reference processing is performed on reference pictures associated with the at least one first layer, and the set of predicted pictures comprise frame-compatible progressive representations of one or more data categories associated with the particular layer.

EEE155. The method according to EEE 152 or 153, wherein:

the particular layer comprises a third layer, the performing reference processing is performed on reference pictures associated with the at least one second layer, and the set of predicted pictures comprise frame-compatible interlace representations of one or more data categories associated with the particular layer.

EEE156. The method according to EEE 152 or 153, wherein:

the particular layer comprises a fourth layer, the performing reference processing is performed on reference pictures associated with the at least one second layer and/or reference pictures associated with the at least one third layer, and the set of predicted pictures comprise frame-compatible progressive representations of one or more data categories associated with the particular layer.

EEE157. The method according to any one of EEEs 137-156, wherein the at least one third layer is one third layer comprising a full-resolution representation of all data categories in the plurality of data categories.

EEE158. A method for decoding a plurality of bitstreams representative of video data using a decoding system, the plurality of bitstreams adapted to be received by the decoding system from an encoding system, each bitstream comprising data associated with one or more data categories, the method comprising:

providing the plurality of bitstreams to the decoder system, wherein the plurality of bitstreams comprises one or more first layer bitstreams representative of at least one first layer, one or more second layer bitstreams representative of at least one second layer, and one or more third layer bitstreams representative of at least one third layer, wherein:

the at least one first layer comprises a frame-compatible interlace representation of the plurality of data categories from the video data;

each second layer comprises a second set of frame-compatible interlace representations of the plurality of data categories from the video data, and each third layer comprises a set of interlace representations of the plurality of data categories from the video data;

decoding the one or more first layer bitstreams to obtain a first layer reconstructed frame-compatible interlace representation;

decoding the one or more second layer bitstreams to obtain one or more second layer reconstructed frame-compatible interlace representations; and decoding the one or more third layer bitstreams to obtain one or more reconstructed interlace representations.

EEE159. The method according to EEE 158, wherein the first set of frame-compatible interlace representations is complementary to the second set of frame-compatible interlace representations.

EEE160. The method according to EEE 158 or 159, wherein, at a given time instance, field parities of each first layer and each second layer are the same.

EEE161. The method according to any one of EEEs 158-160, wherein, at a given time instance, field parities of each third layer are opposite field parities of each first layer and each second layer.

EEE162. The method according to any one of EEEs 158-161, wherein the at least one first layer and the set of second layers are adapted to be combined to form enhanced resolution interlace representations of a first parity for each data category in the plurality of data categories.

EEE163. The method according to any one of EEEs 158-162, wherein the at least one first layer and the at least one second layer are adapted to be combined to form full-resolution interlace representations of a first parity for each data category in the plurality of data categories.

EEE164. The method according to EEEs 158-163, wherein each third layer comprises an enhanced resolution interlace representation of a parity opposite the first parity for each data category in the plurality of data categories.

EEE165. The method according to EEE 164, wherein each third layer comprises a full-resolution interlace representation of a parity opposite the first parity for each data category in the plurality of data categories.

EEE166. The method according to claim any one of EEEs 158-165, further comprising:

generating second layer reference pictures associated with a particular second layer by processing the first set of frame-compatible interlace representations to obtain predicted second layer frame-compatible interlace representations, wherein the second layer reference pictures are based on the predicted second layer interlace representations.

EEE167. The method according to any one of EEEs 158-165, further comprising:

generating second layer reference pictures associated with a particular second layer from first layer reference pictures by performing reference processing on first layer reference pictures via a reference processing unit, the reference processing comprising at least one of de-multiplexing, up-sampling, de-interlacing, frequency filtering, and interpolating the first layer reference pictures to obtain the second layer reference pictures.

EEE168. The method according to any one of EEEs 158-167, further comprising:

generating third layer reference pictures associated with a particular third layer by processing the first set and/or second set of frame-compatible interlace representations to obtain predicted third layer interlace representations, wherein the third layer reference pictures are based on the predicted third layer interlace representations.

EEE169. The method according to claim any one of EEEs 158-167, further comprising:

generating third layer reference pictures associated with a particular third layer from first layer reference pictures and/or the second layer reference pictures by performing reference processing on the first layer reference pictures and/or the second layer reference pictures, the reference processing comprising at least one of de-multiplexing, up-sampling, de-interlacing, frequency filtering, and interpolating the first layer reference pictures and/or the second layer reference pictures to obtain the third layer reference pictures.

EEE170. The method according to any one of EEEs 158-167, wherein the decoding the at least one second layer or the decoding the at least one third layer comprises, for a particular layer, the particular layer being a second layer or a third layer:

performing entropy decoding on a bitstream associated with the particular layer to obtain quantized transform residuals associated with the particular layer;

performing reference processing on reference pictures associated with the particular layer to obtain a set of predicted pictures for each data category, wherein the predicted pictures are adapted to be stored in a reference picture buffer associated with the particular layer;

performing inverse quantization and inverse transformation on the quantized transform residuals to obtain inverse processed residuals associated with the particular layer; and performing disparity compensation on the reference pictures based on disparity parameters to generate a set of disparity compensated pictures, wherein the disparity parameters are adapted to be received by the decoding system from the encoding system; and combining the inverse processed residuals with the set of disparity compensated pictures to obtain one or more reconstructed representations associated with the particular layer, wherein the one or more reconstructed representations are adapted to be stored in the reference picture buffer associated with the particular layer.

EEE171. The method according to any one of EEEs 158-167, wherein the decoding the at least one second layer or the decoding the at least one third layer comprises, for a particular layer, the particular layer being a second layer or a third layer:

performing reference processing on reference pictures associated with the particular layer to obtain a set of predicted pictures for each data category;

combining the set of predicted pictures with reference pictures from a reference picture buffer associated with the particular layer to obtain one or more reconstructed representations associated with the particular layer.

EEE172. The method according to EEE 170 or 171, wherein:

the particular layer comprises a second layer, the performing reference processing is performed on reference pictures associated with the at least one first layer, and the predicted pictures comprise frame-compatible interlace representations of one or more input data categories associated with the particular layer.

EEE173. The method according to EEE 170 or 171, wherein:

the particular layer comprises a third layer, the performing reference processing is performed on reference pictures associated with the at least one first layer and/or the at least one second layer, and the predicted pictures comprise interlace representations of one or more data categories associated with the particular layer.

EEE174. An encoding system for encoding video data into a plurality of bitstreams, each bitstream being associated with at least one first layer or at least one second layer, the video data comprising data from a plurality of data categories, the encoding system comprising:

a frame-compatible interlace input module that is configured to generate the at least one first layer from the video data, wherein the at least one first layer comprises a frame-compatible interlace representation of the plurality of data categories from the video data;

a first layer encoder connected with the frame-compatible interlace input module and that is configured to encode the at least one first layer to generate one or more encoded first layer bitstreams; and a second layer encoder that is configured to encode the at least one second layer to generate one or more encoded second layer bitstreams, wherein each second layer comprises one or more progressive representations, each progressive representation being associated with one or more of the data categories.

EEE175. The encoding system according to EEE 174, wherein the second layer encoder comprises, for a particular second layer:

a second layer disparity estimation module that is configured to perform disparity estimation on one or more progressive representations associated with the particular second layer based on second layer reference pictures from a reference picture buffer associated with the particular second layer to generate disparity parameters;

a second layer disparity compensation module connected with the second layer disparity estimation module and that is configured to perform disparity compensation on the second layer reference pictures based on the disparity parameters to generate predicted progressive pictures;

a second layer summing module connected with the second layer disparity compensation module and that is configured to take a difference between each progressive representation associated with the particular second layer and a corresponding predicted progressive picture to obtain second layer residuals, each second layer residual being associated with an data category;

a second layer transformation module connected with the second layer summing module and a second layer quantization module, wherein the second layer transformation module and the second layer quantization module are configured to respectively perform transformation and quantization on the second layer residuals to obtain second layer quantized transform residuals; and a second layer entropy encoder connected with the second layer quantization module and that is configured to perform entropy encoding on the second layer quantized transform residuals to generate one or more second layer bitstreams.

EEE176. The encoding system according to EEE 175, wherein the second layer reference pictures from a reference picture buffer associated with the particular second layer are based on first layer reference pictures stored in a reference picture buffer associated with the at least one first layer, wherein the first layer encoder comprises:

a first layer disparity estimation module connected with the frame-compatible interlace input module and that is configured to perform disparity estimation on the frame-compatible interlace representation based on the first layer reference pictures to generate disparity parameters associated with each data category;

a first layer disparity compensation module connected with the first layer disparity estimation module and that is configured to perform disparity compensation on the first layer reference pictures based on the disparity parameters to generate predicted frame-compatible interlace pictures; and a first layer summing module connected with the first layer disparity compensation module and that is configured to take a difference between the frame-compatible interlace representation and the predicted frame-compatible interlace pictures to obtain first layer residuals;

a first layer transformation module connected with the first layer summing module and a first layer quantization module, wherein the first layer transformation module and the first layer quantization module are configured to respectively perform transformation and quantization of the first layer residuals to obtain first layer quantized transform residuals;

a first layer inverse quantization module connected with the first layer quantization module and a first layer inverse transformation module, wherein the first layer inverse quantization module and the first layer inverse transformation module are configured to respectively perform inverse quantization and inverse transformation of the first layer quantized transform residuals to obtain first layer inverse processed residuals; and a first layer combining module connected with the first layer inverse transformation module and that is configured to generate the first layer reconstructed pictures by combining the first layer inverse processed residuals and the predicted frame-compatible interlace pictures.

EEE177. The encoding system according to EEE 176, further comprising:

a loop filter that is configured to perform loop filtering on the first layer reconstructed pictures to obtain filtered first layer reconstructed pictures, wherein the first layer reference pictures are based on the filtered first layer reconstructed pictures.

EEE178. The encoding system according to EEE 177, wherein the loop filter is configured to perform one or more of deblocking filtering, denoising filtering, Wiener filtering, and explicit filtering.

EEE179. The encoding system according to any one of EEEs 176-178, wherein the second layer reference pictures from a reference picture buffer associated with the particular second layer are generated by processing the frame-compatible interlace representation to obtain predicted progressive representations, the second layer reference pictures being based on the predicted progressive representations.

EEE180. The encoding system according to any one of EEEs 176-179, wherein the second layer reference pictures are generated by a reference processing unit that is configured to perform at least one of de-multiplexing, up-sampling, de-interlacing, frequency filtering, and interpolating the first layer reference pictures to obtain the second layer reference pictures.

EEE181. The encoding system according to any one of EEEs 174-180, further comprising:

a pre-processing module connected with the second layer disparity estimation module and the second layer summing module, wherein the pre-processing module is configured to perform processing on each of the one or more progressive representations to obtain predicted enhanced resolution progressive representations to generate a particular second layer.

EEE182. The encoding system according to EEE 181, wherein the pre-processing module is configured to perform processing based on at least one of:

samples within the one or more progressive representations;

one or more reference pictures from the reference picture buffer associated with the particular second layer; and samples within previously coded pictures from the at least one first layer.

EEE183. The encoding system according to EEE 181 or 182, wherein the pre-processing module is configured to perform processing based on samples within previously coded pictures associated with another second layer among the at least one second layer.

EEE184. The encoding system according to any one of EEEs 175-183, wherein one or more second layer reference pictures from the reference picture buffer associated with the particular second layer are previously coded pictures from the reference picture buffer associated with the at least one first layer.

EEE185. The encoding system according to any one of EEEs 175-184, wherein one or more second layer reference pictures from the reference picture buffer associated with the particular second layer are based on a set of second layer reference pictures from another second layer reference picture buffer.

EEE186. The encoding system according to any one of EEEs 176-179, wherein the second layer encoder comprises, for a particular second layer:

a first layer reference processing unit that is configured to perform reference processing on the first layer reference pictures to obtain a set of predicted progressive pictures for each data category, wherein the predicted progressive pictures are adapted to be stored in a reference picture buffer associated with the particular second layer;

a second layer disparity estimation module that is configured to perform disparity estimation on one or more progressive representations associated with the particular second layer based on second layer reference pictures from a reference picture buffer associated with the particular second layer to generate disparity parameters;

a second layer disparity compensation module connected with the second layer disparity estimation module and that is configured to perform disparity compensation on the second layer reference pictures based on the disparity parameters to generate a set of disparity compensated progressive pictures;

a second layer summing module connected with the second layer disparity compensation module and that is configured to take a difference between each predicted disparity compensated progressive picture and corresponding progressive representation in the one or more progressive representations to obtain second layer residuals;

a second layer transformation module connected with the second layer summing module and a second layer quantization module, wherein the second layer transformation module and the second layer quantization module are configured to respectively perform transformation and quantization on the second layer residuals to obtain second layer quantized transform residuals; and a second layer entropy encoder connected with the second layer quantization module and that is configured to perform entropy encoding on the second layer quantized transform residuals to generate one or more second layer bitstreams.

EEE187. The encoding system according to any one of EEEs 176-179, wherein the second layer encoder comprises, for a particular second layer:

a first layer reference processing unit that is configured to perform reference processing on the first layer reference pictures to obtain predicted progressive pictures for each data category;

a first summing module connected with the first layer reference processing unit and that is configured to take a difference between each progressive representation associated with the particular second layer and corresponding predicted progressive pictures to obtain a first set of residuals, each residual in the first set of residuals being associated with a data category;

a second layer disparity estimation module connected with the first summing module and that is configured to perform disparity estimation on the first set of residuals based on second layer reference pictures from a reference picture buffer associated with the particular second layer to generate disparity parameters;

a second layer disparity compensation module connected with the second layer disparity estimation module and that is configured to perform disparity compensation on the second layer reference pictures based on the disparity parameters to generate predicted second layer residuals;

a second summing module connected with the first summing module and the second layer disparity compensation module, wherein the second summing module is configured to take a difference between each predicted second layer residual and corresponding residual in the first set of residuals to obtain a second set of residuals;

a second layer transformation module connected with the second summing module and a second layer quantization module, wherein the second layer transformation module and the second layer quantization module are configured to respectively perform transformation and quantization on the second set of residuals to obtain second layer quantized transform residuals; and a second layer entropy encoder connected with the second layer quantization module and that is configured to perform entropy encoding on the second layer quantized transform residuals to generate one or more second layer bitstreams.

EEE188. The encoding system according to any one of EEEs 174-187, wherein each second layer is associated with one data category from among the plurality of data categories.

EEE189. The encoding system according to any one EEEs 174-188, wherein the at least one second layer is one second layer comprising a frame-compatible full-resolution representation of all data categories in the plurality of data categories.

EEE190. The encoding system according to any one of EEEs 175-189, wherein each reference processing unit is configured to perform one or more memory management control operations, the memory management control operations comprising adding, removing, and ordering reference pictures in each reference processing unit.

EEE191. An encoding system that is configured to perform the method according to any one of EEEs 1-17.

EEE192. An encoding system for encoding input video data into a plurality of bitstreams, each bitstream being associated with at least one first layer, at least one second layer, or at least one third layer, the video data comprising data from a plurality of data categories, the encoding system comprising:

a frame-compatible interlace input module that is configured to generate the at least one first layer from the video data, wherein the at least one first layer comprises a frame-compatible interlace representation of the plurality of data categories from the video data;

an interlace input module that is configured to generate the at least one second layer from the video data, wherein each second layer comprises one or more second layer interlace representations, each second layer interlace representation being associated with one or more of the data categories;

a first layer encoder connected with the frame-compatible interlace input module and that is configured to encode the at least one first layer to generate one or more encoded first layer bitstreams;

a second layer encoder connected with the interlace input module and that is configured to encode the at least one second layer to generate one or more encoded second layer bitstreams; and a third layer encoder that is configured to encode the at least one third layer to generate one or more encoded third layer bitstreams, wherein each third layer comprises one or more progressive representations, each progressive representation being associated with one or more of the data categories.

EEE193. The encoding system according to EEE 192, wherein the second layer or third layer encoder comprises, for a particular layer, the particular layer being a second or third layer:

a particular layer disparity estimation module that is configured to perform disparity estimation on one or more representations associated with the particular layer based on reference pictures from a reference picture buffer associated with the particular layer to generate disparity parameters;

a particular layer disparity compensation module that is connected with the particular layer disparity estimation module and configured to perform disparity compensation on the particular layer reference pictures based on the disparity parameters to generate predicted pictures;

a particular layer summing module that is connected with the particular layer disparity compensation module and configured to take a difference between each representation associated with the particular layer and a corresponding predicted picture to obtain particular layer residuals, each particular residual being associated with a data category;

a particular layer transformation module that is connected with the particular layer summing module and a particular layer quantization module, wherein the particular layer transformation module and the particular layer quantization module are configured to respectively perform transformation and quantization on the particular layer residuals to obtain particular layer quantized transform residuals; and a particular layer entropy encoder that is connected with the particular layer quantization module and configured to perform entropy encoding on the particular layer quantized transform residuals to generate one or more second or third layer bitstreams.

EEE194. The encoding system according to EEE 192 or 193, wherein the reference pictures from a reference picture buffer associated with the particular layer are based on first layer reference pictures stored in a reference picture buffer associated with the at least one first layer, the encoding system further comprising:

a first layer disparity estimation module that is connected with the frame-compatible interlace input module and configured to perform disparity estimation on the frame-compatible interlace representation based on the first layer reference pictures to generate disparity parameters associated with each data category;

a first layer disparity compensation module that is connected with the first layer disparity estimation module and configured to perform disparity compensation on the frame-compatible interlace representation based on the disparity parameters to generate predicted interlace pictures;

a first layer summing module that is connected with the first layer disparity compensation module and configured to take a difference between the frame-compatible interlace representation and the predicted interlace pictures to obtain first layer residuals;

a first layer transformation module that is connected with the first layer summing module and a first layer quantization module, wherein the first layer transformation module and the first layer quantization module are configured to respectively perform transformation and quantization of the first layer residuals to obtain quantized transform residuals;

a first layer inverse quantization module that is connected with the first layer quantization module and a first layer inverse transformation module, wherein the first layer inverse quantization module and the first layer inverse transformation module are configured to respectively perform inverse quantization and inverse transformation of the quantized transform residuals to obtain inverse processed residuals; and a first layer combining module that is connected with the first layer inverse transformation module and configured to generate the first layer reconstructed pictures by combining the inverse processed residuals and the predicted interlace pictures.

EEE195. The encoding system according to EEE 194, further comprising:

a loop filter that is configured to perform loop filtering on the first layer reconstructed pictures to obtain filtered first layer reconstructed pictures, wherein the first layer reference pictures are based on the filtered first layer reconstructed pictures.

EEE196. The encoding system according to EEE 195, wherein the loop filter is configured to perform one or more of deblocking filtering, denoising filtering, Wiener filtering, and explicit filtering.

EEE197. The encoding system according to any one of EEEs 192-196:

a pre-processing module that is connected with a second layer disparity estimation module and a second layer summing module, wherein the pre-processing module is configured to generate predicted interlace representations of the data categories associated with a particular second layer based on corresponding interlace representations from the at least one first layer.

EEE198. The encoding system according to any one of EEEs 194-197, wherein second layer reference pictures associated with a particular second layer are generated by processing the frame-compatible interlace representation to obtain predicted second layer interlace representations, the second layer reference pictures being based on the predicted second layer interlace representations.

EEE199. The encoding system according to any one of EEEs 194-197, wherein second layer reference pictures associated with a particular second layer from the first layer reference pictures are generated by a reference processing unit that is configured to perform at least one of de-multiplexing, up-sampling, de-interlacing, frequency filtering, and interpolating on the first layer reference pictures to obtain the second layer reference pictures.

EEE200. The encoding system according to any one of EEEs 194-197, wherein third layer reference pictures associated with a particular third layer are generated by processing the one or more second layer interlace representations to obtain predicted second layer progressive representations, wherein the third layer reference pictures are based on the predicted second layer progressive representations.

EEE201. The encoding system according to any one of EEEs 194-197, wherein third layer reference pictures associated with a particular third layer are generated by a reference processing unit that is configured to perform at least one of de-multiplexing, up-sampling, de-interlacing, frequency filtering, and interpolating the second layer reference pictures to obtain the third layer reference pictures.

EEE202. The encoding system according to any one of EEEs 192-201, further comprising, for a particular layer, the particular layer being a second layer or a third layer:

a pre-processing module that is connected with a particular layer disparity estimation module and a particular layer summing module, wherein the pre-processing module is configured to perform processing on each of the one or more representations to obtain predicted enhanced resolution representations.

EEE203. The encoding system according to EEE 202, wherein the pre-processing module is configured to perform processing based on at least one of:

samples within the one or more representations; and one or more reference pictures from the reference picture buffer associated with the particular layer.

EEE204. The encoding system according to EEE 202 or 203, wherein the pre-processing module is configured to perform processing based on samples within previously coded pictures from another layer.

EEE205. The encoding system according to any one of EEEs 202-204, wherein:

the particular layer comprises a third layer, and the pre-processing module is configured to perform processing based on samples within previously coded pictures associated with a second layer.

EEE206. The encoding system according to any one of EEEs 192-205, wherein field parity of the at least one first layer and the at least one second layer is different.

EEE207. The encoding system according to any one of EEEs 194-206, wherein the second layer encoder or third layer encoder comprises, for a particular layer, the particular layer being a second or third layer:

a reference processing unit that is configured to perform reference processing on reference pictures to obtain a set of predicted pictures for each data category, wherein the predicted pictures are adapted to be stored in a reference picture buffer associated with the particular layer;

a particular layer disparity estimation module that is connected with the reference processing unit and configured to perform disparity estimation on based on particular layer reference pictures from a reference picture buffer associated with the particular layer to generate disparity parameters;

a particular layer disparity compensation module that is connected with the particular layer disparity estimation module and configured to perform disparity compensation on the reference pictures based on the disparity parameters to generate a set of disparity compensated pictures;

a particular layer summing module that is connected with the particular layer disparity compensation module and configured to take a difference between each predicted disparity compensated picture and corresponding representation in the one or more representations associated with the particular layer to obtain particular layer residuals;

a particular layer transformation module that is connected with the particular layer summing module and a particular layer quantization module, wherein the particular layer transformation module and the particular layer quantization module are configured to respectively perform transformation and quantization on the particular layer residuals to obtain particular layer quantized transform residuals; and a particular layer entropy encoder that is connected with the particular layer quantization module and configured to perform entropy encoding on the particular layer quantized transform residuals to generate one or more bitstreams associated with the particular layer.

EEE208. The encoding system according to any one of EEEs 194-206, wherein the second layer encoder or third layer encoder comprises, for a particular layer, the particular layer being a second or third layer a reference processing unit that is configured to perform reference processing on reference pictures to obtain a set of predicted pictures for each data category;

a first summing module that is connected with the reference processing unit and configured to take a difference between each representation associated with the particular layer and corresponding predicted pictures to obtain a first set of residuals, each residual in the first set of residuals associated with a data category;

a particular layer disparity estimation module that is connected with the first summing module and configured to perform disparity estimation on particular layer reference pictures from a reference picture buffer associated with the particular layer to generate disparity parameters;

a particular layer disparity compensation module that is connected with the particular layer disparity estimation module and configured to perform disparity compensation on the reference pictures based on the disparity parameters to generate a set of disparity compensated pictures;

a second summing module that is connected with the first summing module and the particular layer disparity compensation module, wherein the second summing module is configured to take a difference between each disparity compensated picture and corresponding residual in the first set of residuals to obtain a second set of residuals;

a particular layer transformation module that is connected with the second summing module and a particular layer quantization module, wherein the particular layer transformation module and the particular layer quantization module are configured to respectively perform transformation and quantization on the particular layer residuals to obtain particular layer quantized transform residuals; and a particular layer entropy encoder that is connected with the particular layer quantization module and configured to perform entropy encoding on the particular layer quantized transform residuals to generate one or more bitstreams associated with the particular layer.

EEE209. The encoding system according to EEE 207 or 208, wherein:
the particular layer comprises a second layer,
the reference processing unit is configured to perform reference processing on reference pictures associated with the at least one first layer, and
the predicted pictures comprise interlace representations of one or more data categories associated with the particular layer.

EEE210. The encoding system according to EEE 207 or 208, wherein:
the particular layer comprises a third layer,
the reference processing unit is configured to perform reference processing on reference pictures associated with the at least one second layer, and
the predicted pictures comprise progressive representations of one or more data categories associated with the particular layer.

EEE211. The encoding system according to any one of EEEs 192-210, wherein each second or third layer is associated with one data category from among the plurality of data categories.

EEE212. The encoding system according to any one of EEEs 192-210, wherein the at least one second layer is one second layer comprising a frame-compatible full-resolution interlace representation of all data categories in the plurality of data categories.

EEE213. The encoding system according to any one of EEEs 192-210 or 212, wherein the at least one third layer is one third layer comprising a frame-compatible full-resolution progressive representation of all data categories in the plurality of data categories.

EEE214. An encoding system that is configured to perform the method according to any one of EEEs 18-39.

EEE215. An encoding system for encoding video data into a plurality of bitstreams, each bitstream being associated with at least one first layer, at least one second layer, or at least one third layer, the video data comprising data from a plurality of data categories, the encoding system comprising:

a frame-compatible interlace input module that is configured to generate the at least one first layer, wherein the at least one first layer comprises a frame-compatible interlace representation of the plurality of data categories from the video data;

a frame-compatible progressive input module that is configured to generate the at least one second layer from the video data, wherein each second layer in the at least one second layer comprises a frame-compatible progressive representation of one or more data categories;

a first layer encoder that is connected with the frame-compatible interlace input module and configured to encode the at least one first layer to generate one or more encoded first layer bitstreams;

a second layer encoder that is connected with the frame-compatible progressive input module and configured to encode the at least one second layer to generate one or more encoded second layer bitstreams; and a third layer encoder that is configured to encode the at least one third layer to generate one or more encoded third layer bitstreams, wherein each third layer comprises an enhanced resolution progressive representation of one or more data categories.

EEE216. The encoding system according to EEE 215, wherein second layer reference pictures associated with a particular second layer in the at least one second layer are generated by processing the frame-compatible interlace representation to obtain predicted second layer progressive representations, wherein the second layer reference pictures are based on the predicted second layer progressive representations.

EEE217. The encoding system according to EEE 215, wherein second layer reference pictures associated with a particular second layer are generated by a reference processing unit that is configured to perform at least one of de-multiplexing, up-sampling, de-interlacing, frequency filtering, and interpolating the first layer reference pictures to obtain the second layer reference pictures.

EEE218. The encoding system according to EEE 215, wherein third layer reference pictures associated with a particular third layer are generated by processing the one or more second layer progressive representations to obtain predicted second layer enhanced resolution progressive representations, wherein the third layer reference pictures are based on the predicted second layer enhanced resolution progressive representations.

EEE219. The encoding system according to EEE 215, wherein third layer reference pictures associated with a particular third layer are generated by a reference processing unit that is configured to perform at least one of de-multiplexing, up-sampling, de-interlacing, frequency filtering, and interpolating reference pictures associated with second layers to obtain the third layer reference pictures.

EEE220. The encoding system according to any one of EEEs 215-219, wherein the second layer encoder or third layer encoder comprises, for a particular layer, the particular layer being a second layer or a third layer:
a reference processing unit that is configured to perform reference processing on reference pictures to obtain a set of predicted pictures for each data category, wherein the predicted pictures are adapted to be stored in a reference picture buffer associated with the particular layer;
a particular layer disparity estimation module that is connected with the reference processing unit and configured to perform disparity estimation on reference pictures from a reference picture buffer associated with the particular layer to generate disparity parameters;
a particular layer disparity compensation module that is connected with the particular layer disparity estimation module and configured to perform disparity compensation on the reference pictures based on the disparity parameters to generate a set of disparity compensated pictures;
a particular layer summing module that is connected with the particular layer disparity compensation module and configured to take a difference between each predicted disparity compensated picture and corresponding representation in the one or more representations associated with the particular layer to obtain particular layer residuals;
a particular layer transformation module that is connected with the particular layer summing module and a particular layer quantization module, wherein the particular layer transformation module and the particular layer quantization module are configured to respectively perform transformation and quantization on the particular layer residuals to obtain particular layer quantized transform residuals; and
a particular layer entropy encoder that is connected with the particular layer quantization module and configured to perform entropy encoding on the particular layer quantized transform residuals to generate one or more bitstreams associated with the particular layer.

EEE221. The encoding system according to any one of EEEs 215-219, wherein the second layer encoder or third layer encoder comprises, for a particular layer, the particular layer being a second or third layer:
a reference processing unit that is configured to perform reference processing on reference pictures to obtain a set of predicted pictures for each data category;
a first summing module that is connected with the reference processing unit and configured to take a difference between each representation associated with the particular layer and corresponding predicted pictures to obtain a first set of residuals, each residual in the first set of residuals associated with an data category;
a particular layer disparity estimation module that is connected with the first summing module and configured to perform disparity estimation on the reference pictures from a reference picture buffer associated with the particular layer to generate disparity parameters;
a particular layer disparity compensation module that is connected with the particular layer disparity estimation module and configured to perform disparity compensation on the reference pictures based on the disparity parameters to generate a set of disparity compensated pictures;
a second summing module that is connected with the first summing module and the particular layer disparity compensation module, wherein the second summing module is configured to take a difference between each disparity compensated picture and corresponding residual in the first set of residuals to obtain a second set of residuals;
a particular layer transformation module that is connected with the second summing module and a particular layer quantization module, wherein the particular layer transformation module and the particular layer quantization module are configured to respectively perform transformation and quantization on the particular layer residuals to obtain particular layer quantized transform residuals; and
a particular layer entropy encoder that is connected with the particular layer quantization module and configured to perform entropy encoding on the particular layer quantized transform residuals to generate one or more bitstreams associated with the particular layer.

EEE222. The encoding system according to EEE 220 or 221, wherein:
the particular layer comprises a second layer,
the reference processing unit is configured to perform reference processing on reference pictures associated with the at least one first layer, and
the set of predicted pictures comprises frame-compatible progressive representations of one or more data categories associated with the particular layer.

EEE223. The encoding system according to EEE 220 or 221, wherein:
the particular layer comprises a third layer,
the reference processing unit is configured to perform reference processing on reference pictures associated with the at least one second layer, and
the set of predicted pictures comprises progressive representations of one or more data categories associated with the particular layer.

EEE224. The encoding system according to any one of EEEs 215-223, wherein each second layer or third layer is associated with one data category from among the plurality of data categories.

EEE225. The encoding system according to any one of EEEs 215-224, wherein the at least one second layer is one second layer comprising a frame-compatible progressive representation of all data categories in the plurality of data categories.

EEE226. The encoding system according to any one of EEEs 215-224, wherein the at least one third layer is one third layer comprising a frame-compatible full-resolution representation of all data categories in the plurality of data categories.

EEE227. An encoding system that is configured to perform the method according to any one of EEEs 40-51.

EEE228. An encoding system for encoding video data into a plurality of bitstreams, each bitstream being associated with at least one first layer, at least one second layer, at least one third layer, or at least one fourth layer, the video data comprising data from a plurality of data categories, the encoding system comprising:

a first frame-compatible interlace input module that is configured to generate the at least one first layer, wherein the at least one first layer comprises a first set of frame-compatible interlace representations of the plurality of data categories from the video data;

a first frame-compatible progressive input module that is configured to generate the at least one second layer, wherein each second layer in the at least one second layer comprises a first set of frame-compatible progressive representations of the plurality of data categories from the video data;

a second frame-compatible interlace input module that is configured to generate the at least one third layer, wherein each third layer in the at least one third layer comprises a second set of frame-compatible interlace representations of the plurality of data categories from the video data;

a second frame-compatible progressive input module that is configured to generate the at least one fourth layer, wherein each fourth layer in at least one fourth layer comprises a second set of frame-compatible progressive representations of the plurality of data categories from the video data;

a first layer encoder that is connected with the first frame-compatible interlace input module and configured to encode the at least one first layer to generate one or more encoded first layer bitstreams;

a second layer encoder that is connected with the first frame-compatible progressive input module and configured to encode the at least one second layer to generate one or more encoded second layer bitstreams;

a third layer encoder that is connected with the second frame-compatible interlace input module and configured to encode the at least one third layer to generate one or more encoded third layer bitstreams; and a fourth layer encoder that is connected with the second frame-compatible progressive input module and configured to encode the at least one fourth layer to generate one or more encoded fourth layer bitstreams.

EEE229. The encoding system according to EEE 228, wherein:

the first set of frame-compatible interlace representations is complementary to the second set of frame-compatible interlace representations, and the first set of frame-compatible progressive representations is complementary to the second set of frame-compatible progressive representations.

EEE230. The encoding system according to EEE 228 or 229, wherein:

the first set of frame-compatible interlace representations comprises a first set of samples from the video data, and the second set of frame-compatible interlace representations comprises samples of the video data not associated with the first set of frame-compatible interlace representations.

EEE231. The encoding system according to any one of EEEs 228-230, wherein:

the first set of frame-compatible progressive representations comprises a first set of samples from the video data, and the second set of frame-compatible progressive representations comprises samples of the video data not associated with the first set of frame-compatible progressive representations.

EEE232. The encoding system according to any one of EEEs 228-231, wherein:

the first set of frame-compatible interlace representations comprises a first set of frequency components of the video data, and the second set of frame-compatible interlace representations comprises frequency components of the video data not associated with the first set of frame-compatible interlace representations.

EEE233. The encoding system according to any one of EEEs 228-232, wherein:

the first set of frame-compatible progressive representations comprises a first set of frequency components of the video data, and the second set of frame-compatible progressive representations comprises frequency components of the video data not associated with the first set of frame-compatible progressive representations.

EEE234. The encoding system according to any one of EEEs 228-232, wherein:

the at least one layer and the at least one third layer are adapted to be combined to form enhanced resolution interlace representations of each data category in the plurality of data categories, and the at least one second layer and the at least one fourth layer are adapted to be combined to form enhanced resolution progressive representations of each data category in the plurality of data categories.

EEE235. The encoding system according to claim any one of EEEs 228-234, wherein second layer reference pictures associated with a particular second layer in the at least one second layer are generated by processing the first set of frame-compatible interlace representations to obtain predicted second layer frame-compatible progressive representations, wherein the second layer reference pictures are based on the predicted second layer progressive representations.

EEE236. The encoding system according to EEEs 228-234, wherein second layer reference pictures associated with a particular second layer are generated by a reference processing unit that is configured to perform at least one of de-multiplexing, up-sampling, de-interlacing, frequency filtering, and interpolating on first layer reference pictures to obtain the second layer reference pictures.

EEE237. The encoding system according to claim any one of EEEs 228-234, wherein third layer reference pictures associated with a particular third layer are generated by processing the first set of frame-compatible interlace representations to obtain predicted third layer frame-compatible interlace representations, wherein the third layer reference pictures are based on the predicted third layer frame-compatible interlace representations.

EEE238. The encoding system according to any one of EEEs 228-236, wherein third layer reference pictures associated with a particular third layer are generated by a reference processing unit that is configured to perform at least one of de-multiplexing, up-sampling, de-interlacing, frequency filtering, and interpolating on first layer reference pictures to obtain the third layer reference pictures.

EEE239. The encoding system according to any one of EEEs 228-238, wherein fourth layer reference pictures associated with a particular fourth layer are generated by processing the first set of frame-compatible progressive representations to obtain predicted fourth layer frame-compatible progressive representations, wherein the fourth layer reference pictures are based on the predicted fourth layer frame-compatible progressive representations.

EEE240. The encoding system according to any one of EEEs 228-238, wherein fourth layer reference pictures associated with a particular fourth layer are generated by a reference processing unit that is configured to perform at least one of de-multiplexing, up-sampling, de-interlacing, frequency filtering, and interpolating the second layer reference pictures to obtain the fourth layer reference pictures.

EEE241. The encoding system according to claim any one of EEEs 228-240, wherein fourth layer reference pictures associated with a particular fourth layer are generated by processing the second set of frame-compatible interlace representations to obtain predicted fourth layer frame-compatible progressive representations, wherein the fourth layer reference pictures are based on the predicted fourth layer frame-compatible progressive representations.

EEE242. The encoding system according to any one of EEEs 228-240, wherein fourth layer reference pictures associated with a particular fourth layer are generated by a reference processing unit that is configured to perform at least one of de-multiplexing, up-sampling, de-interlacing, frequency filtering, and interpolating third layer reference pictures to obtain the fourth layer reference pictures.

EEE243. The encoding system according to any one of EEEs 228-242, wherein each of the second layer encoder, third layer encoder, or fourth layer encoder comprises, for a particular layer, the particular layer being a second layer, a third layer, or a fourth layer:
a reference processing unit that is configured to perform reference processing on reference pictures to obtain a set of predicted pictures for each data category, wherein the predicted pictures are adapted to be stored in a reference picture buffer associated with the particular layer;
a particular layer disparity estimation module that is connected with the reference processing unit and configured to perform disparity estimation on reference pictures from a reference picture buffer associated with the particular layer to generate disparity parameters;
a particular layer disparity compensation module that is connected with the particular layer disparity estimation module and configured to perform disparity compensation on the reference pictures based on the disparity parameters to generate a set of disparity compensated pictures;
a particular layer summing module that is connected with the particular layer disparity compensation module and configured to take a difference between each predicted disparity compensated picture and corresponding representation in the one or more representations associated with the particular layer to obtain particular layer residuals;
a particular layer transformation module that is connected with the particular layer summing module and a particular layer quantization module, wherein the particular layer transformation module and the particular layer quantization module are configured to respectively perform transformation and quantization on the particular layer residuals to obtain particular layer quantized transform residuals; and
a particular layer entropy encoder that is connected with the particular layer quantization module and configured to perform entropy encoding on the particular layer quantized transform residuals to generate one or more bitstreams associated with the particular layer.

EEE244. The encoding system according to any one of EEEs 228-242, wherein each of the second layer encoder, third layer encoder, or fourth layer encoder comprises, for a particular layer, the particular layer being a second layer, a third layer, or a fourth layer:
a reference processing unit that is configured to perform reference processing on reference pictures associated with the particular layer to obtain a set of predicted pictures for each data category;
a first summing module that is connected with the reference processing unit and configured to take a difference between each representation associated with the particular second layer and corresponding predicted pictures to obtain a first set of residuals, each residual in the first set of residuals associated with a data category;
a particular layer disparity estimation module that is connected with the first summing module and configured to perform disparity estimation on the reference pictures from a reference picture buffer associated with the particular layer to generate disparity parameters;
a particular layer disparity compensation module that is connected with the particular layer disparity estimation module and configured to perform disparity compensation on the reference pictures based on the disparity parameters to generate a set of disparity compensated pictures;
a second summing module that is connected with the first summing module and the particular layer disparity compensation module, wherein the second summing module is configured to take a difference between each disparity compensated picture and corresponding residual in the first set of residuals to obtain a second set of residuals;
a particular layer transformation module that is connected with the second summing module and a particular layer quantization module, wherein the particular layer transformation module and the particular layer quantization module are configured to respectively perform transformation and quantization on the particular layer residuals to obtain particular layer quantized transform residuals; and
a particular layer entropy encoder that is connected with the particular layer quantization module and configured to perform entropy encoding on the particular layer quantized transform residuals to generate one or more bitstreams associated with the particular layer.

EEE245. The encoding system according to EEE 243 or 244, wherein:
the particular layer comprises a second layer,
the reference processing unit is configured to perform reference processing on reference pictures associated with the at least one first layer, and
the set of predicted pictures comprises frame-compatible progressive representations of one or more data categories associated with the particular layer.

EEE246. The encoding system according to EEE 243 or 244, wherein:
the particular layer comprises a third layer,
the reference processing unit is configured to perform reference processing on reference pictures associated with the at least one second layer, and the set of predicted pictures comprises frame-compatible interlace representations of one or more data categories associated with the particular layer.

EEE247. The encoding system according to EEE 243 or 244, wherein:
the particular layer comprises a fourth layer,
the reference processing unit is configured to perform reference processing on reference pictures associated with the at least one second layer and/or reference pictures associated with the at least one third layer, and
the set of predicted pictures comprises frame-compatible progressive representations of one or more data categories associated with the particular layer.

EEE248. The encoding system according to any one of EEEs 228-247, wherein the at least one third layer is one third layer comprising a full-resolution representation of all data categories in the plurality of data categories.

EEE249. An encoding system that is configured to perform the method according to any one of EEEs 52-72.

EEE250. An encoding system for encoding video data into a plurality of bitstreams, each bitstream being associated with at least one first layer, at least one second layer, or at least one third layer, the video data comprising data from a plurality of data categories, the encoding system comprising:
a first frame-compatible interlace input module that is configured to generate the at least one first layer, wherein the at least one first layer comprises a first set of frame-compatible interlace representations of the plurality of data categories from the video data;
a second frame-compatible interlace input module that is configured to generate the at least one second layer, wherein each second layer comprises a second set of frame-compatible interlace representations of the plurality of data categories from the video data;
a first interlace input module that is configured to generate the at least one third layer, wherein each third layer comprises a set of interlace representations of the plurality of data categories from the video data;
a first layer encoder that is connected with the first frame-compatible interlace input module and configured to encode the at least one first layer to generate one or more encoded first layer bitstreams;
a second layer encoder that is connected with the second frame-compatible interlace input module and configured to encode the at least one second layer to generate one or more encoded second layer bitstreams; and
a third layer encoder that is connected with the first interlace input module and configured to encode the at least one third layer to generate one or more encoded third layer bitstreams.

EEE251. The encoding system according to EEE 250, wherein the first set of frame-compatible interlace representations is complementary to the second set of frame-compatible interlace representations.

EEE252. The encoding system according to EEE 250 or 251, wherein, at a given time instance, field parities of each first layer and each second layer are the same.

EEE253. The encoding system according to any one of EEEs 250-252, wherein, at a given time instance, field parities of each third layer are opposite field parities of each first layer and each second layer.

EEE254. The encoding system according to any one of EEEs 250-253, wherein the at least one first layer and the at least one second layer are adapted to be combined to form enhanced resolution interlace representations of a first parity for each data category in the plurality of data categories.

EEE255. The encoding system according to EEE 254, wherein the at least one first layer and the at least one second layer are adapted to be combined to form full-resolution interlace representations of a first parity for each data category in the plurality of data categories.

EEE256. The encoding system according to any one of EEEs 250-255, wherein each third layer comprises an enhanced resolution interlace representation of a parity opposite the first parity for each data category in the plurality of data categories.

EEE257. The encoding system according to EEE 256, wherein each third layer comprises a full-resolution interlace representation of a parity opposite the first parity for each data category in the plurality of data categories.

EEE258. The encoding system according to claim any one of EEEs 250-257, wherein second layer reference pictures associated with a particular second layer are generated by processing the first set of frame-compatible interlace representations to obtain predicted second layer frame-compatible interlace representations, wherein the second layer reference pictures are based on the predicted second layer frame-compatible interlace representations.

EEE259. The encoding system according to any one of EEEs 250-257, wherein second layer reference pictures associated with a particular second layer are generated by a reference processing unit that is configured to perform at least one of de-multiplexing, up-sampling, de-interlacing, frequency filtering, and interpolating on first layer reference pictures to obtain the second layer reference pictures.

EEE260. The encoding system according to any one of EEEs 250-259, wherein third layer reference pictures associated with a particular third layer are generated by processing the first set and/or second set of frame-compatible interlace representations to obtain predicted third layer interlace representations, wherein the third layer reference pictures are based on the predicted third layer interlace representations.

EEE261. The encoding system according to any one of EEEs 250-259, wherein third layer reference pictures associated with a particular third layer are generated by a reference processing unit that is configured to perform at least one of de-multiplexing, up-sampling, de-interlacing, frequency filtering, and interpolating first layer reference pictures and/or second layer reference pictures to obtain the third layer reference pictures.

EEE262. The encoding system according to any one of EEEs 250-261, wherein the second layer encoder or third layer encoder comprises, for a particular layer, the particular layer being a second layer or a third layer:
a reference processing unit that is configured to perform reference processing on reference pictures associated with the particular layer to obtain a set of predicted pictures for each data category, wherein the predicted pictures are adapted to be stored in a reference picture buffer associated with the particular layer;
a particular layer disparity estimation module that is connected with the reference processing unit and configured to perform disparity estimation on reference pictures from a reference picture buffer associated with the particular layer to generate disparity parameters;
a particular layer disparity compensation module that is connected with the particular layer disparity estimation module and configured to perform disparity compensation on the reference pictures based on the disparity parameters to generate a set of disparity compensated pictures;
a particular layer summing module that is connected with the particular layer disparity compensation module and configured to take a difference between each predicted disparity compensated picture and corresponding representation in the one or more representations associated with the particular layer to obtain particular layer residuals;

a particular layer transformation module that is connected with the particular layer summing module and a particular layer quantization module, wherein the particular layer transformation module and the particular layer quantization module are configured to respectively perform transformation and quantization on the particular layer residuals to obtain particular layer quantized transform residuals; and a particular layer entropy encoder that is connected with the particular layer quantization module and configured to perform entropy encoding on the particular layer quantized transform residuals to generate one or more bitstreams associated with the particular layer.

EEE263. The encoding system according to any one of EEEs 250-261, wherein the second layer encoder or third layer encoder comprises, for a particular layer, the particular layer being a second layer or a third layer:

a reference processing unit that is configured to perform reference processing on reference pictures associated with the particular layer to obtain a set of predicted pictures for each data category;

a first summing module that is connected with the reference processing unit and configured to take a difference between each representation associated with the particular layer and corresponding predicted pictures to obtain a first set of residuals, each residual in the first set of residuals associated with a data category;

a particular layer disparity estimation module that is connected with the first summing module and configured to perform disparity estimation on the reference pictures from a reference picture buffer associated with the particular layer to generate disparity parameters;

a particular layer disparity compensation module that is connected with the particular layer disparity estimation module and configured to perform disparity compensation on the reference pictures based on the disparity parameters to generate predicted residuals;

a second summing module that is connected with the first summing module and the particular layer disparity compensation module, wherein the second summing module is configured to take a difference between each predicted residual and corresponding residual in the first set of residuals to obtain a second set of residuals;

a particular layer transformation module that is connected with the second summing module and a particular layer quantization module, wherein the particular layer transformation module and the particular layer quantization module are configured to respectively perform transformation and quantization on the particular layer residuals to obtain particular layer quantized transform residuals; and a particular layer entropy encoder that is connected with the particular layer quantization module and configured to perform entropy encoding on the particular layer quantized transform residuals to generate one or more bitstreams associated with the particular layer.

EEE264. The encoding system according to EEE 262 or 263, wherein:

the particular layer comprises a second layer, the reference processing unit is configured to perform reference processing on reference pictures associated with the at least one first layer, and the predicted pictures comprise frame-compatible interlace representations of one or more data categories associated with the particular layer.

EEE265. The encoding system according to EEE 262 or 263, wherein:

the particular layer comprises a third layer, the reference processing unit is configured to perform reference processing on reference pictures associated with the at least one first layer and/or the at least one second layer, and the predicted pictures comprise interlace representations of one or more input data categories associated with the particular layer.

EEE266. An encoding system that is configured to perform the method according to any one of EEEs 73-88.

EEE267. A decoding system for decoding a plurality of bitstreams representative of video data and adapted to be received from an encoding system, the plurality of bitstreams comprising one or more first layer bitstreams representative of at least one first layer and one or more second layer bitstreams representative of at least one second layer, each bitstream comprising data associated with one or more data categories of the video data, the decoding system comprising:

a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation; and a second layer decoder that is configured to decode the one or more second layer bitstreams associated with the at least one second layer, wherein the at least one second layer comprises one or more progressive representations, each progressive representation being associated with one or more of the data categories, the second layer decoder thus being configured to obtain one or more reconstructed progressive representations.

EEE268. The decoding system according to EEE 267, wherein the second layer decoder comprises, for a particular second layer:

a second layer entropy decoder that is configured to perform entropy decoding on one or more second layer bitstreams associated with the particular second layer to obtain second layer quantized transform residuals associated with the particular second layer;

a second layer disparity compensation module that is configured to perform disparity compensation on second layer reference pictures from a reference picture buffer associated with the particular second layer based on disparity parameters to generate predicted progressive pictures, wherein the disparity parameters are adapted to be received by the decoding system from the encoding system;

a second layer inverse quantization module connected with the second layer entropy encoder and a second layer inverse transformation module, wherein the second layer inverse quantization module and the second layer transformation module are configured to respectively perform inverse quantization and inverse transformation on the second layer quantized transform residuals to obtain second layer inverse processed residuals; and a second layer summing module connected with the second layer inverse transformation module and the second layer disparity compensation module and that is configured to combine the second layer inverse processed residuals with the predicted progressive pictures to obtain one or more reconstructed progressive representations associated with the particular second layer, wherein the one or more reconstructed progressive representations are adapted to be stored in the reference picture buffer associated with the particular second layer.

EEE269. The decoding system according to EEE 267, wherein the second layer reference pictures from a reference picture buffer associated with the particular second layer are based on first layer reference pictures stored in a reference picture buffer associated with the at least one first layer, wherein the first layer decoder comprises:

a first layer entropy decoder that is configured to perform entropy decoding on the one or more first layer bitstreams to obtain first layer quantized transform residuals associated with the at least one first layer;

a first layer inverse quantization module connected with the first layer entropy decoder and a first layer inverse transformation module, wherein the first layer inverse quantization module and the first layer inverse transformation module are configured to respectively perform inverse quantization and inverse transformation on the first layer quantized transform residuals to obtain first layer inverse processed residuals;

a first layer disparity compensation module that is configured to perform disparity compensation on the first layer reference pictures based on disparity parameters to generate predicted frame-compatible interlace pictures, wherein the disparity parameters are adapted to be received by the decoding system from the encoding system; and a first layer summing module connected with the first layer inverse transformation module and the first layer disparity compensation module and that is configured to combine the first layer inverse processed residuals with the predicted frame-compatible interlace pictures to obtain the reconstructed frame-compatible interlace representation associated with the at least one first layer, wherein the reconstructed frame-compatible interlace representation is adapted to be stored in the reference picture buffer associated with the at least one first layer.

EEE270. The decoding system according to EEE 269, wherein the first layer decoder further comprises:

a first layer loop filter that is configured to perform loop filtering on the reconstructed frame-compatible interlace representation to obtain a filtered frame-compatible interlace representation, wherein the filtered frame-compatible interlace representation is adapted to be stored in the reference picture buffer associated with the at least one first layer.

EEE271. The decoding system according to EEE 270, wherein the first layer loop filter is configured to perform one or more of deblocking filtering, denoising filtering, Wiener filtering, and explicit filtering.

EEE272. The decoding system according to any one of EEEs 269-271, wherein second layer reference pictures from a reference picture buffer associated with the particular second layer are generated by processing the first layer reference pictures to obtain predicted progressive representations, wherein the second layer reference pictures are based on the predicted progressive representations.

EEE273. The decoding system according to any one of EEEs 269-271, wherein the second layer reference pictures are generated by a reference processing unit that is configured to perform at least one of de-multiplexing, up-sampling, de-interlacing, frequency filtering, and interpolating on the first layer reference pictures to obtain the second layer reference pictures, the reference processing unit being connected with a reference picture buffer associated with the particular second layer and a reference picture buffer associated with the at least one first layer.

EEE274. The decoding system according to any one of EEEs 268-273, wherein the second layer reference pictures from the reference picture buffer associated with the particular second layer are previously coded pictures from the at least one first layer.

EEE275. The decoding system according to any one of EEEs 268-274, wherein the second layer reference pictures from the reference picture buffer associated with the particular second layer are based on a set of second layer reference pictures from another second layer reference picture buffer.

EEE276. The decoding system according to any one of EEEs 267-275, wherein at least one of the one or more of the reconstructed progressive representations are of lower resolution than full-resolution, the decoding system further comprising:

an up-sampler connected with the second layer encoder and that is configured to perform up-sampling on the at least one progressive representation of lower resolution than full-resolution to generate predicted full-resolution progressive representations for the at least one progressive representation.

EEE277. The decoding system according to any one of EEEs 267-276, further comprising:

a reference processing unit connected with the first layer decoder and the second layer decoder and that is configured to perform reference processing on first layer reference pictures from a first layer reference picture buffer to obtain a set of predicted progressive pictures for each data category, wherein the set of predicted progressive pictures is adapted to be stored in a reference picture buffer associated with the at least one second layer, wherein the one or more reconstructed progressive representations associated with the at least one second layer are based on the set of predicted progressive pictures.

EEE278. The decoding system according to any one of EEEs 268-270, further comprising:

a reference processing unit connected with the first layer decoder and that is configured to perform reference processing on first layer reference pictures from a first layer reference picture buffer to obtain a set of predicted progressive pictures for each data category; and a summing module connected with the reference processing unit and the second layer decoder and that is configured to combine the set of predicted progressive pictures with second layer reference pictures from a reference picture buffer associated with one or more of the at least one second layer to obtain the one or more reconstructed progressive representations associated with the at least one second layer.

EEE279. The decoding system according to any one of the EEE 267-278, wherein each second layer is associated with one data category from among the plurality of data categories.

EEE280. The decoding system according to any one of EEEs 267-279, wherein the at least one second layer is one second layer comprising a frame-compatible full-resolution representation of all data categories in the plurality of data categories.

EEE281. A decoding system for decoding a plurality of bitstreams representative of video data and adapted to be received from an encoding system, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories of the video data, the decoding system comprising:

a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation;

a second layer decoder that is configured to decode the one or more second layer bitstreams associated with the at least one second layer, wherein the at least one second layer comprises one or more interlace representations, each interlace representation being associated with one or more of the data categories, the second layer decoder thus being configured to obtain one or more reconstructed interlace representations; and a third layer decoder configured to decode the one or more third layer bitstreams associated with the at least one third layer, wherein the at least one third layer comprises one or more progressive representations, each progressive representation being associated with one or more of the data categories, the third layer decoder thus being configured to obtain one or more reconstructed progressive representations.

EEE282. The decoding system according to EEE 281, wherein the second layer decoder or the third layer decoder comprises, for a particular layer, the particular layer being a second or third layer:

a particular layer entropy decoder that is configured to perform entropy decoding on a bitstream associated with the particular layer to obtain quantized transform residuals associated with the particular layer;

a particular layer disparity compensation module that is configured to perform disparity compensation on reference pictures from a reference picture buffer associated with the particular layer based on disparity parameters to generate predicted pictures, wherein the disparity parameters are adapted to be received by the decoding system from the encoding system;

a particular layer inverse quantization module that is connected with the particular layer entropy encoder and a particular layer inverse transformation module, wherein the particular layer inverse quantization module and the particular layer transformation module are configured to respectively perform inverse quantization and inverse transformation on the quantized transform residuals to obtain inverse processed residuals associated with the particular layer; and a particular layer summing module that is connected with the particular layer inverse transformation module and the particular layer disparity compensation module and configured to combine the inverse processed residuals with the predicted pictures to obtain one or more reconstructed representations associated with the particular layer, wherein the one or more reconstructed representations are adapted to be stored in the reference picture buffer associated with the particular layer.

EEE283. The decoding system according to EEE 282, wherein the reference pictures from a reference picture buffer associated with the particular layer are based on first layer reference pictures stored in a reference picture buffer associated with the at least one first layer, wherein the first layer decoder comprises:

a first layer entropy decoder that is configured to perform entropy decoding on the one or more first layer bitstreams to obtain first layer quantized transform residuals associated with the at least one first layer;

a first layer inverse quantization module that is connected with the first layer entropy decoder and a first layer inverse transformation module, wherein the first layer inverse quantization module and the first layer inverse transformation module are configured to respectively perform inverse quantization and inverse transformation on the first layer quantized transform residuals to obtain first layer inverse processed residuals;

a first layer disparity compensation module that is configured to perform disparity compensation on the first layer reference pictures based on disparity parameters to generate predicted interlace pictures, wherein the disparity parameters are adapted to be received by the decoding system from the encoding system; and a first layer summing module that is connected with the first layer inverse transformation module and the first layer disparity compensation module and configured to combine the first layer inverse processed residuals with the predicted interlace pictures to obtain the reconstructed frame-compatible interlace representation associated with the at least one first layer, wherein the reconstructed frame-compatible interlace representation is adapted to be stored in the reference picture buffer associated with the at least one first layer.

EEE284. The decoding system according to EEE 282 or 283, wherein the first layer decoder further comprises:

a first layer loop filter that is configured to perform loop filtering on the reconstructed frame-compatible interlace representation to obtain a filtered frame-compatible interlace representation, wherein the filtered frame-compatible interlace representation is adapted to be stored in the reference picture buffer associated with the at least one first layer.

EEE285. The decoding system according to EEE 284, wherein the first layer loop filter is configured to perform one or more of deblocking filtering, denoising filtering, Wiener filtering, and explicit filtering.

EEE286. The decoding system according to any one of EEEs 283-285, wherein second layer reference pictures associated with a particular second layer are generated by processing the first layer reference pictures to obtain predicted second layer interlace representations, wherein the second layer reference pictures are based on the predicted second layer interlace representations.

EEE287. The decoding system according to any one of EEEs 283-285, wherein second layer reference pictures associated with a particular second layer are generated by a reference processing unit that is configured to perform at least one of de-multiplexing, up-sampling, de-interlacing, frequency filtering, and interpolating on the first layer reference pictures to obtain the second layer reference pictures, the reference processing unit being connected with a reference picture buffer associated with the particular second layer and a reference picture buffer associated with the at least one first layer.

EEE288. The decoding system according to any one of EEEs 283-285, wherein third layer reference pictures associated with a particular third layer from second layer reference pictures are generated by processing the one or more second layer interlace representations to obtain predicted third layer progressive representations, wherein the third layer reference pictures are based on the predicted third layer progressive representations.

EEE289. The decoding system according to any one of EEEs 283-285, wherein third layer reference pictures associated with a particular third layer are generated by a reference processing unit that is configured to perform at least one of de-multiplexing, up-sampling, de-interlacing, frequency filtering, and interpolating on the second layer reference pictures to obtain the third layer reference pictures, the reference processing unit being connected with a reference picture buffer associated with the particular third layer and a reference picture buffer associated with the at least one second layer.

EEE290. The decoding system according to any one of EEEs 283-289, wherein field parity of the at least one first layer and at least one second layer is different.

EEE291. The decoding system according to any one of EEEs 281-290, further comprising:

a reference processing unit that is connected with a first decoder associated with a first particular layer and a second decoder associated with a second particular layer and configured to perform reference processing on reference pictures associated with the first particular layer to obtain a set of predicted pictures for each data category, wherein the predicted pictures are adapted to be stored in a reference picture buffer associated with the second particular layer, wherein representations associated with the second particular layer are based on the set of predicted pictures.

EEE292. The decoding system according to any one of EEEs 283-290, further comprising:

a reference processing unit that is connected with a first decoder associated with a first particular layer and a second decoder associated with a second particular layer and configured to perform reference processing on reference pictures associated with the first particular layer to obtain a set of predicted pictures for each data category; and a summing module that is connected with the reference processing unit and the second decoder and configured to combine the set of predicted pictures with reference pictures from a reference picture buffer associated with the second particular layer to obtain one or more reconstructed representations associated with the second particular layer.

EEE293. The decoding system according to EEE 291 or 292, wherein:

the first particular layer comprises a first layer among the at least one first layer and the first decoder is the first layer decoder, the second particular layer comprises a second layer among the at least one second layer and the second decoder is the second layer decoder, the reference processing unit is configured to perform reference processing on reference pictures associated with the first particular layer, and the set of predicted pictures comprise interlace representations of one or more data categories associated with the second particular layer.

EEE294. The decoding system according to EEE 291 or 292, wherein:

the first particular layer comprises a second layer among the at least one second layer and the first decoder is the second layer decoder, the second particular layer comprises a third layer among the at least one third layer and the second decoder is the third layer decoder, the reference processing unit is configured to perform reference processing on reference pictures associated with the first particular layer, and the set of predicted pictures comprise progressive representations of one or more data categories associated with the second particular layer.

EEE295. The decoding system according to any one of EEEs 281-294, wherein each second or third layer is associated with one data categories from among the plurality of data categories.

EEE296. The decoding system according to any one of EEEs 281-294, wherein the at least one second layer is one second layer comprising a frame-compatible full-resolution interlace representation of all data categories in the plurality of data categories.

EEE297. The decoding system according to any one of EEEs 281-294 or 296, wherein the at least one third layer is one third layer comprising a frame-compatible full-resolution progressive representation of all data categories in the plurality of input data categories.

EEE298. A decoding system for decoding a plurality of bitstreams representative of video data and adapted to be received from an encoding system, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories, the decoding system comprising:

a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation;

a second layer decoder that is configured to decode the one or more second layer bitstreams associated with the at least one second layer, wherein the at least one second layer comprises one or more frame-compatible progressive representations, each frame-compatible progressive representation being associated with one or more of the data categories, the second layer decoder thus being configured to obtain one or more reconstructed frame-compatible progressive representations; and a third layer decoder that is configured to decode the one or more third layer bitstreams associated with the at least one third layer, wherein the at least one third layer comprises one or more enhanced resolution progressive representation representations, each enhanced resolution progressive representation being associated with one or more of the data categories, the third layer decoder thus being configured to obtain one or more reconstructed enhanced resolution progressive representations.

EEE299. The decoding system according to EEE 298, wherein second layer reference pictures associated with a particular second layer are generated by processing first layer reference pictures to obtain predicted second layer frame-compatible progressive representations, wherein the second layer reference pictures are based on the predicted second layer frame-compatible progressive representations.

EEE300. The decoding system according to EEE 298, wherein second layer reference pictures associated with a particular second layer are generated by a reference processing unit that is configured to perform at least one of de-multiplexing, up-sampling, de-interlacing, frequency filtering, and interpolating on the first layer reference pictures to obtain the second layer reference pictures, the reference processing unit being connected with a reference picture buffer associated with the particular second layer and a reference picture buffer associated with the at least one first layer.

EEE301. The decoding system according to EEE 298, wherein third layer reference pictures associated with a particular third layer are generated by processing second layer reference pictures to obtain predicted third layer enhanced resolution progressive representations, wherein the third layer reference pictures are based on the predicted third layer enhanced resolution progressive representations.

EEE302. The decoding system according to EEE 298, wherein third layer reference pictures associated with a particular third layer are generated by a reference processing unit that is configured to perform at least one of de-multiplexing, up-sampling, de-interlacing, frequency filtering, and interpolating on second layer reference pictures to obtain the third layer reference pictures, the reference processing unit being connected with a reference picture buffer associated with the particular third layer and a reference picture buffer associated with the at least one second layer.

EEE303. The decoding system according to any one of EEEs 298-302, further comprising:
  a reference processing unit that is connected with a first decoder associated with a first particular layer and a second decoder associated with a second particular layer and configured to perform reference processing on reference pictures associated with the first particular layer to obtain a set of predicted pictures for each data category, wherein the predicted pictures are adapted to be stored in a reference picture buffer associated with the second particular layer,
  wherein representations associated with the second particular layer are based on the set of predicted pictures.

EEE304. The decoding system according to any one of EEEs 298-302, further comprising:
  a reference processing unit that is connected with a first decoder associated with a first particular layer and a second decoder associated with a second particular layer and configured to perform reference processing on reference pictures associated with the first particular layer to obtain a set of predicted pictures for each data category; and
  a summing module connected with the reference processing unit and the second decoder and configured to combine the set of predicted pictures with reference pictures from a reference picture buffer associated with the second particular layer to obtain one or more reconstructed representations associated with the second particular layer.

EEE305. The decoding system according to EEE 303 or 304, wherein:
  the first particular layer comprises a first layer among the at least one first layer and the first decoder is the first layer decoder,
  the second particular layer comprises a second layer among the at least one second layer and the second decoder is the second layer decoder,
  the reference processing unit is configured to perform reference processing on reference pictures associated with the first particular layer, and
  the set of predicted pictures comprise frame-compatible progressive representations of one or more data categories associated with the second particular layer.

EEE306. The decoding system according to EEE 303 or 304, wherein:
  the first particular layer comprises a second layer among the at least one second layer and the first decoder is the second layer decoder,
  the second particular layer comprises a third layer among the at least one third layer and the second decoder is the third layer decoder,
  the reference processing unit is configured to perform reference processing on reference pictures associated with the first particular layer, and
  the set of predicted pictures comprise enhanced resolution progressive representations of one or more data categories associated with the second particular layer.

EEE307. The decoding system according to any one of EEEs 298-306, wherein each second layer or third layer is associated with one data categories from among the plurality of data categories.

EEE308. The decoding system according to any one of EEEs 298-307, wherein the at least one second layer is one second layer comprising a frame-compatible progressive representation of all data categories in the plurality of data categories.

EEE309. The decoding system according to any one of EEEs 298-308, wherein the at least one third layer is one third layer comprising a frame-compatible full-resolution representation of all data categories in the plurality of data categories.

EEE310. A decoding system for decoding a plurality of bitstreams representative of video data and adapted to be received from an encoding system, the plurality of bitstreams comprising one or more first layer bitstreams representative of at least one first layer, one or more second layer bitstreams representative of at least one second layer, one or more third layer bitstreams representative of at least one third layer, and one or more fourth layer bitstreams representative of at least one fourth layer, each bitstream comprising data associated with one or more data categories, the decoding system comprising:
  a first layer decoder that is configured to decode the one or more first layer bitstreams associated with the at least one first layer, wherein the at least one first layer comprises a first set of frame-compatible interlace representations, each frame-compatible interlace representation being associated with one or more data categories, the first layer decoder thus being configured to obtain one or more first layer reconstructed frame-compatible interlace representation;
  a second layer decoder that is configured to decode the one or more second layer bitstreams associated with the at least one second layer, wherein the at least one second layer comprises a first set of frame-compatible progressive representations, each frame-compatible progressive representation being associated with one or more of the data categories, the second layer decoder thus being configured to obtain one or more second layer reconstructed frame-compatible progressive representations;
  a third layer decoder that is configured to decode the one or more third layer bitstreams associated with the at least one third layer, wherein the at least one third layer comprises a second set of frame-compatible interlace representations, each frame-compatible interlace representation being associated with one or more of the data categories, the third layer decoder thus being configured to obtain one or more third layer reconstructed frame-compatible interlace representations; and
  a fourth layer decoder that is configured to decode the one or more fourth layer bitstreams associated with the at least one fourth layer, wherein the at least one fourth layer comprises a second set of frame-compatible progressive representations, each frame-compatible progressive representation being associated with one or more of the data categories, the third layer decoder thus being configured to obtain one or more fourth layer reconstructed frame-compatible progressive representations.

EEE311. The decoding system according to EEE 310, wherein:
the first set of frame-compatible interlace representations is complementary to the second set of frame-compatible interlace representations, and
the first set of frame-compatible progressive representations is complementary to the second set of frame-compatible progressive representations.

EEE312. The decoding system according to EEE 310 or 311, wherein:
the first set of frame-compatible interlace representations comprises a first set of samples from the video data, and
the second set of frame-compatible interlace representations comprises samples of the video data not associated with the first set of frame-compatible interlace representations.

EEE313. The decoding system according to any one of EEEs 310-312, wherein:
the first set of frame-compatible progressive representations comprises a first set of samples based on the video data, and
the second set of frame-compatible progressive representations comprises samples of the video data not associated with the first set of frame-compatible progressive representations.

EEE314. The decoding system according to any one of EEEs 310-313, wherein:
the first set of frame-compatible interlace representations comprises a first set of frequency components of the video data, and
the second set of frame-compatible interlace representations comprises frequency components of the video data not associated with the first set of frame-compatible interlace representations.

EEE315. The decoding system according to any one of EEEs 310-314, wherein:
the first set of frame-compatible progressive representations comprises a first set of frequency components of the video data, and
the second set of frame-compatible progressive representations comprises frequency components of the video data not associated with the first set of frame-compatible progressive representations.

EEE316. The decoding system according to any one of EEEs 310-314, wherein:
the at least one layer and the at least one third layer are adapted to be combined to form enhanced resolution interlace representations of each data category in the plurality of data categories, and
the at least one second layer and the at least one fourth layer are adapted to be combined to form enhanced resolution progressive representations of each data category in the plurality of data categories.

EEE317. The decoding system according to any one of EEEs 310-316, wherein second layer reference pictures associated with a particular second layer in the at least one second layer are generated by processing the first set of frame-compatible interlace representations to obtain predicted second layer frame-compatible progressive representations, wherein the second layer reference pictures are based on the predicted second layer frame-compatible progressive representations.

EEE318. The decoding system according to EEEs 310-316, wherein second layer reference pictures associated with a particular second layer in the at least one second layer are generated by a reference processing unit that is configured to perform at least one of de-multiplexing, up-sampling, de-interlacing, frequency filtering, and interpolating on first layer reference pictures to obtain the second layer reference pictures, the reference processing unit being connected with a reference picture buffer associated with the particular second layer and a reference picture buffer associated with the at least one first layer.

EEE319. The decoding system according to any one of EEEs 310-318, wherein third layer reference pictures associated with a particular third layer of the at least one third layer are generated by processing the first set of frame-compatible interlace representations to obtain predicted third layer frame-compatible interlace representations, wherein the third layer reference pictures are based on the predicted third layer interlace representations.

EEE320. The decoding system according to any one of EEEs 310-318, wherein third layer reference pictures associated with a particular third layer are generated by a reference processing unit that is configured to perform at least one of de-multiplexing, up-sampling, de-interlacing, frequency filtering, and interpolating on first layer reference pictures to obtain the third layer reference pictures, the reference processing unit being connected with a reference picture buffer associated with the particular third layer and a reference picture buffer associated with the at least one first layer.

EEE321. The decoding system according to any one of EEEs 310-320, wherein fourth layer reference pictures associated with a particular fourth layer are generated by processing the first set of frame-compatible progressive representations to obtain predicted fourth layer frame-compatible progressive representations, wherein the fourth layer reference pictures are based on the predicted fourth layer frame-compatible progressive representations.

EEE322. The decoding system according to any one of EEEs 310-320, wherein fourth layer reference pictures associated with a particular fourth layer are generated by a reference processing unit that is configured to perform at least one of de-multiplexing, up-sampling, de-interlacing, frequency filtering, and interpolating on second layer reference pictures to obtain the fourth layer reference pictures, the reference processing unit being connected with a reference picture buffer associated with the particular fourth layer and a reference picture buffer associated with the at least one second layer.

EEE323. The decoding system according to claim any one of EEEs 310-322, wherein fourth layer reference pictures associated with a particular fourth layer are generated by processing the second set of frame-compatible interlace representations to obtain predicted fourth layer frame-compatible progressive representations, wherein the fourth layer reference pictures are based on the predicted fourth layer frame-compatible progressive representations.

EEE324. The decoding system according to any one of EEEs 310-322, wherein fourth layer reference pictures associated with a particular fourth layer are generated by a reference processing unit that is configured to perform at least one of de-multiplexing, up-sampling, de-interlacing, frequency filtering, and interpolating on third layer reference pictures to obtain the fourth layer reference pictures, the reference processing unit being connected with a reference picture buffer associated with the particular fourth layer and a reference picture buffer associated with the at least one third layer.

EEE325. The decoding system according to any one of EEEs 310-324, further comprising:
a reference processing unit that is connected with a first decoder associated with a first particular layer and a second decoder associated with a second particular layer and configured to perform reference processing on reference pictures associated with the first particular layer to obtain a set of predicted pictures for each data category, wherein the predicted pictures are adapted to be stored in a reference picture buffer associated with the second particular layer, wherein representations associated with the second particular layer are based on the set of predicted pictures.

EEE326. The decoding system according to any one of EEEs 310-324, further comprising:

a reference processing unit that is connected with a first decoder associated with a first particular layer and a second decoder associated with a second particular layer and configured to perform reference processing on reference pictures associated with the first particular layer to obtain a set of predicted pictures for each data category; and a summing module that is connected with the reference processing unit and the second decoder and configured to combine the set of predicted pictures with reference pictures from a reference picture buffer associated with the second particular layer to obtain one or more reconstructed representations associated with the second particular layer.

EEE327. The decoding system according to EEE 325 or 326, wherein:

the first particular layer comprises a first layer among the at least one first layer and the first decoder is the first layer decoder, the second particular layer comprises a second layer among the at least one second layer and the second decoder is the second layer decoder, the reference processing unit is configured to perform reference processing on reference pictures associated with the first particular layer, and the set of predicted pictures comprise frame-compatible progressive representations of one or more data categories associated with the second particular layer.

EEE328. The decoding system according to EEE 325 or 326, wherein:

the first particular layer comprises a second layer among the at least one second layer and the first decoder is the second layer decoder, the second particular layer comprises a third layer among the at least one third layer and the second decoder is the third layer decoder, the reference processing unit is configured to perform reference processing on reference pictures associated with the first particular layer, and the set of predicted pictures comprise frame-compatible interlace representations of one or more data categories associated with the second particular layer.

EEE329. The decoding system according to EEE 325 or 326, wherein:

the first particular layer comprises a second layer among the at least one second layer and/or a third layer among the at least one third layer and the first decoder comprises the second layer decoder and/or the third layer decoder, the second particular layer comprises a fourth layer among the at least one fourth layer and the second decoder comprises the fourth layer decoder, the reference processing unit is configured to perform reference processing on reference pictures associated with the first particular layer, and the set of predicted pictures comprise frame-compatible progressive representations of one or more data categories associated with the second particular layer.

EEE330. The decoding system according to any one of EEEs 310-329, wherein the at least one third layer is one third layer comprising a full-resolution representation of all data categories in the plurality of data categories.

EEE331. A decoding system for decoding a plurality of bitstreams representative of video data and adapted to be received from an encoding system, the plurality of bitstreams comprising one or more first layer bitstreams representative of at least one first layer, one or more second layer bitstreams representative of at least one second layer, and one or more third layer bitstreams representative of at least one third layer, each bitstream comprising data associated with one or more data categories, the decoding system comprising:

a first layer decoder that is configured to decode the one or more first layer bitstreams associated with the at least one first layer, wherein the at least one first layer comprises a first set of frame-compatible interlace representations, each frame-compatible interlace representation being associated with one or more data categories, the first layer decoder thus being configured to obtain one or more first layer reconstructed frame-compatible interlace representation;

a second layer decoder configured to decode the one or more second layer bitstreams associated with the at least one second layer, wherein the at least one second layer comprises a second set of frame-compatible interlace representations, each frame-compatible interlace representation being associated with one or more of the data categories, the second layer decoder thus being configured to obtain one or more second layer reconstructed frame-compatible interlace representations; and a third layer decoder configured to decode the one or more third layer bitstreams associated with the at least one third layer, wherein the at least one third layer comprises one or more interlace representations, each interlace representation being associated with one or more of the data categories, the third layer decoder thus being configured to obtain one or more third layer reconstructed interlace representations.

EEE332. The decoding system according to EEE 331, wherein the first set of frame-compatible interlace representations is complementary to the second set of frame-compatible interlace representations.

EEE333. The decoding system according to EEE 331 or 332, wherein, at a given time instance, field parities of each first layer and each second layer are the same.

EEE334. The decoding system according to any one of EEEs 331-333, wherein, at a given time instance, field parities of each third layer are opposite field parities of each first layer and each second layer.

EEE335. The decoding system according to any one of EEEs 331-334, wherein the at least one first layer and the at least one second layer are adapted to be combined to form enhanced resolution interlace representations of a first parity for each data category in the plurality of data categories.

EEE336. The decoding system according to any one of EEEs 331-335, wherein the at least one first layer and the at least one second layer are adapted to be combined to form full-resolution interlace representations of a first parity for each data category in the plurality of data categories.

EEE337. The decoding system according to EEEs 331-336, wherein each third layer comprises an enhanced resolution interlace representation of a parity opposite the first parity for each data category in the plurality of data categories.

EEE338. The decoding system according to EEE 337, wherein each third layer comprises a full-resolution interlace representation of a parity opposite the first parity for each data category in the plurality of data categories.

EEE339. The decoding system according to claim any one of EEEs 331-338, wherein second layer reference pictures associated with a particular second layer are generated by processing the first set of frame-compatible interlace representations to obtain predicted second layer frame-compatible interlace representations, wherein the second layer reference pictures are based on the predicted second layer interlace representations.

EEE340. The decoding system according to any one of EEEs 331-338, wherein second layer reference pictures associated with a particular second layer are generated by a reference processing unit that is configured to perform at least one of de-multiplexing, up-sampling, de-interlacing, frequency filtering, and interpolating on first layer reference pictures to obtain the second layer reference pictures, the reference processing unit being connected with a reference picture buffer associated with the particular second layer and a reference picture buffer associated with the at least one first layer.

EEE341. The decoding system according to any one of EEEs 331-340, wherein third layer reference pictures associated with a particular third layer are generated by processing the first set and/or second set of frame-compatible interlace representations to obtain predicted third layer interlace representations, wherein the third layer reference pictures are based on the predicted third layer interlace representations.

EEE342. The decoding system according to any one of EEEs 331-340, wherein third layer reference pictures associated with a particular third layer are generated by a reference processing unit configured to perform at least one of de-multiplexing, up-sampling, de-interlacing, frequency filtering, and interpolating on first layer reference pictures and/or second layer reference pictures to obtain the third layer reference pictures, the reference processing unit being connected with a reference picture buffer associated with the particular second layer and one or more reference picture buffers associated with the at least one first layer and/or the at least one second layer.

EEE343. The decoding system according to any one of EEEs 331-340, further comprising:

a reference processing unit that is connected with a first decoder associated with a first particular layer and a second decoder associated with a second particular layer and configured to perform reference processing on reference pictures associated with the first particular layer to obtain a set of predicted pictures for each data category, wherein the predicted pictures are adapted to be stored in a reference picture buffer associated with the second particular layer, wherein representations associated with the second particular layer are based on the set of predicted layers.

EEE344. The decoding system according to any one of EEEs 331-340, further comprising:

a reference processing unit that is connected with a first decoder associated with a first particular layer and a second decoder associated with a second particular layer and configured to perform reference processing on reference pictures associated with the first particular layer to obtain a set of predicted pictures for each data category; and a summing module connected with the reference processing unit and the second decoder and configured to combine the set of predicted pictures with reference pictures from a reference picture buffer associated with the second particular layer to obtain one or more reconstructed representations associated with the second particular layer.

EEE345. The decoding system according to EEE 343 or 344, wherein:

the first particular layer comprises a first layer among the at least one layer and the first decoder is the first layer decoder, the second particular layer comprises a second layer among the at least second layer and the second decoder is the second layer decoder, the reference processing unit is configured to perform reference processing on reference pictures associated with the first particular layer, and the set of predicted pictures comprise frame-compatible interlace representations of one or more data categories associated with the second particular layer.

EEE346. The decoding system according to EEE 343 or 344, wherein:

the first particular layer comprises a first layer among the at least one first layer and/or a second layer among the at least one second layer and the first decoder comprises the first layer decoder and/or the second layer decoder, the second particular layer comprises a third layer among the at least one third layer and the second decoder comprises the third layer decoder, the reference processing unit is configured to perform reference processing on reference pictures associated with the first particular layer, and the set of predicted pictures comprise interlace representations of one or more data categories associated with the second particular layer.

EEE347. The method according to any one of EEEs 1-173, wherein each first layer comprises a base layer and each second layer comprises an enhancement layer.

EEE348. The method according to any one of EEEs 18-88 and 94-173, wherein each first layer comprises a base layer and each of remaining layers are enhancement layers.

EEE349. An encoding system for encoding a video signal according to the method recited in any one of EEEs 1-93.

EEE350. A decoding system for decoding a video signal according to the method recited in any one of EEEs 94-173.

EEE351. A decoding system for decoding a video signal encoded by the encoding system according to any one of EEEs 174-266.

EEE352. A computer-readable medium containing a set of instructions that causes a computer to perform the method recited in one or more of EEEs 1-173.

EEE353. Use of the method recited in one or more of EEEs 1-93 to encode at least one image or video frame.

EEE354. Use of the method recited in one or more of EEEs 94-173 to decode at least one bitstream.

LIST OF REFERENCES

[1] Advanced video coding for generic audiovisual services, itu.int/rec/recommendation.asp?type=folders&lang=e&parent=T-REC-H.264, March 2010 (last retrieved: 15 Dec. 2011).

[2] SMPTE 421M, "VC-1 Compressed Video Bitstream Format and Decoding Process", April 2006.

[3] A. Tourapis, P. Pahalawatta, A. Leontaris, K. Stec, and W. Husak, "Encoding and Decoding Architecture for Format Compatible 3D Video Delivery", U.S. Provisional Patent Application No. 61/223,027, July 2009.

[4] A. Leontaris, A. Tourapis, and P. Pahalawatta, "Enhancement Methods for Sampled and Multiplexed Image and Video Data", U.S. Provisional Patent Application No. 61/365,743, July 2010.

[5] A. Tourapis, A. Leontaris, P. Pahalawatta, and K. Stec, "Directed Interpolation/Post-processing methods for video encoded data", U.S. Provisional Patent Application No. 61/170,995, April 2009.

[6] P. Pahalawatta, A. Tourapis, W. Husak, "System And Method For Multi-Layered Image And Video Delivery Using Reference Processing Signals", U.S. Provisional Patent Application No. 61/362,661, July 2010.

What is claimed is:

1. A decoding system for decoding a plurality of bitstreams representative of stereoscopic video data, the stereoscopic view further comprising a first view and a second view of the video data, and adapted to be received from an encoding system, the plurality of bitstreams comprising one or more first layer bitstreams representative of at least one first layer, the first layer comprising both the first view and the second view of the stereoscopic video data, and one or more second layer bitstreams representative of at least one second layer, each bitstream comprising data associated with one or more data categories of the video data, the decoding system comprising:

a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation, such that the frame-compatible interlace representation comprises both first and second views that fit within a single frame configure to reproduce a 3-D video image; and a second layer decoder that is configured to decode the one or more second layer bitstreams associated with the at least one second layer, wherein the at least one second layer comprises one or more progressive representations, each progressive representation being associated with one or more of the data categories, the second layer decoder thus being configured to obtain one or more reconstructed progressive representations, such that the progressive representations are configured to derive enhanced resolution reconstruction of the 3-D video image.

2. The decoding system according to claim 1, wherein the second layer decoder comprises, for a particular second layer:

a second layer entropy decoder that is configured to perform entropy decoding on one or more second layer bitstreams associated with the particular second layer to obtain second layer quantized transform residuals associated with the particular second layer;

a second layer disparity compensation module that is configured to perform disparity compensation on second layer reference pictures from a reference picture buffer associated with the particular second layer based on disparity parameters to generate predicted progressive pictures, wherein the disparity parameters are adapted to be received by the decoding system from the encoding system;

a second layer inverse quantization module connected with the second layer entropy encoder and a second layer inverse transformation module, wherein the second layer inverse quantization module and the second layer transformation module are configured to respectively perform inverse quantization and inverse transformation on the second layer quantized transform residuals to obtain second layer inverse processed residuals; and a second layer summing module connected with the second layer inverse transformation module and the second layer disparity compensation module and that is configured to combine the second layer inverse processed residuals with the predicted progressive pictures to obtain one or more reconstructed progressive representations associated with the particular second layer, wherein the one or more reconstructed progressive representations are adapted to be stored in the reference picture buffer associated with the particular second layer.

3. The decoding system according to claim 1, wherein the second layer reference pictures from a reference picture buffer associated with the particular second layer are based on first layer reference pictures stored in a reference picture buffer associated with the at least one first layer, wherein the first layer decoder comprises:

a first layer entropy decoder that is configured to perform entropy decoding on the one or more first layer bitstreams to obtain first layer quantized transform residuals associated with the at least one first layer;

a first layer inverse quantization module connected with the first layer entropy decoder and a first layer inverse transformation module, wherein the first layer inverse quantization module and the first layer inverse transformation module are configured to respectively perform inverse quantization and inverse transformation on the first layer quantized transform residuals to obtain first layer inverse processed residuals;

a first layer disparity compensation module that is configured to perform disparity compensation on the first layer reference pictures based on disparity parameters to generate predicted frame-compatible interlace pictures, wherein the disparity parameters are adapted to be received by the decoding system from the encoding system; and a first layer summing module connected with the first layer inverse transformation module and the first layer disparity compensation module and that is configured to combine the first layer inverse processed residuals with the predicted frame-compatible interlace pictures to obtain the reconstructed frame-compatible interlace representation associated with the at least one first layer, wherein the reconstructed frame-compatible interlace representation is adapted to be stored in the reference picture buffer associated with the at least one first layer.

4. The decoding system according to claim 3, wherein the first layer decoder further comprises:

a first layer loop filter that is configured to perform loop filtering on the reconstructed frame-compatible interlace representation to obtain a filtered frame-compatible interlace representation, wherein the filtered frame-compatible interlace representation is adapted to be stored in the reference picture buffer associated with the at least one first layer.

5. The decoding system according to claim 4, wherein the first layer loop filter is configured to perform one or more of deblocking filtering, denoising filtering, Wiener filtering, and explicit filtering.

6. The decoding system according to claim 3, wherein second layer reference pictures from a reference picture buffer associated with the particular second layer are generated by processing the first layer reference pictures to obtain predicted progressive representations, wherein the second layer reference pictures are based on the predicted progressive representations.

7. The decoding system according to claim 4, wherein the second layer reference pictures are generated by a reference processing unit that is configured to perform at least one of de-multiplexing, up-sampling, de-interlacing, frequency filtering, and interpolating on the first layer reference pictures to obtain the second layer reference pictures, the reference processing unit being connected with a reference picture buffer associated with the particular second layer and a reference picture buffer associated with the at least one first layer.

8. The decoding system according to claim 7, wherein the second layer reference pictures from the reference picture buffer associated with the particular second layer are previously coded pictures from the at least one first layer.

9. The decoding system according to claim 8, wherein the second layer reference pictures from the reference picture buffer associated with the particular second layer are based on a set of second layer reference pictures from another second layer reference picture buffer.

10. The decoding system according to claim 1, wherein at least one of the one or more of the reconstructed progressive representations are of lower resolution than full-resolution, the decoding system further comprising:
an up-sampler connected with the second layer encoder and that is configured to perform up-sampling on the at least one progressive representation of lower resolution than full-resolution to generate predicted full-resolution progressive representations for the at least one progressive representation.

11. The decoding system according to claim 1, further comprising:
a reference processing unit connected with the first layer decoder and the second layer decoder and that is configured to perform reference processing on first layer reference pictures from a first layer reference picture buffer to obtain a set of predicted progressive pictures for each data category, wherein the set of predicted progressive pictures is adapted to be stored in a reference picture buffer associated with the at least one second layer,
wherein the one or more reconstructed progressive representations associated with the at least one second layer are based on the set of predicted progressive pictures.

12. The decoding system according to claim 2, further comprising:
a reference processing unit connected with the first layer decoder and that is configured to perform reference processing on first layer reference pictures from a first layer reference picture buffer to obtain a set of predicted progressive pictures for each data category; and
a summing module connected with the reference processing unit and the second layer decoder and that is configured to combine the set of predicted progressive pictures with second layer reference pictures from a reference picture buffer associated with one or more of the at least one second layer to obtain the one or more reconstructed progressive representations associated with the at least one second layer.

13. The decoding system according to claim 1, wherein each second layer is associated with one data category from among the plurality of data categories.

14. The decoding system according to claim 1, wherein the at least one second layer is one second layer comprising a frame-compatible full-resolution representation of all data categories in the plurality of data categories.

15. A decoding system for decoding a plurality of bitstreams representative of stereoscopic video data, the stereoscopic view further comprising a first view and a second view of the video data, and adapted to be received from an encoding system, the plurality of bitstreams comprising one or more first layer bitstreams representative of at least one first layer, the first layer comprising both the first view and the second view of the stereoscopic video data, one or more second layer bitstreams representative of at least one second layer, and one or more third layer bitstreams representative of at least one third layer, each bitstream comprising data associated with one or more data categories of the video data, the decoding system comprising:
a first layer decoder that is configured to decode the one or more first layer bitstreams associated with the at least one first layer, wherein the at least one first layer comprises a frame-compatible interlace representation of the one or more data categories, the first layer decoder thus being configured to obtain a reconstructed frame-compatible interlace representation, such that the frame-compatible interlace representation comprises both first and second views that fit within a single frame configure to reproduce a 3-D video image;
a second layer decoder that is configured to decode the one or more second layer bitstreams associated with the at least one second layer, wherein the at least one second layer comprises one or more interlace representations, each interlace representation being associated with one or more of the data categories, the second layer decoder thus being configured to obtain one or more reconstructed interlace representations, such that the progressive representations are configured to derive enhanced resolution reconstruction of the 3-D video image; and
a third layer decoder configured to decode the one or more third layer bitstreams associated with the at least one third layer, wherein the at least one third layer comprises one or more progressive representations, each progressive representation being associated with one or more of the data categories, the third layer decoder thus being configured to obtain one or more reconstructed progressive representations.

16. The decoding system according to claim 15, wherein the second layer decoder or the third layer decoder comprises, for a particular layer, the particular layer being a second or third layer:
a particular layer entropy decoder that is configured to perform entropy decoding on a bitstream associated with the particular layer to obtain quantized transform residuals associated with the particular layer;
a particular layer disparity compensation module that is configured to perform disparity compensation on reference pictures from a reference picture buffer associated with the particular layer based on disparity parameters to generate predicted pictures, wherein the disparity parameters are adapted to be received by the decoding system from the encoding system;
a particular layer inverse quantization module that is connected with the particular layer entropy encoder and a particular layer inverse transformation module, wherein the particular layer inverse quantization module and the particular layer transformation module are configured to respectively perform inverse quantization and inverse transformation on the quantized transform residuals to obtain inverse processed residuals associated with the particular layer; and
a particular layer summing module that is connected with the particular layer inverse transformation module and the particular layer disparity compensation module and configured to combine the inverse processed residuals with the predicted pictures to obtain one or more reconstructed representations associated with the particular layer, wherein the one or more reconstructed representations are adapted to be stored in the reference picture buffer associated with the particular layer.

17. The decoding system according to claim 16, wherein the reference pictures from a reference picture buffer associated with the particular layer are based on first layer reference pictures stored in a reference picture buffer associated with the at least one first layer, wherein the first layer decoder comprises:
 a first layer entropy decoder that is configured to perform entropy decoding on the one or more first layer bitstreams to obtain first layer quantized transform residuals associated with the at least one first layer;
 a first layer inverse quantization module that is connected with the first layer entropy decoder and a first layer inverse transformation module, wherein the first layer inverse quantization module and the first layer inverse transformation module are configured to respectively perform inverse quantization and inverse transformation on the first layer quantized transform residuals to obtain first layer inverse processed residuals;
 a first layer disparity compensation module that is configured to perform disparity compensation on the first layer reference pictures based on disparity parameters to generate predicted interlace pictures, wherein the disparity parameters are adapted to be received by the decoding system from the encoding system; and
 a first layer summing module that is connected with the first layer inverse transformation module and the first layer disparity compensation module and configured to combine the first layer inverse processed residuals with the predicted interlace pictures to obtain the reconstructed frame-compatible interlace representation associated with the at least one first layer, wherein the reconstructed frame-compatible interlace representation is adapted to be stored in the reference picture buffer associated with the at least one first layer.

18. The decoding system according to claim 16, wherein the first layer decoder further comprises:
 a first layer loop filter that is configured to perform loop filtering on the reconstructed frame-compatible interlace representation to obtain a filtered frame-compatible interlace representation, wherein the filtered frame-compatible interlace representation is adapted to be stored in the reference picture buffer associated with the at least one first layer.

19. The decoding system according to claim 18, wherein the first layer loop filter is configured to perform one or more of deblocking filtering, denoising filtering, Wiener filtering, and explicit filtering, and wherein second layer reference pictures associated with a particular second layer are generated by processing the first layer reference pictures to obtain predicted second layer interlace representations, wherein the second layer reference pictures are based on the predicted second layer interlace representations, and wherein second layer reference pictures associated with a particular second layer are generated by a reference processing unit that is configured to perform at least one of de-multiplexing, up-sampling, de-interlacing, frequency filtering, and interpolating on the first layer reference pictures to obtain the second layer reference pictures, the reference processing unit being connected with a reference picture buffer associated with the particular second layer and a reference picture buffer associated with the at least one first layer.

20. A decoding system, comprising:
 a first layer decoder that is configured to decode a first layer bitstream associated with at least one first layer of stereoscopic video data stream, the stereoscopic view further comprising a first view and a second view of the video data and the first layer comprising both the first view and the second view of the stereoscopic video data, wherein the at least one first layer comprises a frame-compatible interlace representation of the one or more data categories, the first layer decoder thus being configured to obtain a reconstructed frame-compatible interlace representation, such that the frame-compatible interlace representation comprises both first and second views that fit within a single frame configure to reproduce a 3-D video image; and
 a second layer decoder that is configured to decode at least one second layer bitstream associated with at least one second layer, wherein the at least one second layer comprises one or more progressive representations, each progressive representation being associated with one or more of the data categories, the second layer decoder thus being configured to obtain one or more reconstructed progressive representations, such that the progressive representations are configured to derive enhanced resolution reconstruction of the 3-D video image;
 wherein the first layer comprises a frame compatible representation of the video data, and wherein the second layer(s) are structured to be ignored by legacy decoding mechanisms; and
 wherein the decoder is installed in at least one of a display, set-top box, and video player device.

21. The decoding system according to claim 20, wherein the decoder is configured to receive content delivered by a streaming solution, the content comprising the first and second layer bit-streams.

* * * * *